US009489658B2

(12) United States Patent
Hertz et al.

(10) Patent No.: US 9,489,658 B2
(45) Date of Patent: Nov. 8, 2016

(54) UNIVERSAL COMMUNICATION SYSTEM

(75) Inventors: Bryan Hertz, San Marcos, CA (US);
Rob Lewis, San Diego, CA (US);
Curtis Kaffer, San Diego, CA (US);
Kevin Hertz, San Diego, CA (US);
Robert Hertz, Encinitas, CA (US);
Edward W. Mallory, San Diego, CA (US); Corey J. Hertz, Cardiff by the Sea, CA (US); Jorge Guntanis, San Diego, CA (US)

(73) Assignee: Telcentris, Inc., San Diego, CA (US)

( * ) Notice: Subject to any disclaimer, the term of this patent is extended or adjusted under 35 U.S.C. 154(b) by 0 days.

(21) Appl. No.: 13/430,606

(22) Filed: Mar. 26, 2012

(65) Prior Publication Data
US 2013/0007150 A1     Jan. 3, 2013

Related U.S. Application Data

(60) Provisional application No. 61/467,901, filed on Mar. 25, 2011.

(51) Int. Cl.
*G06F 15/16*    (2006.01)
*G06Q 10/10*    (2012.01)
*H04L 12/58*    (2006.01)

(52) U.S. Cl.
CPC ............... *G06Q 10/10* (2013.01); *H04L 51/04* (2013.01); *H04L 51/32* (2013.01)

(58) Field of Classification Search
CPC ... H04W 76/02; H04W 36/28; H04W 48/18; H04W 4/005; H04W 4/16; H04W 76/025; H04W 76/028; H04W 76/064; H04W 88/06; H01H 71/08; H04L 49/00; H04L 45/22; H04L 45/50; H04L 45/566; H04L 49/351; H04L 51/36; H04L 65/403; H04L 12/589; H04L 29/06176; H04M 1/72552; H04M 2201/38; H04M 2203/4509; H04M 2250/62; H04M 3/42195; H04Q 2213/1307; H04Q 2213/1324
USPC ........ 709/204, 206, 223, 227; 455/416, 466; 379/202.01, 242
See application file for complete search history.

(56) References Cited

U.S. PATENT DOCUMENTS

| 6,128,375 | A  | * | 10/2000 | Punzalan et al. ............. 379/199 |
| 7,512,652 | B1 | * | 3/2009  | Appelman ........... G06Q 10/107 709/204 |
| 2003/0005126 | A1 | * | 1/2003  | Schwartz ................ H04L 29/06 709/227 |
| 2003/0039242 | A1 | * | 2/2003  | Moore, Jr. .................... 370/354 |
| 2007/0201646 | A1 | * | 8/2007  | Metcalf .................... 379/142.01 |
| 2007/0218885 | A1 | * | 9/2007  | Pfleging ................. H04M 3/56 455/416 |
| 2007/0280464 | A1 | * | 12/2007 | Hughes ................. H04M 7/003 379/205.01 |

(Continued)

*Primary Examiner* — Dustin Nguyen
*Assistant Examiner* — Hao Nguyen
(74) *Attorney, Agent, or Firm* — Jeffrey D. Myers; Deborah A. Peacock; Peacock Myers, P.C.

(57) ABSTRACT

A universal communication system including a processor configured to execute a client application is described and includes first logic configured to provide a client interface for accessing a plurality of communication and media types from the command window, and second logic configured to integrate a plurality of contact information from the plurality of media and communication types into a single contact list, where the single contact list being accessible from the client interface. The system further includes third logic configured to receive executable instructions from a multi-protocol application program interface to alter the plurality of communication and media types and the plurality of contact information received therefrom.

20 Claims, 76 Drawing Sheets

(56) References Cited

U.S. PATENT DOCUMENTS

| | | | |
|---|---|---|---|
| 2008/0139228 A1* | 6/2008 | Raffel | H04M 3/42195 455/466 |
| 2008/0275887 A1* | 11/2008 | Chang et al. | 707/100 |
| 2009/0016504 A1* | 1/2009 | Mantell | H04L 12/5835 379/101.01 |
| 2010/0246571 A1* | 9/2010 | Geppert et al. | 370/352 |
| 2010/0331043 A1* | 12/2010 | Chapman et al. | 455/556.1 |
| 2011/0004561 A1* | 1/2011 | Shahine et al. | 705/319 |
| 2011/0021173 A1* | 1/2011 | Randhawa et al. | 455/404.1 |

* cited by examiner

● Contact Manager

VOXOX® | Search Contacts | Edit Contact | Edit Phone Settings

| Group | | Name |
|---|---|---|
| AE Contacts | 530 | aolbuddy |
| (1) Family | 5 | aolyellowpages |
| (2) Chicago-Kent | 49 | smarterchild |
| (3) Buddies | 66 | zoleoneoi |
| (4) 360Works | 15 | |
| (5) Back in the Day | 10 | |
| (6) Georgia Tech | 4 | |
| (7) Way Back in the Day | | |
| (8) Utilities | 28 | |
| Buddies | 321 | |
| Facebook | | | aolyellowpages

Group ──────────── (e)

Phone(s) ──────────── None

IM Screenname(s) ──────────── AIM aolyellowpages

Email(s) ──────────── None

Address(es) ──────────── None

UNIVERSAL COMMUNICATION SYSTEM

CROSS REFERENCE TO RELATED APPLICATIONS

This application claims the benefit and priority to U.S. Provisional Application No. 61/467,901 filed on Mar. 25, 2011, and is hereby incorporated by reference in its entirety.

FIELD OF THE INVENTION

This invention relates to communication systems and methods, and more particular, a universal communicator ("UC") configured to unify one or more forms of communication, media, and information types.

BACKGROUND

The proliferation of telecommunication and computing technology has spawned a variety of communication technologies and channels. Currently, key communication channels include data, voice, video, instant messaging, text messaging, social media, email, file sharing, faxing, and other similar communication channels. Voice communications have expanded beyond traditional public telephone networks and landlines to voice communications occurring over mobile networks and the Internet, such as Voice over IP ("VoIP"). Additionally, new options for instant messaging and social media communications are regularly made available to users.

To keep up with the ever-increasing availability of communication options, many users may be accessible to more than one communications option. For example, users may have multiple phone numbers at which they may be reached (e.g. home, office, mobile, and fax.) A user may also belong to multiple instant messaging and social media networks.

Further, each user may prefer to communicate using different communication channels, types, or media. Further, these preferences may differ among users, family, friends, and colleagues and/or a user may only communicate using a certain type of communication mechanism, such as through electronic mail or calling over a network using VoIP. Accordingly, it may be difficult for a user to keep track of contact information for family, friends, and colleagues. Moreover, a user may require access to multiple forms of communication to stay connected to other users.

Therefore, there is a need for a communication system that unifies information, media, and different forms of communication.

SUMMARY

Broadly, in one aspect, a computer program product, stored on a non-transitory computer readable medium that includes instructions that when executed on one or more computers cause the one or more computers to provide a client application is described and includes a plurality of communication types, provide access to a plurality of contact information, initiate a first communication with a first party using a first one of the communication types, and automatically switch to a second communication with the first party using a second one of the communication types concurrently with a termination of the first communication.

In another aspect, a universal communication system including a processor configured to execute a client application is described and includes first logic configured to provide a client interface for accessing a plurality of communication and media types from the command window, and second logic configured to integrate a plurality of contact information from the plurality of media and communication types into a single contact list, where the single contact list being accessible from the client interface. The system further includes third logic configured to receive executable instructions from a multi-protocol application program interface to alter the plurality of communication and media types and the plurality of contact information received therefrom.

In another aspect, there is described an apparatus that includes a processor configured to execute a client application including a plurality of communication types, and a memory configured to store and provide access to a plurality of contact information from a plurality of media types, where the processor is further configured to enable a first communication with a first party using a first one of the communication types; and automatically terminate the first communication as a second communication with the first party using a second one of the communication types is initiated.

BRIEF DESCRIPTION OF THE DRAWINGS

FIG. 45 shows a contact management window of a client.

FIG. 46 shows a contact edit panel in a contact management window of a client.

DETAILED DESCRIPTION

Figure 1:
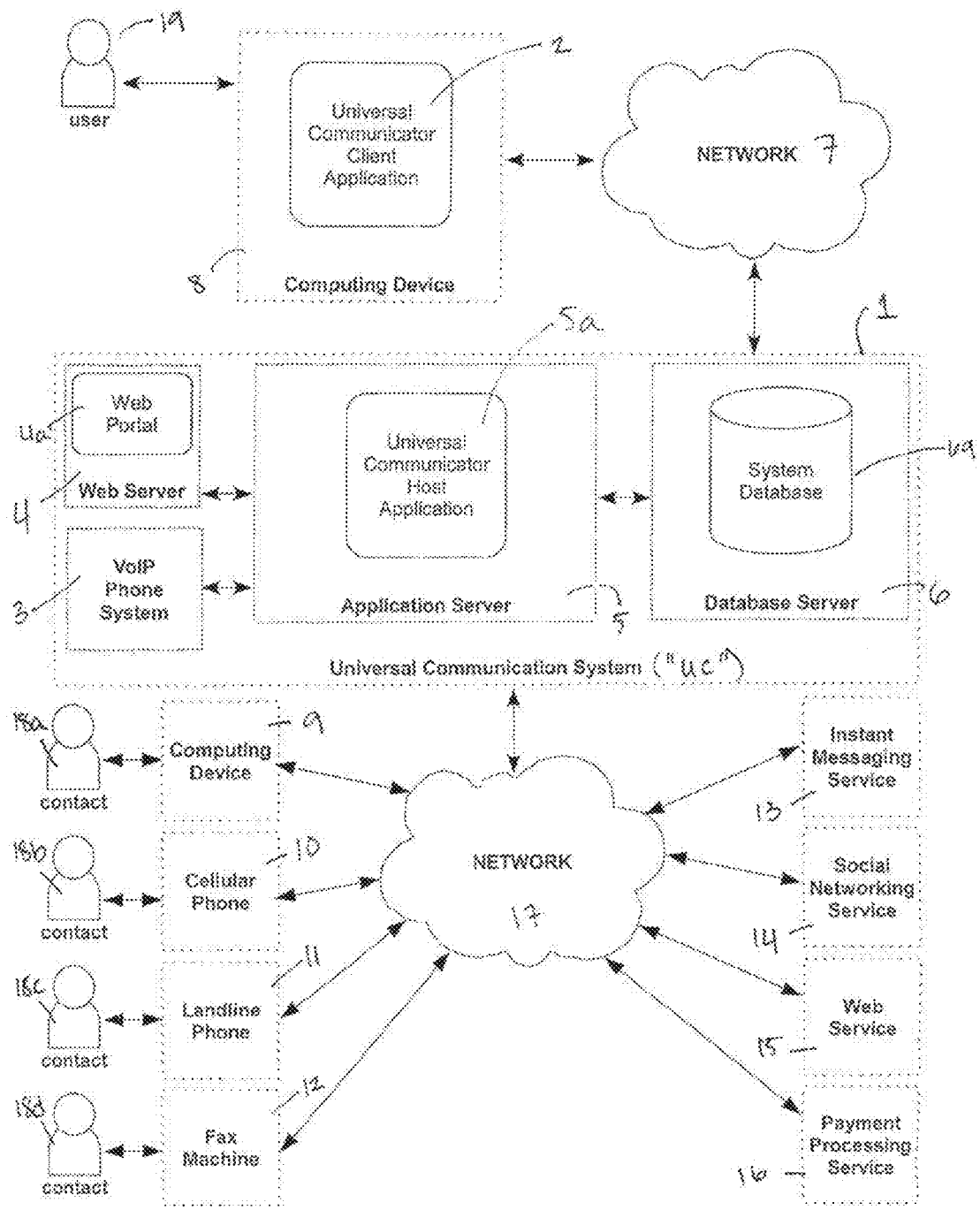
FIG. 1 is a deployment diagram of an example universal communication system.

A computer-implemented system and method for a universal communicator ("UC") is provided for unifying or aggregating one or more forms of communication, media, and information. A client having various modules may be installed on a computing device. The modules of the client may be adapted to receive and transmit communications by way of various communication methods. The client may be in direct or indirect communication with a server, which includes one or more databases and a host application having various modules and engines that facilitate communications between a user and one or more contacts associated with the user.

The UC may access various instant messaging services and social networking services to which a user belongs. Examples of instant messaging services include, without limitation, AIM, Facebook Chat, Google Talk, ICQ, Jabber, Windows Live Messenger, MySpace, Skype, and Yahoo! Messenger. Examples of social networking services include, without limitation, Facebook, MySpace, and Twitter.

Many services, software programs, and other media allow a user to have a list of contacts associated with a user—referred to as as a "contact list" or "buddy list," which may consist of friends, family, co-workers, and or any other person or entity associated with a user. The UC may require secure procedures to access the contact list. For example, a user may provide the UC with the credentials used to access the contact lists from the services. In one example, a username and a password may be required.

The UC may access one or more services, such as instant message and social networking services or electronic mail to collect contact lists using software or a combination of software and hardware. The UC may display contacts at one or more locations in a client. Displaying the contacts from each software program or service in an aggregate or unified location enables the user to more easily communicate with the contacts by eliminating the need to access the individual services separately.

The client may have contact management features, including the storage of contact information for individual contacts. Contact information includes, for example, street addresses, phone numbers, email addresses, and instant messaging screen names. Accordingly, the client may use the contact information to provide or perform various digital communications including, without limitation, telephony, instant message, text message, email, file transfer, or fax. Thus, the UC may provide a location from which users may communicate using a variety of communication options.

Examples of communication may include an inbound or outbound message, respectively, received by a user at a client or sent to a contact via the UC. Examples of communications may include voice messages, instant messages, text messages, multimedia messages, email messages, file transfers, and/or faxes. Examples of voice messages may be voice- or digital-based messages received by a recipient via a traditional landline telephone, a mobile cellular telephone, or a voice over IP (VoIP) system; voice messages may also be referred to as phone calls and voicemails. Examples of instant messages may be text-, image-, video-, or sound-based messages transmitted in real-time or substantially real-time to a computing device over any type of network. Examples of text messages may be text-based messages received and/or transmitted over cellular or mobile networks using, for example, the Short Message Service (SMS). Examples of multimedia messages may include image-, video-, or sound-based messages transmitted over cellular networks using, for example, the Multimedia Message Service (MMS). Examples of electronic mail messages (email) refer to those supported by Microsoft's Outlook and Google's Gmail. Examples of facsimile transmissions may include transmitting content on a page from one point to another. Examples of file transfers are those communications in which a file, such as a computer file, may be transferred between a user and a contact.

The UC may provide additional features relating to voice, text, and other methods of communication. The additional features may include management, transfer, direction, and forwarding of calls, text messages, and instant messages; voicemail; and automatic translation of text messages, instant messages, and email messages.

Moreover, the UC may be configured for marketing and viral marketing purposes, as discussed below.

I. OVERVIEW

FIG. 1 is a system diagram showing a UC 1 in an example. In this example, the UC 1 may be configured in a client-server architecture. The UC 1 may include a client application 2, which may be installed on a computing device 8 of a user 19 and in data communication with the UC 1 over a network 7.

In an example, the UC 1 may include a VoIP phone system 3, an application server 5 that may host an application 5A for carrying out the functions of the system, a database server 6 that may host one or more databases 6A, and a web server 4 that may host a web-based portal 4A for accessing various functions. In another embodiment, the UC 1 may include the application server 5 and application 5A and transmit and receive data from the database server 6, the VoIP phone system 3, and/or the web portal 4. In another embodiment, the UC 1 may include the client application 2.

The host application 5A may communicate with the VoIP phone system 3 to provide call-related services between the client 2 and one or more contacts or users. The databases 6A may store information relating to, for example, users and contacts 18A-D of the users 19. The web portal 4A provides, for example, registration functionality so that a user 19 may gain access to the system. The client application 2 may send requests to the application server 5 to carry the various functions, such as sending a communication to a contact. The host application 5A may receive requests from the client application 2 and executes the requested feature. The host application 5A may also communicate via one or more networks, such as network 7, with various instant messaging services 13, social networking services 14, web-based services 15, and/or payment processing services 16. Any one of the services 13, 14, 15, and/or 16 may be accessed over network 17. Similarly, the host application 5A may transmit calls, messages, faxes, and files to contacts via one or more networks.

The networks may be, for example, public switched telephone networks, mobile networks, or IP-based networks such as the Internet. It should also be understood that the UC 1 may be implemented on a network of any scale (e.g. a local area network (LAN), wide area network (WAN), metropolitan area network (MAN), personal area network (PAN), virtual private network (VPN), campus area network (CAN), regional area network (RAN), or global area network (GAN)) using wired and/or wireless technologies or a combination thereof (e.g. coaxial cable, power lines, phone lines, optical fiber, Ethernet, radio waves, microwaves, or infrared signal(s).

Those skilled in the art will recognize that the term computing device, as used herein, may refer to any device configured to process commands or operate on data, such as, a stationary computer (e.g., a desktop computer), a portable computer (e.g., a laptop or notebook computer), or a hand-held computer (e.g., a tablet computer, personal digital assistant, mobile phone, etc.). A computing device may include software, hardware, or combinations thereof. By way of example, computing device 8, computing device 9, cellular phone 10, landline phone 11, and fax machine 12 may all be considered types of computing devices and may communicate with the UC 1 over a network 17. In one example, the UC 1 may communicate with contacts 18A-D over network 17 through one or more of the computing devices. Network 17 may be similar or different from network 7. In addition, any number of contacts may have access to the network.

Figure 2:
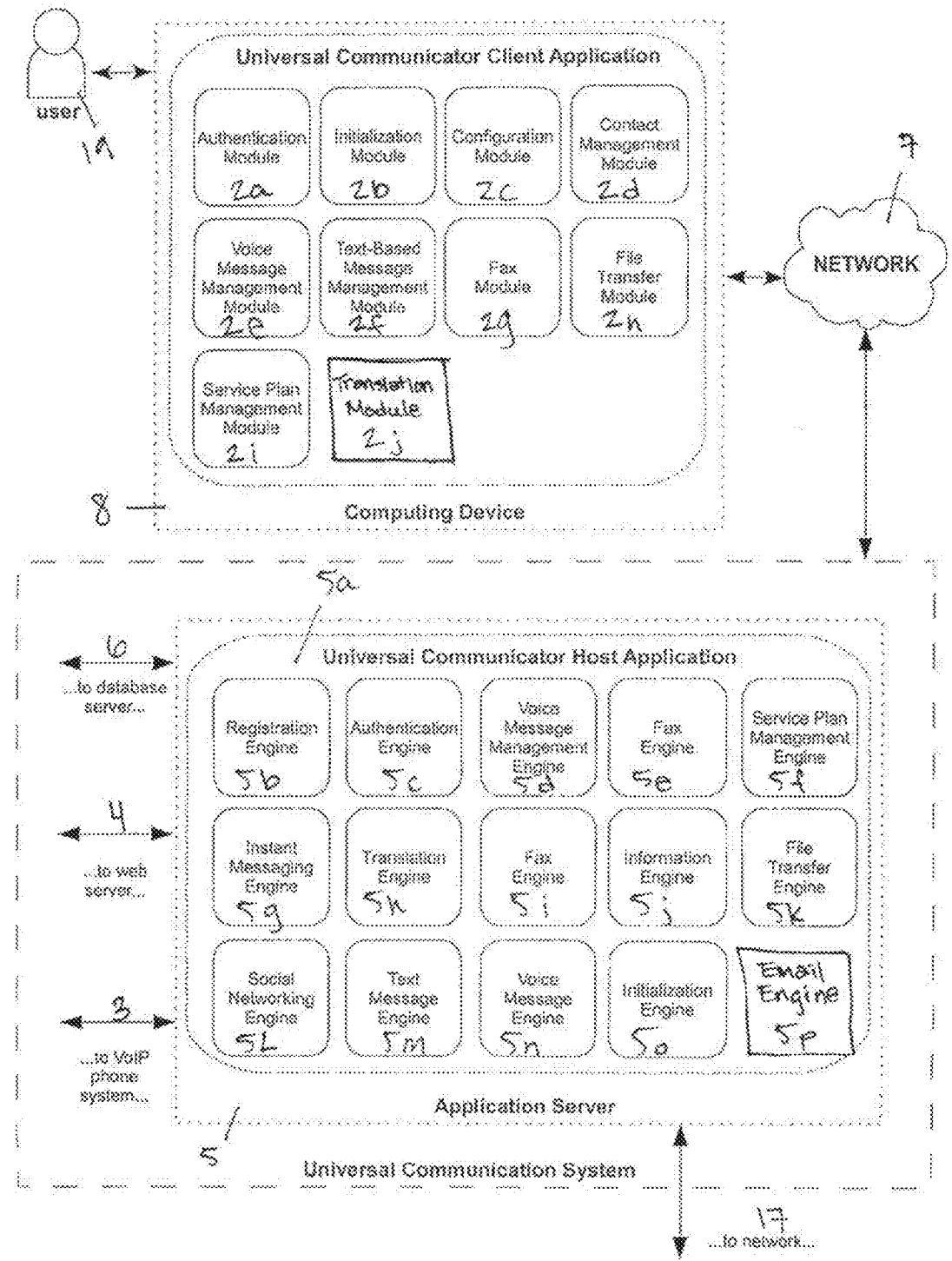
FIG. 2 is a component diagram of an example client and an example host application for a universal communication system.

Referring now to FIG. 2, the client application 2 and the host application 5A of the system include various modules and engines. Module, as used herein, refers to hardware and/or software configured at the client application 2 and/or host application 5A that are adapted to carry out particular tasks, such as making a phone call or sending a text message. Engine, as used herein, refers to hardware and/or software configured at the host application server 5 that is adapted to access various services (e.g. instant messaging services, social networking services, and web services) and/or exchange communications between a user 19 and a contact 18A-D.

The modules of the client application 2 may include: an authentication module 2A; initialization module 2B; a configuration module 2C; a contact management module 2D; a voice message management module 2E; a text-based message management module 2F; a fax management module 2G; a file transfer module 2H; a translation module 2J; and a service plan management module 2I.

The engines of the host application 5A may include: a registration module 5B; an authentication module 5C; an information engine 5D; a voice message engine 5N; a voice message management engine 5D; a text message engine 5M; an instant messaging engine 5G; a social networking engine 5L; an email engine 5P; a fax engine 5I; a file transfer engine 5K; a translation engine 5H; and a service plan management engine 5F.

Figure 3:
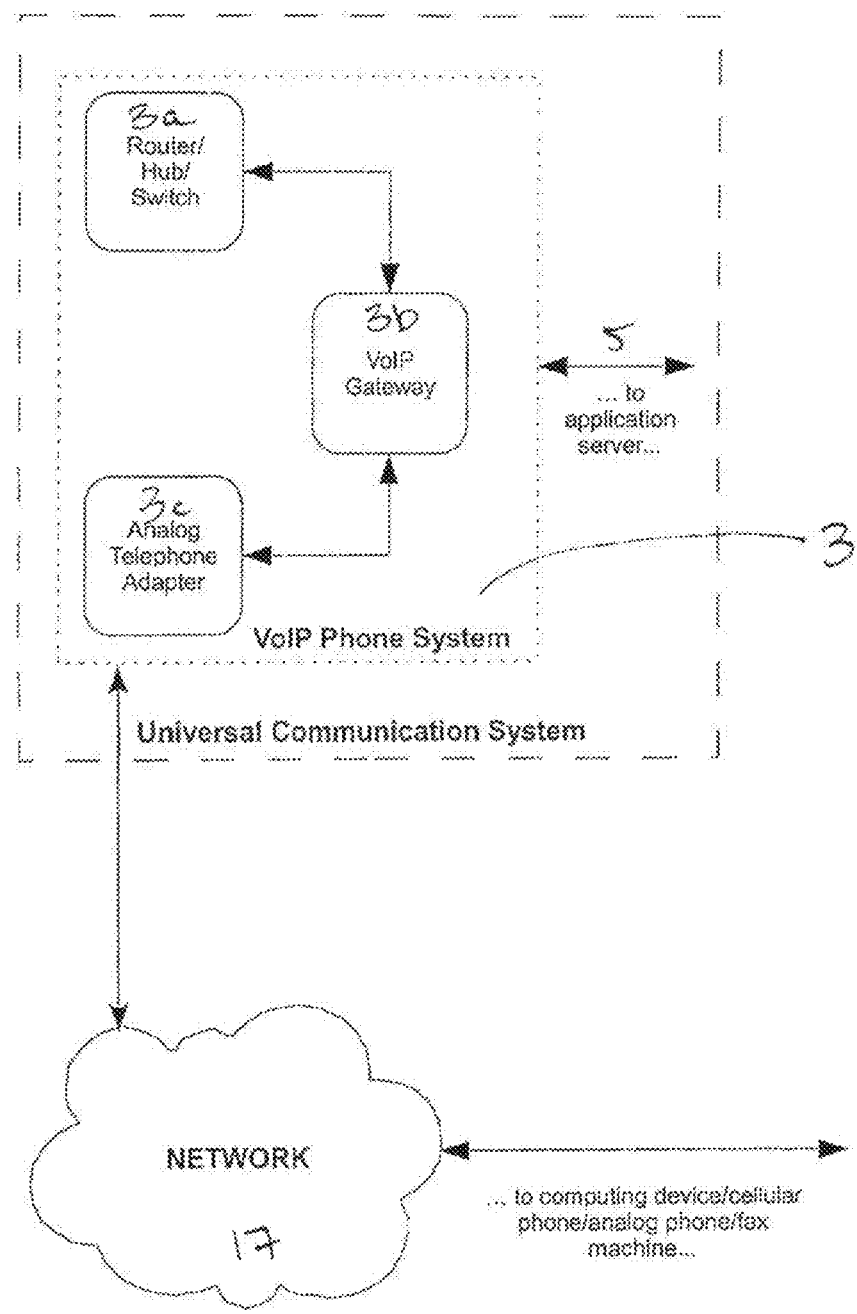
FIG. 3 is an example voice over internet protocol phone system for a universal communication system.

With reference now to FIG. 3, an example VoIP phone system 3 for is shown. The VoIP phone system may include a VoIP gateway 3B for managing inbound and outbound calls; an analog telephone adapter 3C to provide analog telephone service with traditional landline or mobile cellular phones; and a router, hub, or switch 3A to provide IP-based telephone service with other computing devices.

Figure 4:
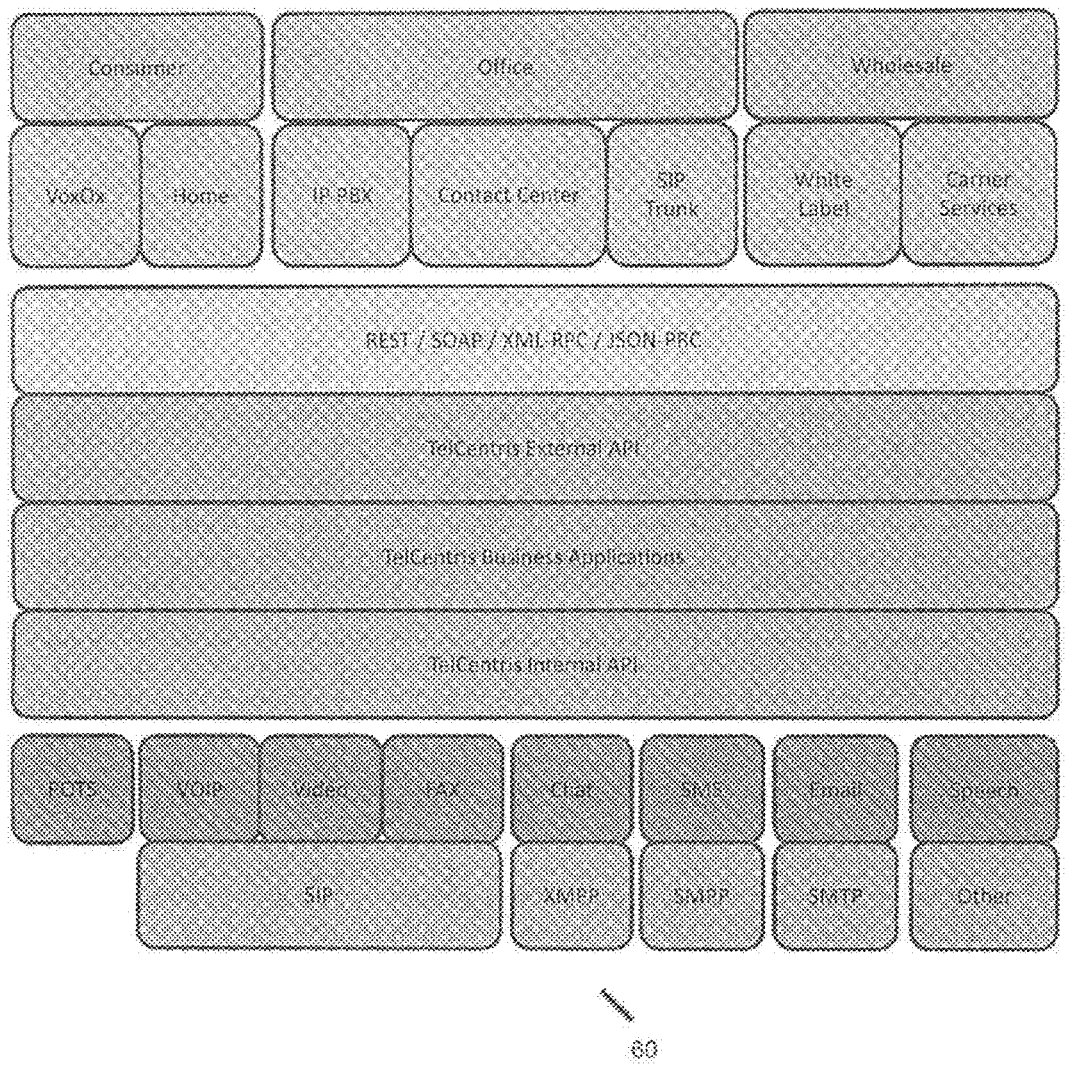
FIG. 4 illustrates an example of a Service Delivery Platform (SDP).

FIG. 4 illustrates an example of a Service Delivery Platform (SDP) 60. The SDP 60 may be adapted to write applications and programs for use with the UC 1. The SDP 60 may be a layered technology and include one or more components. In one embodiment, the SDP 60 may support Signaling System 7 (SS7) to couple to the Public Switched Telephone Network (PSTN) and provide Competitive Local Exchange Carrier (CLEC) services such as free telephone numbers and connectivity within a local area. The SDP 60 may also include support for the Session Initiation Protocol (SIP), which may provide Voice over IP (VoIP), Video, and FAX, as described herein. The SDP 60 may support the Extensible Messaging and Presence Protocol (XMPP), which provides for application, such as chat services including Google Talk, AIM, Yahoo Chat, Jabber, Facebook, and MySpace IM. The SDP 60 may also support SMPP, SMS, SMTP, and speech-based services and applications. Referring again to FIG. 4, the SDP 60 may include a multiprotocol API including support for billing, invoicing, provisioning, and call control.

An example UC will now be discussed in further detail in the context of an example database, client application, and host application implementation. It should be understood that the description of the respective configuration and implementations are by way of example only and alternative implementations are possible. For example, the engines of the host application may be embodied in multiple host applications distributed across multiple application servers in communication with multiple databases.

II. SYSTEM DATABASE

One or more databases may be configured to store user and contact information. The databases may include tables that store information relating to users and their contacts, uploaded computer files, faxes sent and received, configuration settings, and other information that may be transmitted and received over the network. The host application may query the database.

The databases may be provided as a database management system (DBMS), and, in particular, as a relation database management system (RDBMS) or an object database management system (ODBMS). Further, the database may be accessed using a database query language. Examples include such as SQL, MySQL, or Oracle.III.

III. CLIENT AND HOST APPLICATIONS

The client application may be implemented as a software application and installed on a computing device. The client application may be implemented on any suitable development platform using any suitable programming language known to those skilled in the art. For example, the client application may be developed using C++ using the QT framework by Nokia/Trolltech and/or Objective C. The server side may be developed using PHP in the Zend framework and/or PERL. The host application may similarly be implemented as a software application on any suitable development platform using any suitable programming language known to those skilled in the art. The host application may be one application installed on a single server or multiple applications installed across multiple servers in communication with each other. The host application may be installed on an application server and communicate with one or more clients operated by users of the system.

The client and the host application may communicate via HTTP service URLs. The service URL may include an address for the appropriate engine of the host application as well as any relevant information necessary to carry out a requested feature. Protocols that may be used to access the host application may include SOAP, XML, RPC, JsonRPC, and REST. The protocols may be supported through an Application Programming Interface, an example of which is shown in FIG. 4.

The client and host applications may be configured to perform the following tasks: register users; authenticate users; configure the client and operation of the system; retrieve contact lists from networking services; manage contacts; provide voice-based communication (e.g. phone calls, conference calls, video phone calls, voicemail, and the like); provide text-based communication (e.g. text messages, instant messages, and emails); fax documents; transfer files; and/or manage service plans.

Referring again to FIG. 2, the client application 2 and host application 5A may include various modules and engines to carry out the example tasks listed above. Some modules of the client may communicate with engines at the host application to carry out the tasks. For example, a client and host application may include the modules and engines listed below.

A host application 5A may include a registration engine 5B for creating new user accounts.

A client application 2 may include an authentication module 2A that communicates with an authentication engine 5C of the host application 5A to authenticate users and provide access to the UC 1.

The host application 5A may also include an initialization engine 5O to initialize a new session with the client 18 after a successful login. The initialization engine 5O may retrieve contact lists from the instant messaging 13 and social networking services 14 to which the user belongs, and may transmit those contacts to the client 18. The contents of the contact list may be displayed for the user.

A client application 2 may include an initialization module 2B for accessing the instant messaging services 13 and social networking services 14 to which a user belongs in order to retrieve contact lists from those services. The initialization module 2B may communicate with an instant messaging engine 5G and a social networking engine 5L of the host application 5A to retrieve contact lists and other information.

The client application 2 may also include a configuration module 2C for inputting client and system configuration settings. The client configuration module 2C may communicate with an information engine 5J of the host application 5A to store the configuration settings in a database.

A contact management module 2D of the client application 2 may also communicate with an information engine 5J of the host application 5A to store profile and contact information relating to one or more users or their contacts.

The client application 2 may include a voice message management module 2D to provide voice-based communications (e.g. phone calls, conference calls, video phone calls, voicemails, and the like). To send and receive phone calls, the client application may communicate with a voice message engine 5N of the host application 5A, which may also communicate with a calling system, such as VoIP phone system 3. The host application 5A may also include a voice message management engine 5D that communicates with the voice message management module 2E of for the management of voice-based messages (e.g., the recording, display, playback, and deletion of voicemail or recorded phone calls).

The client application 2 may also include a text-based message management module 2F to facilitate text-based communications. For example, the text-based message management module may communicate with a text message engine 5M of the host application 5A for sending and receiving text messages; an instant messaging engine 5G or social networking engine 5L to send and receive instant messages; or an email engine 5P for sending and receiving emails.

A fax module 2G of the client application 2 may communicate with a faxing engine 5I to send and receive faxes. The fax engine 5I may communicate with a calling system, such as the VoIP system 3, to facilitate the transmission of faxes. A fax module of the host application 5A may facilitate the storage of faxes and/or retrieval of faxes. The faxes may be displayed by the client application 2.

The client application 2 may also include a file transfer module 2H in communication with a file transfer engine 5K at the host application for uploading files, downloading files, and/or transmitting files to contacts.

The client application 2 may additionally include a translation module 2J that communicates with a host translation engine 5H that may be used to automatically translate text-based messages sent to and received at the client application 2. The host translation engine 511 may include or communicate with a translator, such as a translation web service.

Further, the client application 2 may include a service plan management module 2I for purchasing credits and service plans, which may be necessary to use certain features of the UC 1. The host application 5A may include a service plan management module engine 5F for collecting purchase and payment information for processing payments. Moreover, the service plan management module 2I, which may also have a corresponding module at the host application, may communicate with the other modules and engines of the client and host application, respectively, to monitor or track usage or adjust credits of a user accordingly.

The modules and engines of an example client and host application will now be described in more detail in the context of the tasks they are designed to perform.

A. Registration

The UC 1 may require a user 19 to register before using the system. The registration process is similar to conventional registration processes known to those skilled in the art. The universal communication system may provide a portal, such as a web page, to collect registration information from a user. Registration information may include, for example, the name, email address, mobile cellular phone number, and other profile and contact information of the user.

Figure 5:
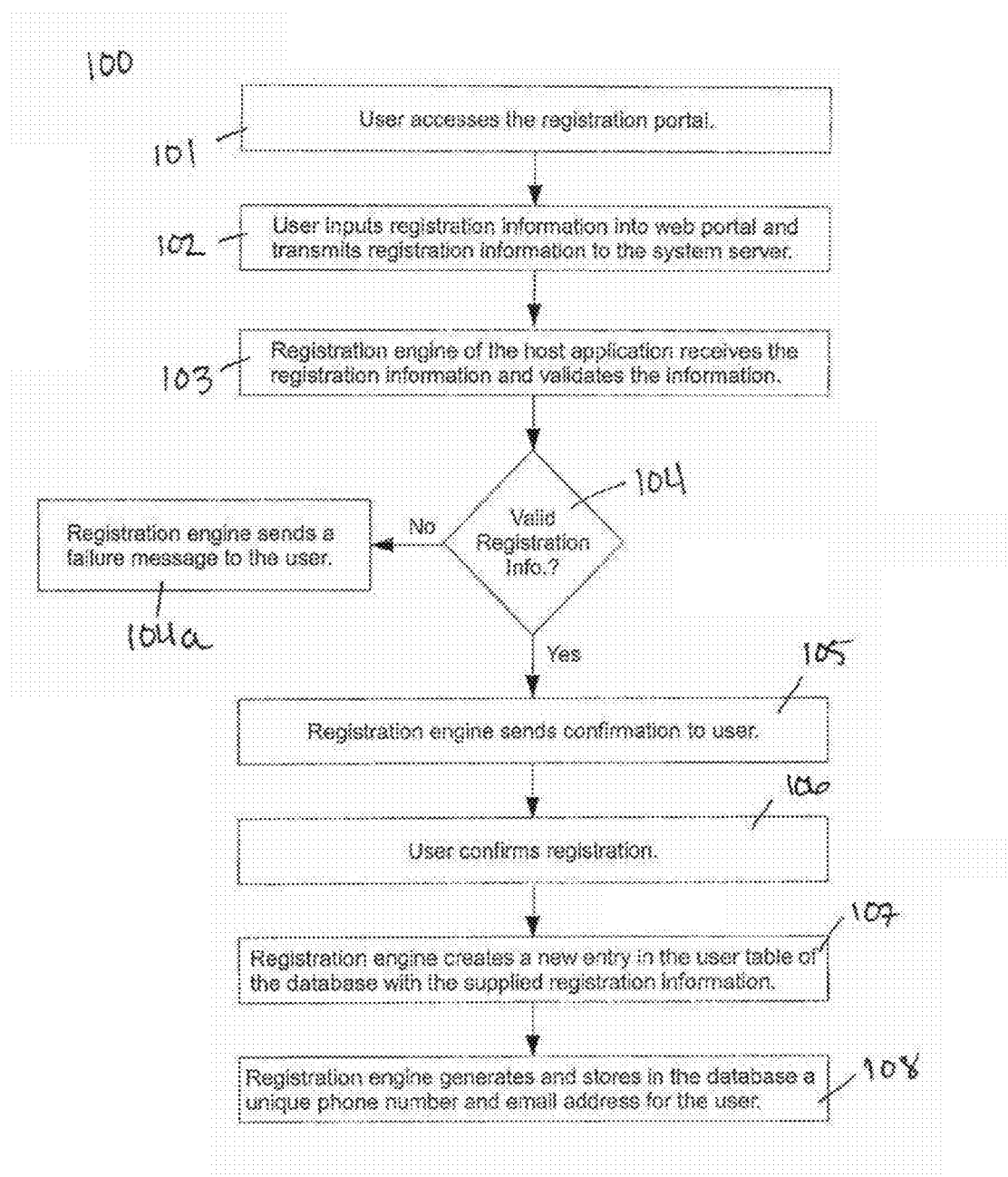
FIG. 5 is an example workflow for the registration process.

Referring now to FIG. 5, an example registration process is shown. A user may access a registration portal as shown in step 101 and select and submit login credentials such as a username and password as shown in step 102. The registration portal may be one or more web pages in communication with a web server 4. The web server 4 may be in communication with the registration engine 5B of the host application 5A which processes, validates, and stores the supplied registration information. The registration engine 5B may communicate with the database server 6 for the storage of the registration information during the registration process.

The registration engine 5B may receive the registration information from the registration portal and validates the registration information at step 104. For example, the registration module 5B may ensure that the user has provided all required information and that the information is valid (e.g. that the desired username is unique, the password contains a specific subset of characters, and that the email address is formatted properly.). In one example, an email may be sent to the user to verify ownership of the email address provided at login. In another example, SMS verification may be performed. A text message may be sent to a users' phone to verify ownership of the calling device. A code may be required to complete the verification. If the registration information is incomplete or invalid, the registration engine sends an error message to the user at step 104A. If the registration information is complete and valid, the registration engine sends a confirmation to the user at step 105. Once a user confirms the registration in step 106, the registration engine creates a new user record in the system database and stores the collected registration information in the database at step 107. In another embodiment, step 106 may be optional.

In addition to the creation of a new user record, at step 108, the registration module may select and assign a unique phone number and email address for the registered user and stores these attributes in the database. The email address created may be based on the username supplied during registration (e.g. username@xxxx.com). Because the phone number and the email address created during registration may be associated with a new user account, each may be referred to as the account phone number and the account email address.

The account phone number and account email address may be used during the operation of the UC 1 to send and receive communications. For example, a registered user may receive an account phone number of 123-555-0000 and an account email address of user@xxxx.com. Phone calls and text messages originating at the client application 2 may be associated with the account phone number. Similarly, phone calls and text messages to the account phone number will be received at the client application 2. Likewise, emails sent from the client application 2 may be associated with the account email address, and emails sent to the account email address may be received at the client application 2.

B. Authentication

The authentication module 2A of the client application 2 may receive and submit to the host application 5A login credentials (e.g. username and password) of a user to begin a new login session. The authentication engine 5C of the host application 5A may validate and/or authenticate the received login credentials with the login credentials stored in the system database. If the received login credentials match the stored login credentials, a new login session is created. In one example, the validation may include the return of an encrypted XML file containing SIP (VoIP and IM login data). The contact list may be populated.

Figure 6:
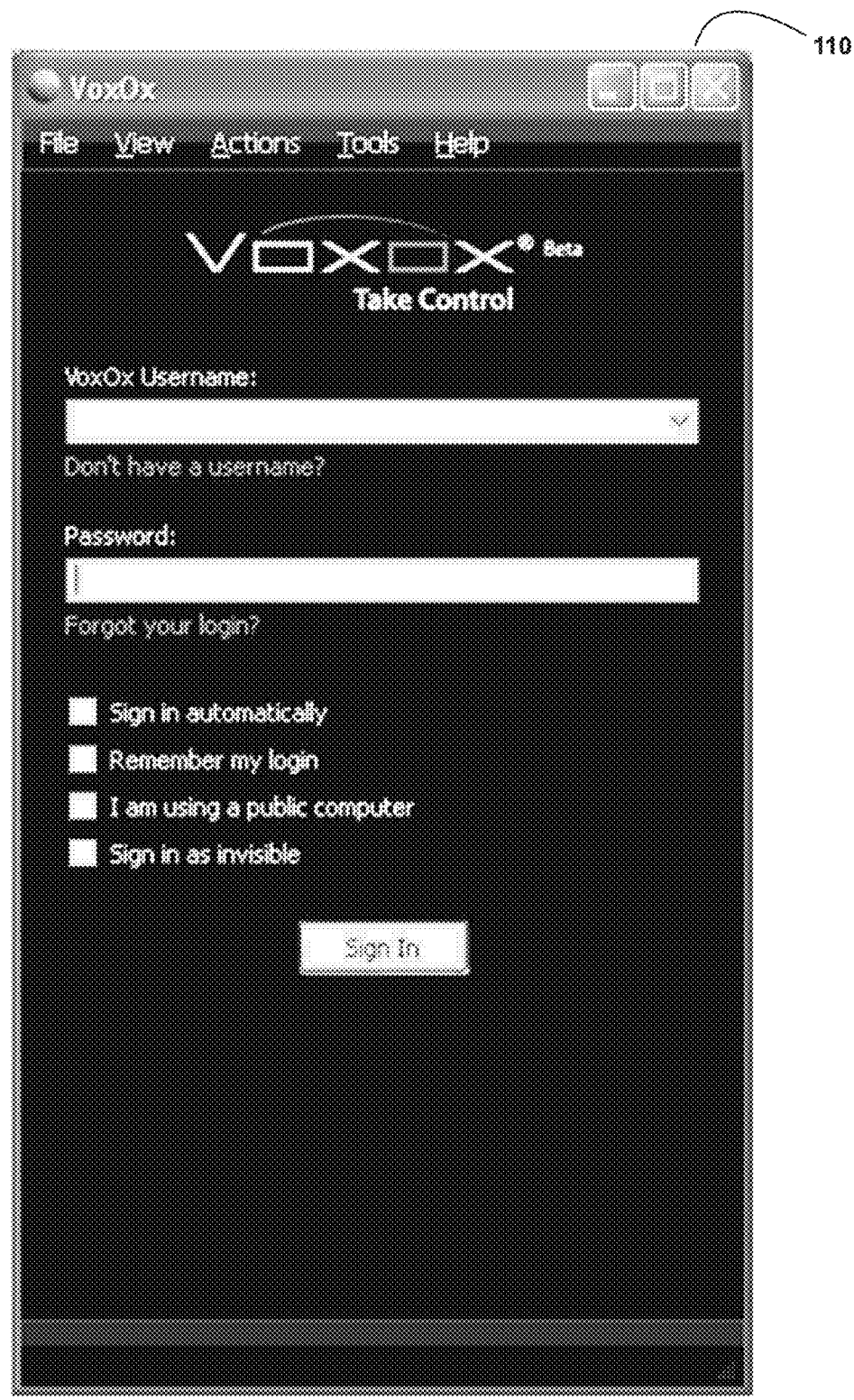
FIG. 6 is an example login window for a client.
Figure 7:
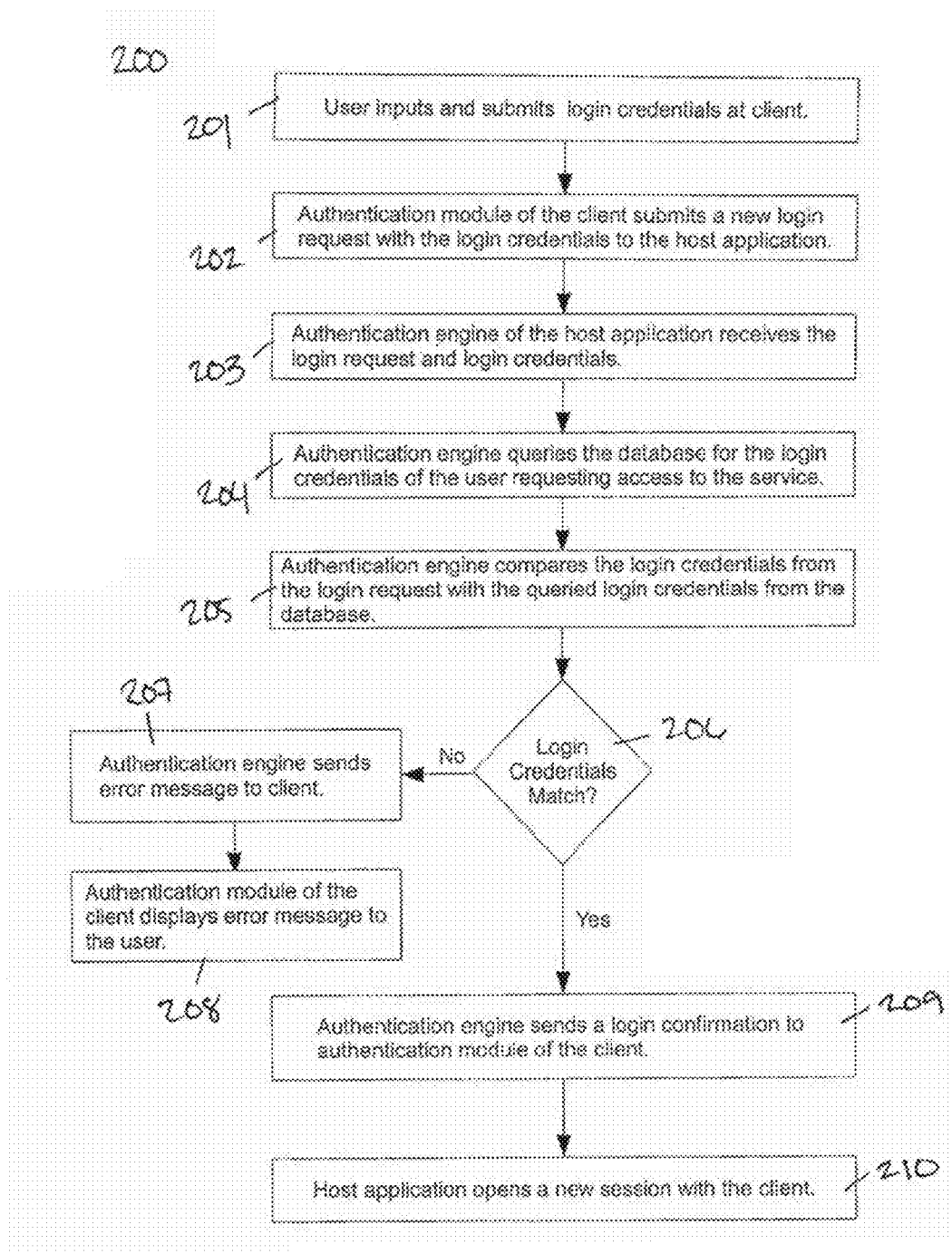
FIG. 7 is an example workflow for the authentication process.

Now referring to FIG. 6 and FIG. 7, an example login window 110 and authentication process 200 are shown. To login, the client application 2 presents a login window 110 as seen in FIG. 6. The login window may include data input elements, such as text boxes, to receive the user login credentials (e.g. username and password). A user may submit the login credentials via a submit button.

Figure 8:
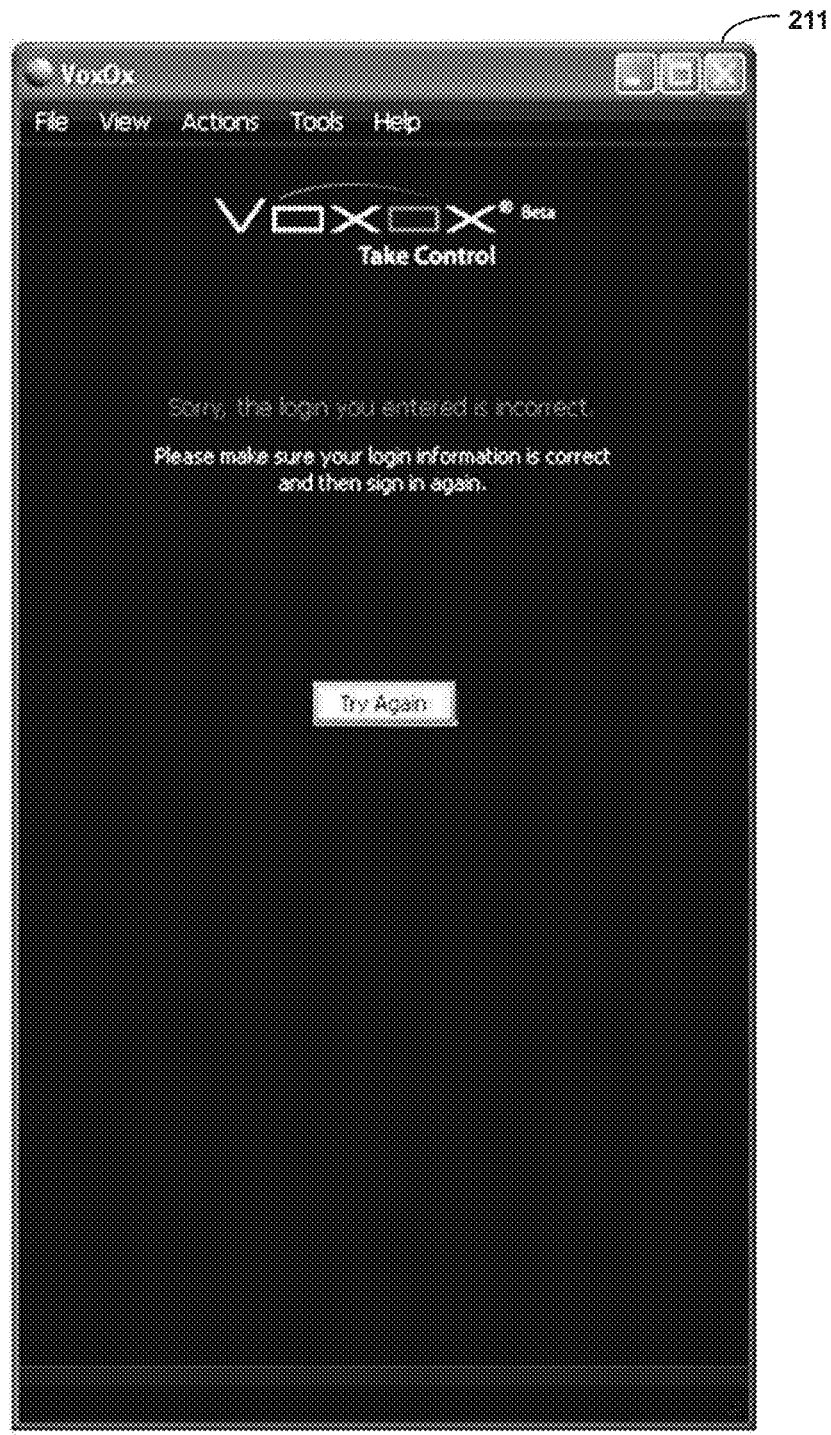
FIG. 8 is an example of a window if the login fails.

An example login and authentication process 200 is shown in FIG. 7. At step 201, a user inputs and submits login credentials at the login window as described above. Upon submission of the login credentials, the authentication module submits a login request containing the login credentials to the authentication engine of the host application as shown in step 202. At step 203, the authentication engine receives the login credentials submitted at the client. The host application then, at step 204, queries the database for the stored login credentials of the user and compares queried login credentials with the supplied login credentials at step 205 to determine if a match exists at step 206. If the login credentials do not match, the authentication engine may transmit a failure message to the client as seen in step 207, which may then be displayed to the user in step 208. If the login credentials match, the authentication engine may transmit a login success message to the client at step 209. Finally, in step 210, the host application opens a new session with the client during the initialization process. FIG. 8 shows a window if the login in not successful.

C. Initialization

Figure 9:
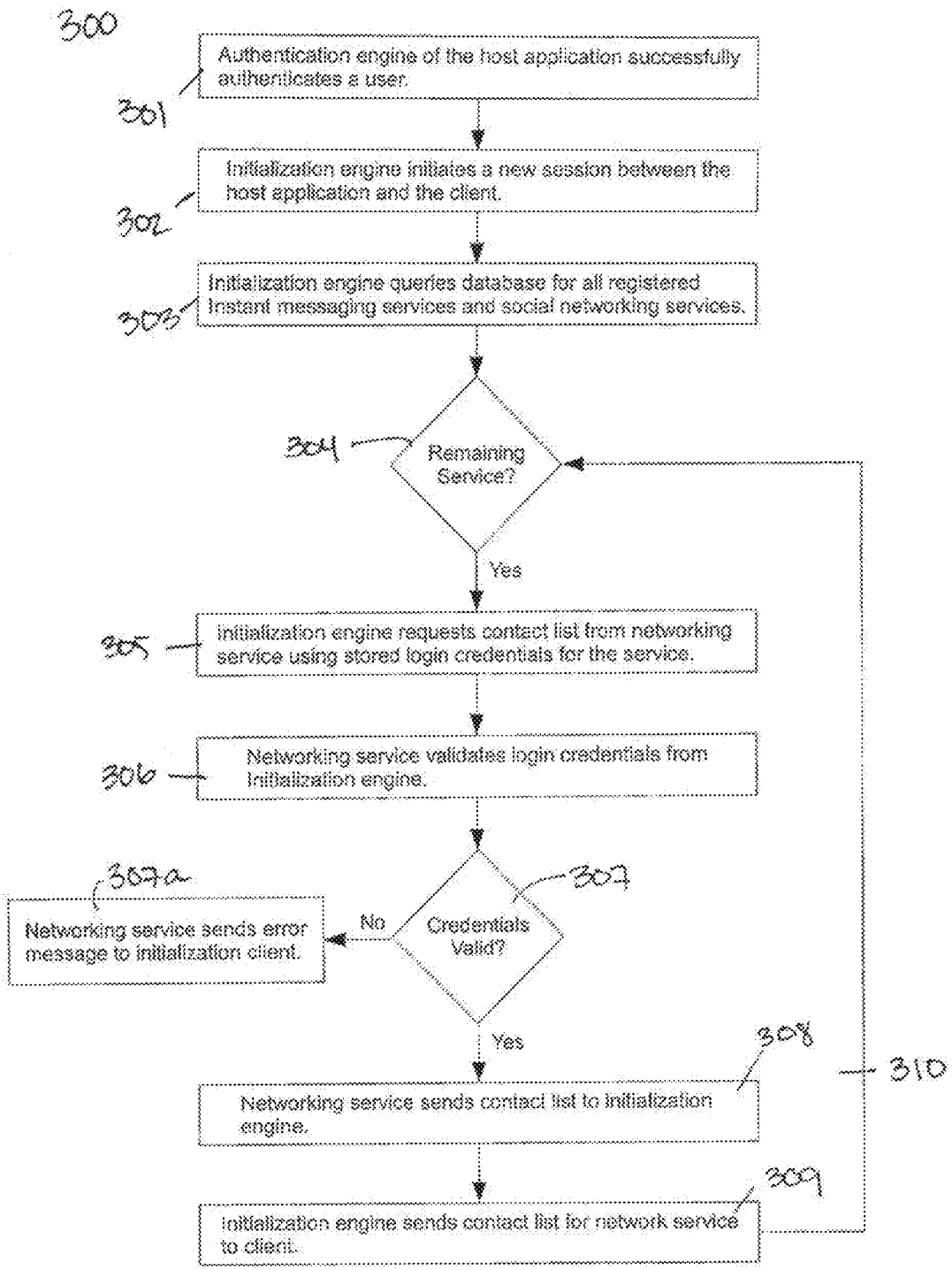
FIG. 9 is an example workflow for the initialization process.

After a successful login authentication, the initialization module 2B executes an initialization process. An example initialization process 300 is shown in FIG. 9. The initialization engine creates a new session with the client at step 302, following a successful authentication in step 301. The initialization engine then, in step 303, queries the database for the instant messaging and social networking services the user has configured the system to access. The configuration process will be described in further detail below.

The database supplies the initialization engine with a result set containing the services to access and the login credentials for those services. At step 304, the initialization engine checks the result set for remaining services to access. If there are remaining services to access, the initialization engine requests the contact list from the instant messaging service or social networking service using the login credentials stored for that service at step 305. The service then validates the login credentials at step 306. If the login credentials are invalid at step 307, the service sends the initialization engine an error message at step 307A. If the login credentials are valid, the service sends the contact list for the user to the initialization engine at step 308, which then sends the contact list to the client application at step 309. Finally, the initialization engine returns to step 310 to determine if there are any remaining services to access.

D. Client Interface

The client interface may include various windows, navigational elements, command input elements, and data input and output elements for receiving commands and data from a user and displaying information and messages to a user. The navigation, command input, and data input and output elements may include, for example, buttons, menus, panels, tabs, check boxes, lists, text boxes, icons, labels, scrollbars, and other user interface elements.

Figure 10:
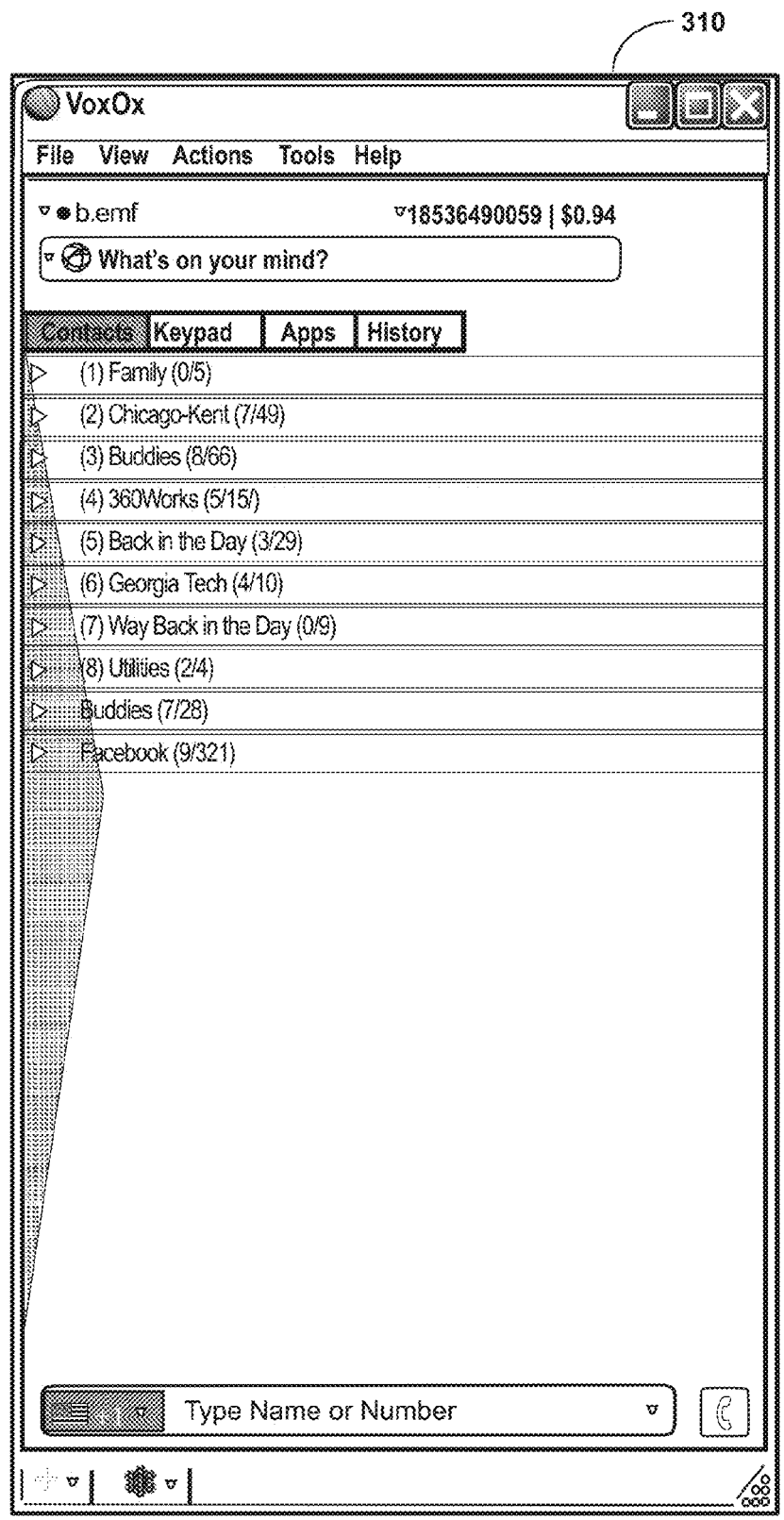
FIG. 10 is an example main window of a client.

An example client interface is described below and shown in the accompanying Figures. Following a successful authentication and initialization, the client may display a main window 310 to a user as seen in FIG. 10. The main window 310 may include a main panel that includes a menu bar and a series of tabs for navigating the client.

The menu bar may include a set of menu options, which may further include one or more sets of sub-menu options. An example hierarchy of menu options and sub-options is listed in FIG. 10. The tabs of the main panel may include, for example, a contacts tab, a keypad tab, an applications tab, and a history tab. The menu options and tabs may be used to navigate the client and/or carry out the features of the system.

1. The Contacts Tab

Figure 11:
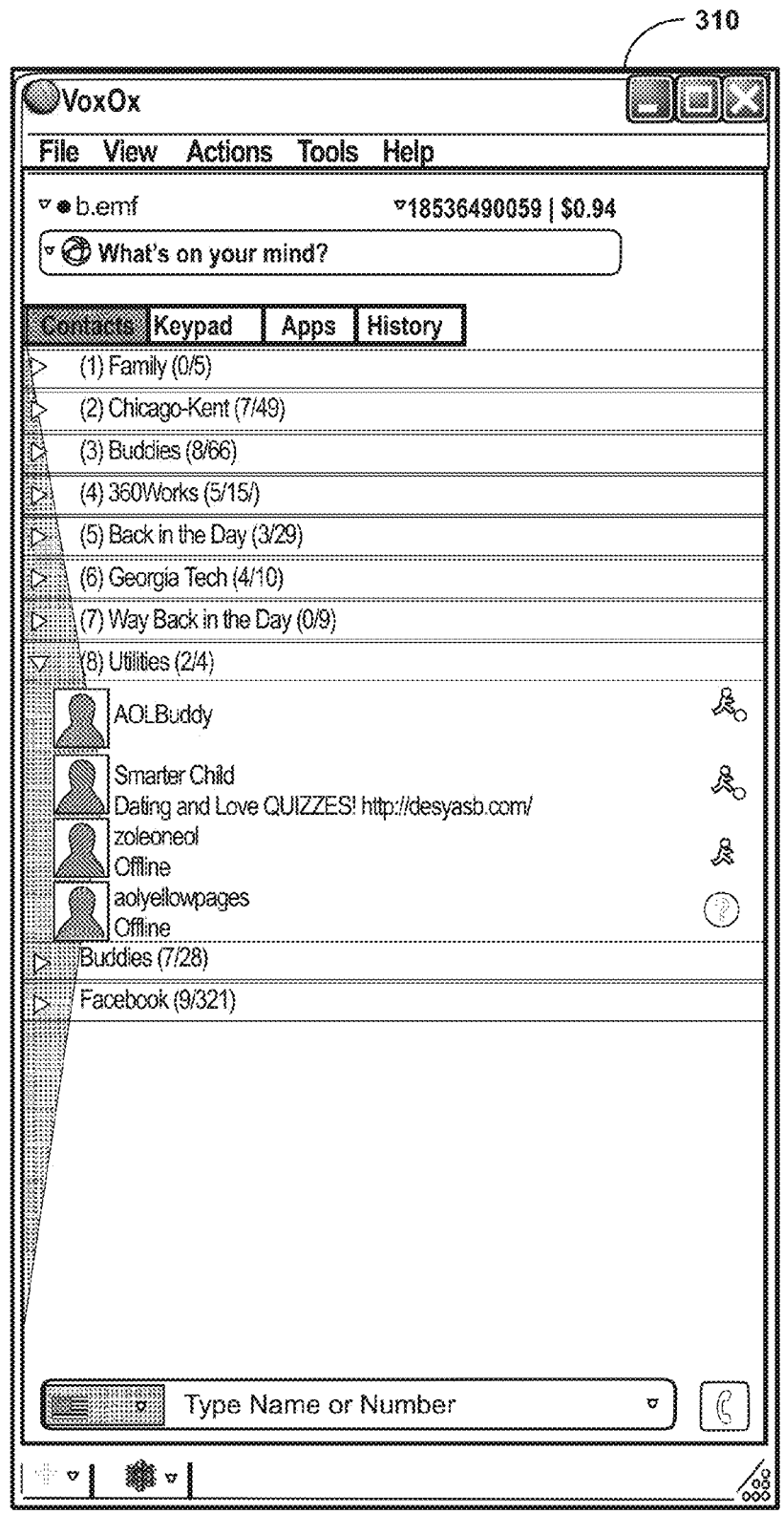
FIG. 11 shows an example contact list panel in a main window of a client.
Figure 12:
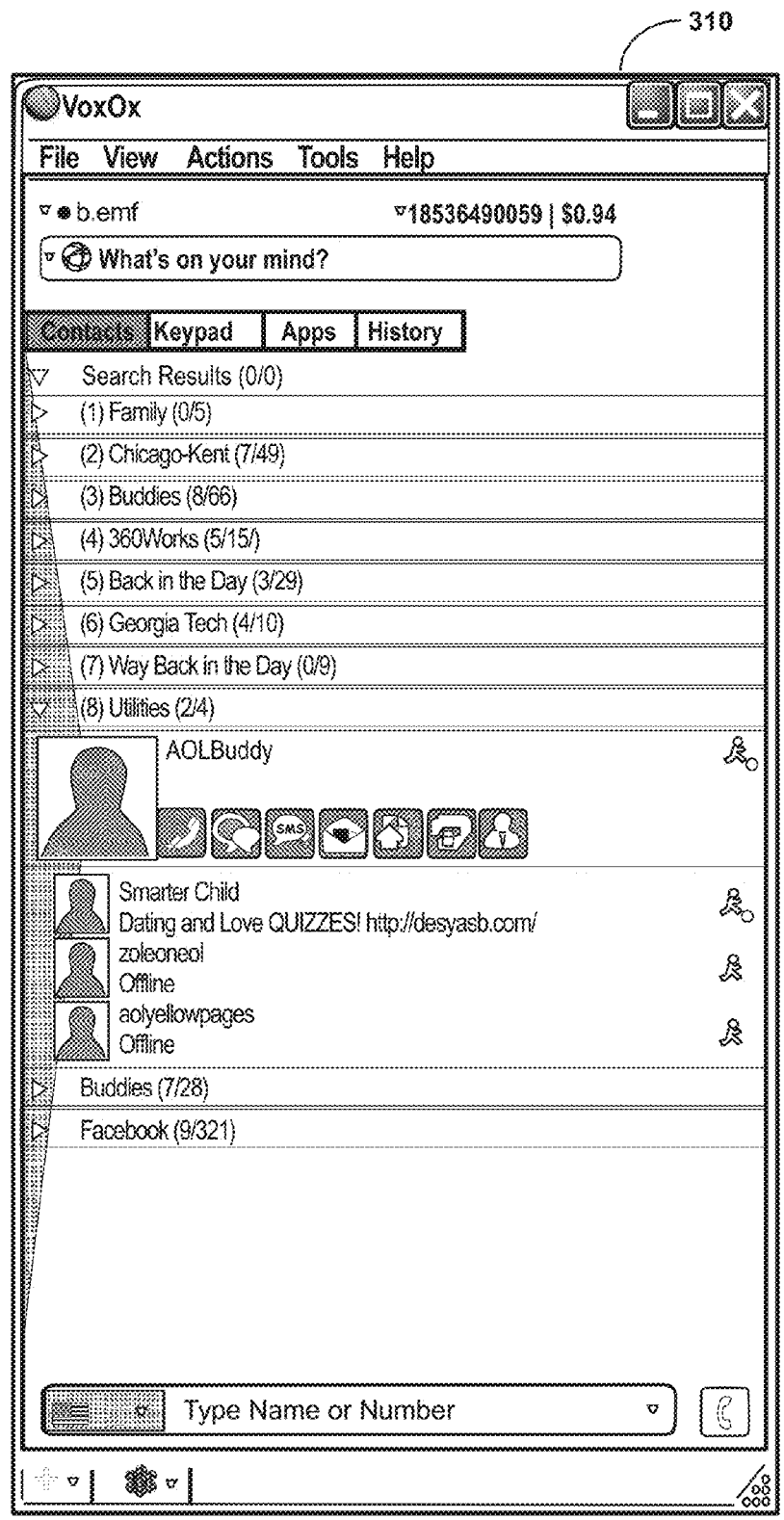
FIG. 12 shows an example contact options embedded panel for a contact in a contact list.
Figure 13:
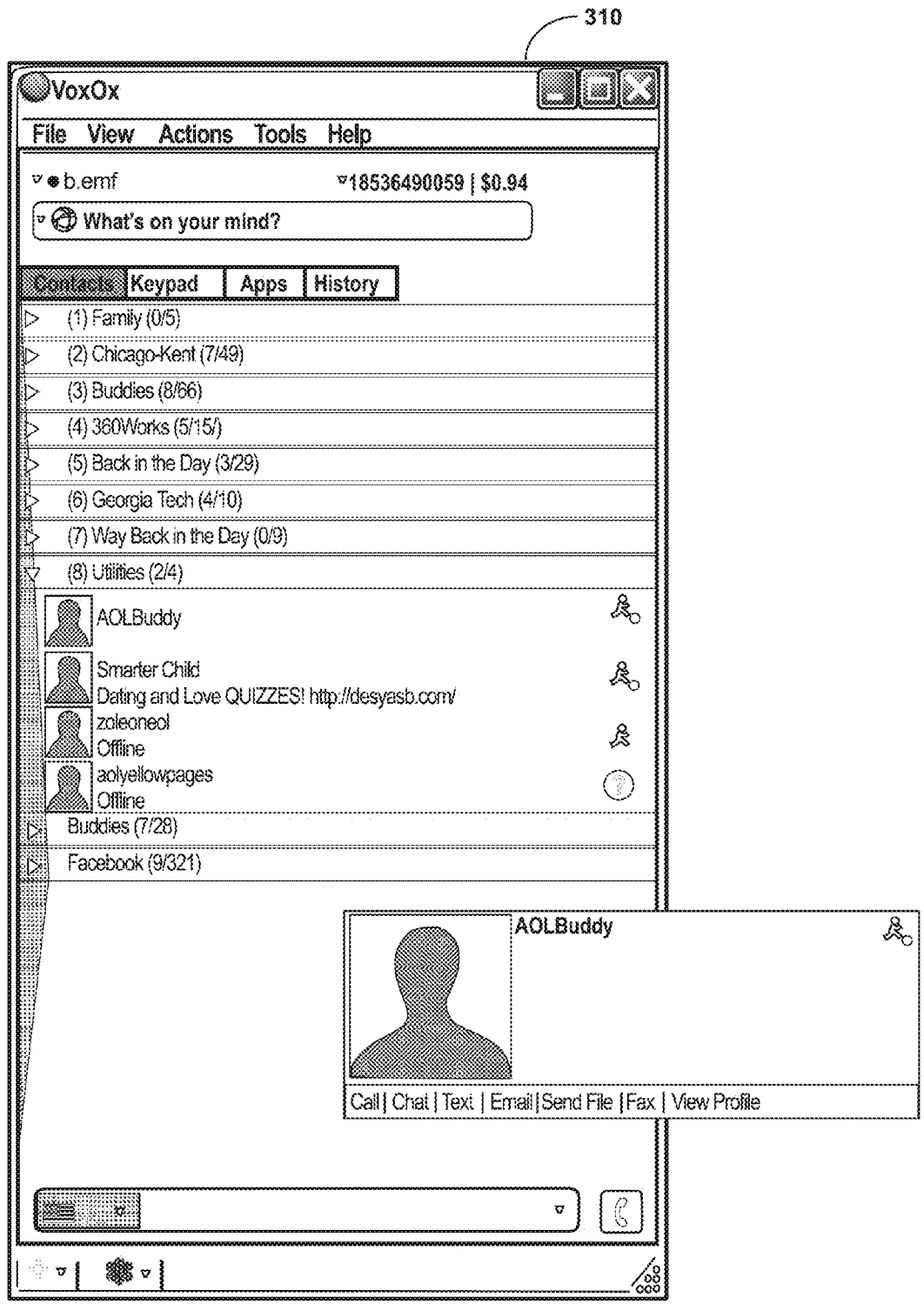
FIG. 13 shows an example contact options hovering panel for a contact in a contact list.

The contacts tab displays the contact lists of a user, which were retrieved by the system during the initialization process. As seen in FIG. 10, the contacts of a user may be organized in groups according to the instant messaging or social networking service to which the contact belongs. Each group may be collapsed or expanded to respectively hide or display the contacts belonging to that group as shown in FIG. 11. A user may select a contact or hover a cursor over the contact in the list to display a set of communication options. The communications options may include: initiating a phone call; sending a text message; sending an instant message; sending an email; sending a fax; or sending a file to the contact. Selecting a contact in the list may display an option panel directly in the list of contacts as shown in FIG. 12. The option panel may include buttons for initiating a communication with the selected contact. Alternatively, a user may simply hover a cursor over a contact in the list to display next to the main window an option panel having buttons to select a communication method as seen in FIG. 13.

Figure 14:
FIG. 14 is an example message window for a client.

Selecting a communication method may display a message window. An example message window is shown in FIG. 14. The message window may include a panel that lists the contacts with which a user is currently communicating; a message panel for inputting and displaying messages; and a button panel having buttons to initiate a new type of communication with the current contact.

Figure 15:
FIG. 15 shows an example phone call status panel for a message window.

Selecting a contact entry from the current contact list of the message window may display the conversation with the selected contact in the message panel. For phone calls, the message panel may display a phone call status panel as seen in FIG. 15. The phone call status panel includes buttons to end the phone call, place the contact on hold, mute the call, transfer the call, or display a keypad.

Figure 16:
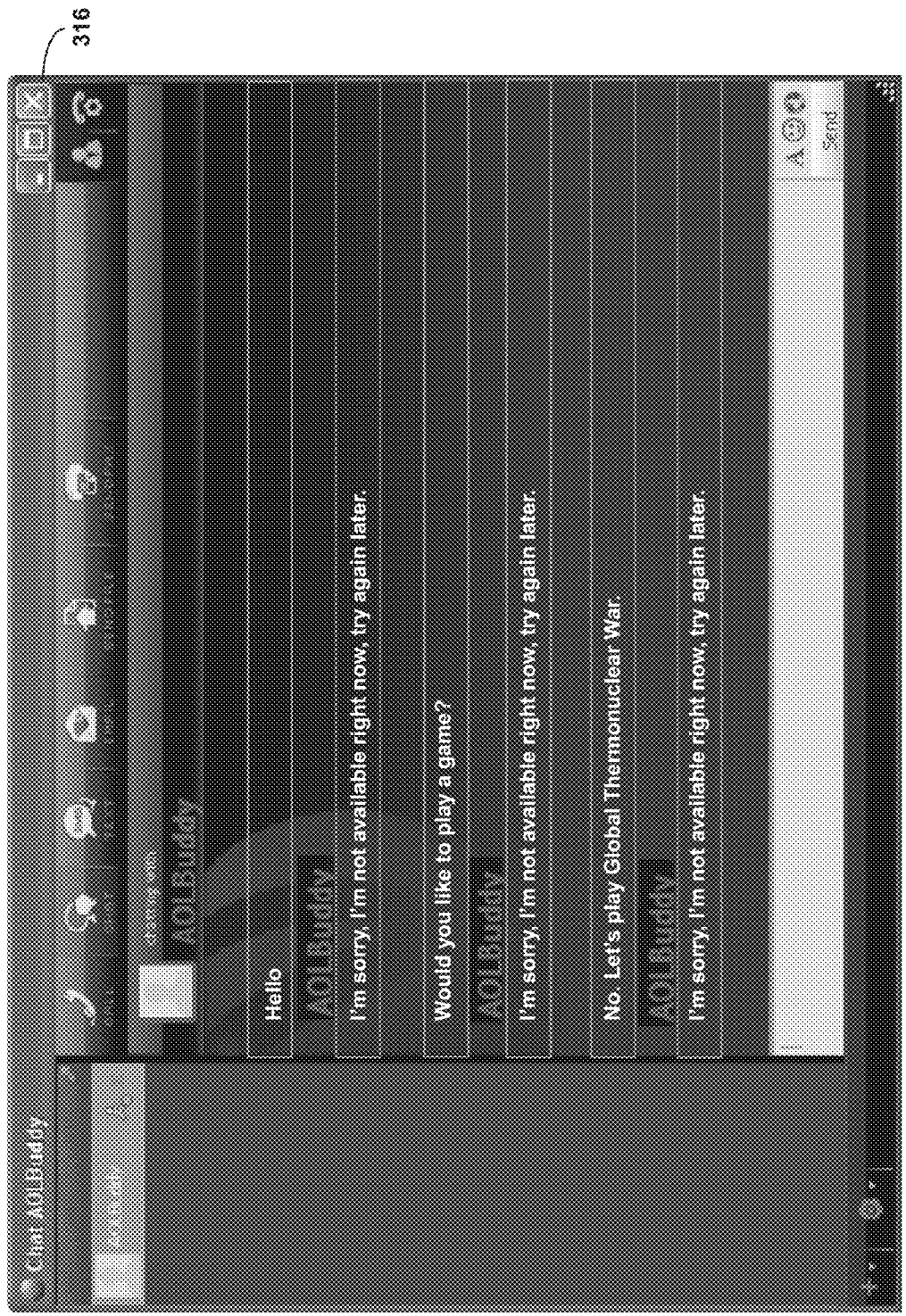
FIG. 16 shows an example text-based message panel for a message window.
Figure 17:
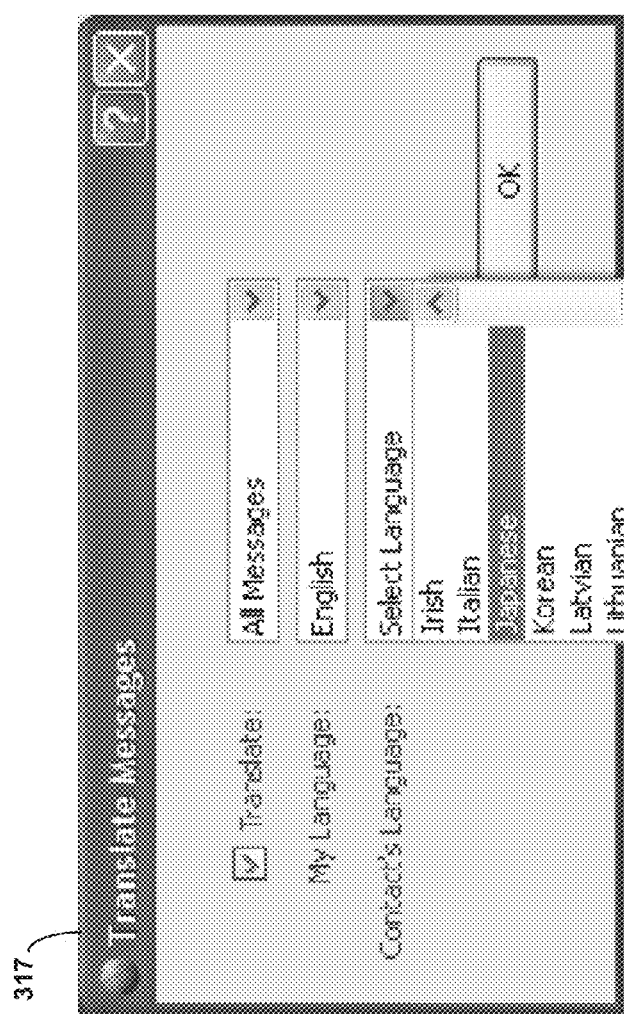
FIG. 17 is an example translation settings interface for a client.
Figure 18:
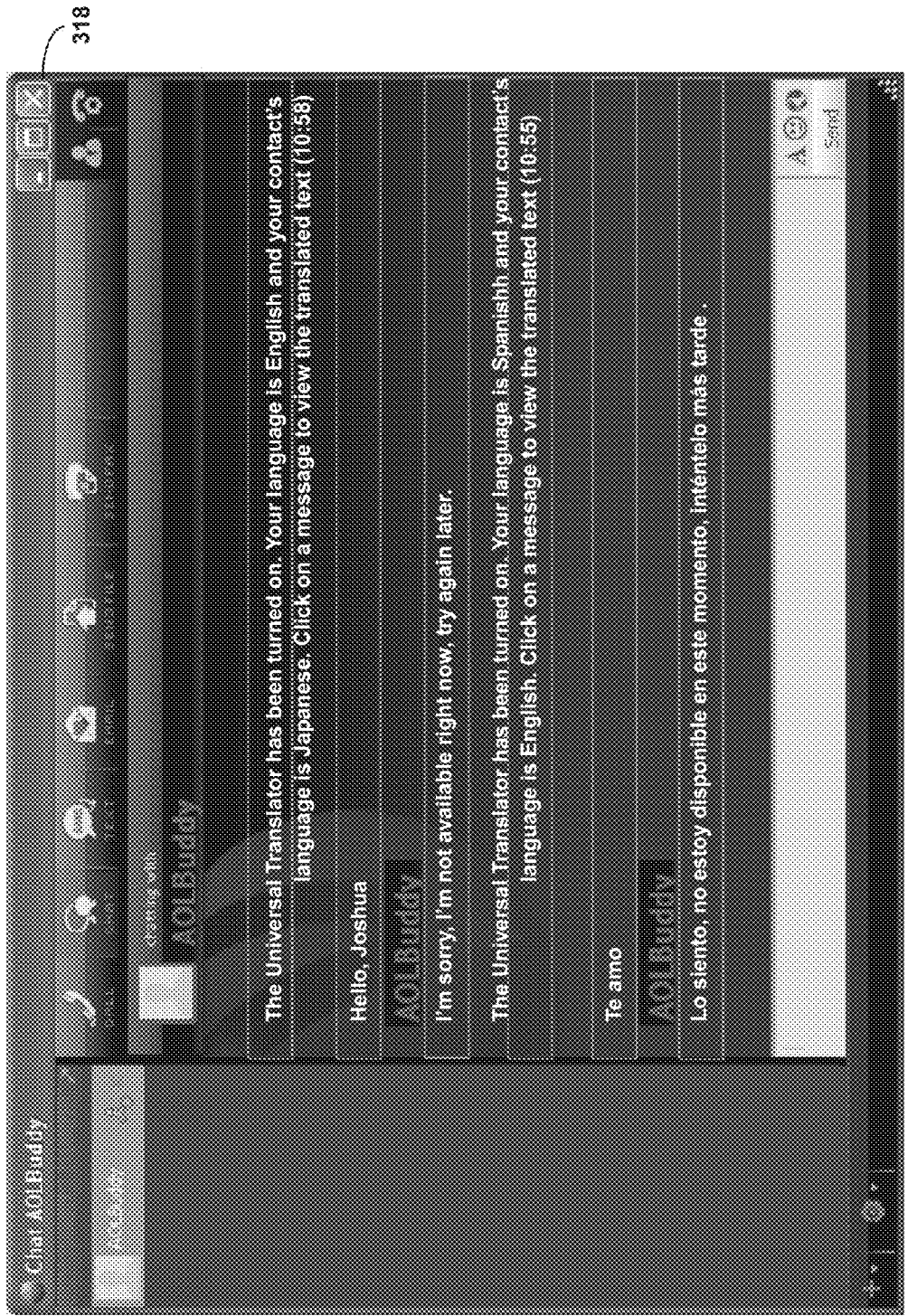
FIG. 18 shows an example text-based message panel having translated messages with the un-translated message hidden.
Figure 19:
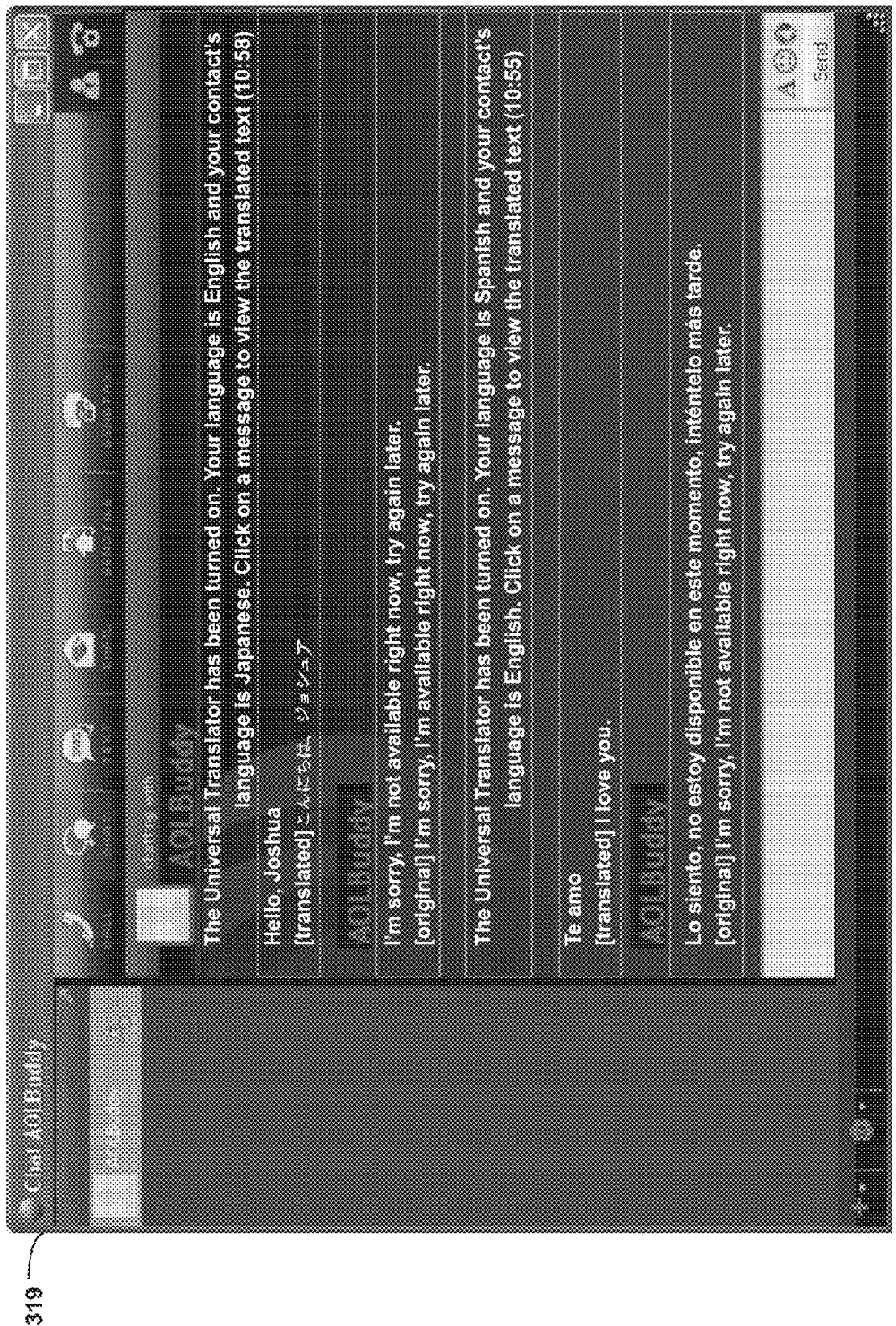
FIG. 19 shows an example text-based message panel having translated messages with the un-translated message displayed.

For text-based messages, the message panel may display a sequence of messages sent from and received at the client application as seen in FIG. 16. The text-based message panel also includes an interface element (e.g. a button) to translate inbound and outbound text-based messages. Selecting the translation button may display a translation settings panel as seen in FIG. 17, which may include interface elements to set the translations options. If translation is enabled, the text-based message window may display the translated text-based message to the user as seen in FIG. 18. The displayed message may also include an interface element to display the un-translated message as it was originally sent as seen in FIG. 19.

Figure 20:
FIG. 20 shows an example fax panel for a message window.
Figure 21:
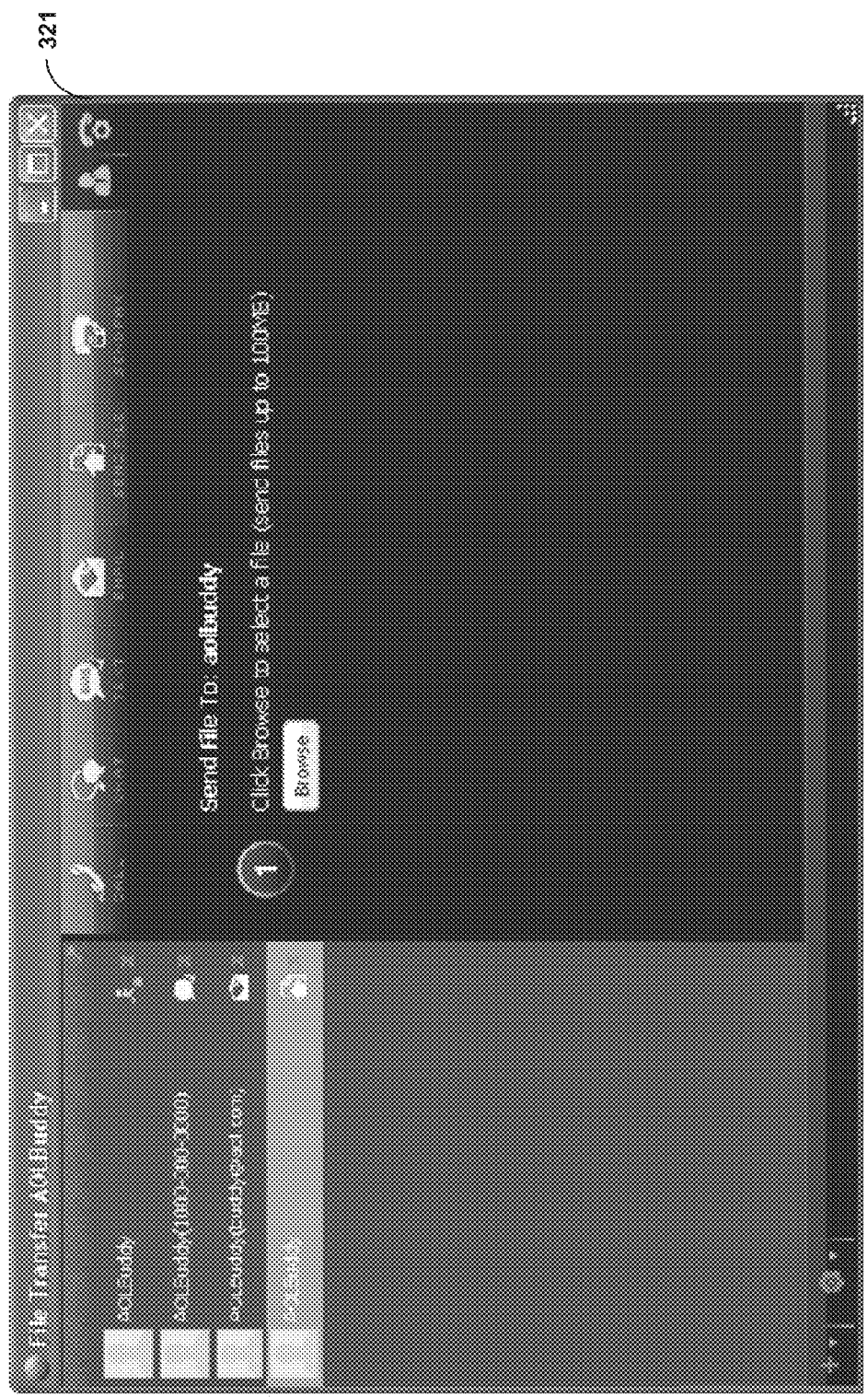
FIG. 21 shows an example file transfer panel for a message window.
Figure 22:
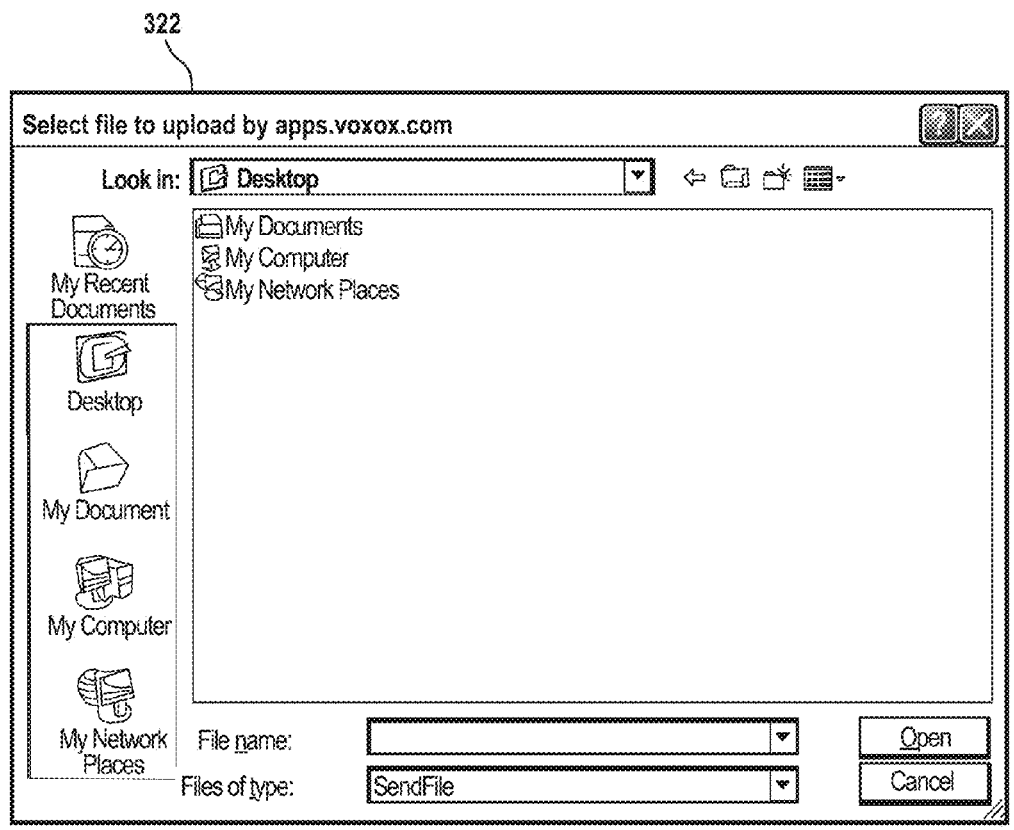
FIG. 22 shows an example file selector interface for a message window.

For faxes, the message panel may display input elements to select and submit a fax and information for a cover page as seen in FIG. 20. For file transfers, the message panel may display input elements to select and upload a file as seen in FIG. 21. When transmitting a fax or a file transfer, the client may display to the user a file selection interface as seen in FIG. 22.

Referring again to FIG. 14, the button panel of the message window may include buttons to initiate the following types of communications: phone calls; text messages; instant messages; emails; faxes; and file transfers. Selecting a button from the button panel initiates a new communication with the current contact according to the selected method. For example, a user currently communicating with a contact via instant message may select the text message button to send a text message to the contact.

2. The Keypad Tab

Figure 23:
FIG. 23 shows an example keypad panel in a main window of a client.

The keypad tab in the example shown in FIG. 23 displays a panel that includes a dialing pad having buttons for dialing a phone number. Once a number has been dialed, a user may select a button to place a phone call, send a text message, or send a fax to the dialed number. The keypad panel also includes buttons to navigate to voicemail, redial the last phone number, view calling rates, or initiate a conference call.

Selecting the redial button may automatically dial the last number entered by the user with the keypad. Selecting the callings rates button may display, in a web page for example, the rates for calling various countries with the system. Selecting the conference call button displays a panel in which a user may enter two phone numbers to initiate a 3-way conference call. Like a 2-way phone call, a message window displays a phone call status panel for each contact participating in the call.

3. The Applications Tab

Figure 24:
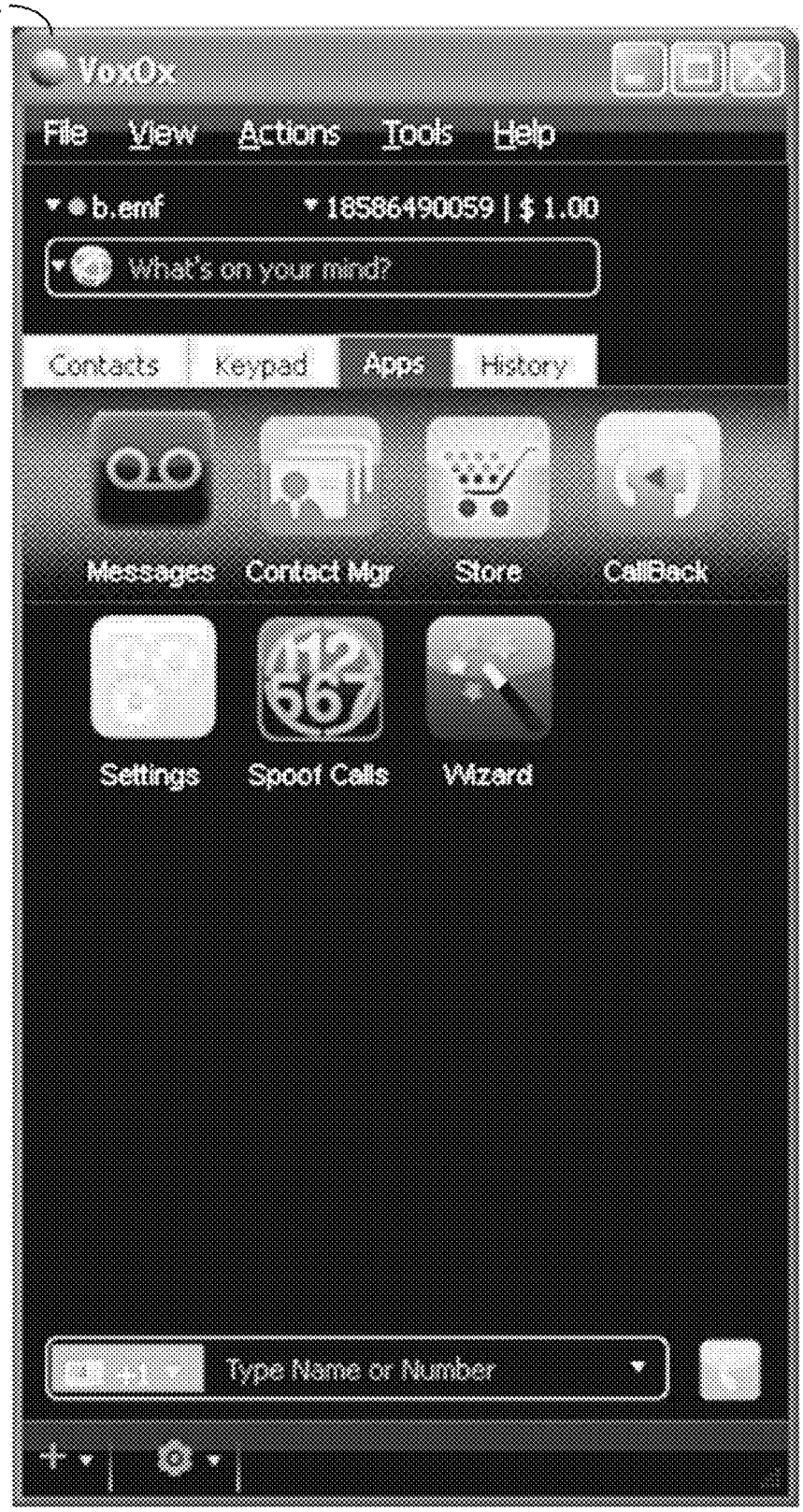
FIG. 24 shows an example applications panel in a main window of a client.

The applications tab includes an application panel having a series of buttons to navigate and initiate features of the system. An example application panel of the applications tab is seen in FIG. 24 includes buttons to navigate to a setup manager, a settings manager, a contact manager, a message manager, a call-back manager, a caller identification manager, and a service plan manager.

i. The Setup Manager

The setup manager button of the applications tab may display a configuration window that steps through a series of setup panels to gather configuration information from a user. The configuration panels may exhibit navigation elements to move back and forth between the configuration panels of the configuration window. As seen in FIG. 25 through FIG. 31, the configuration panels may include: a service selection panel; various service configuration panels; a phone setup panel; an assistant setup panel; panels for audio and video setup; and a profile panel.

Figure 25:
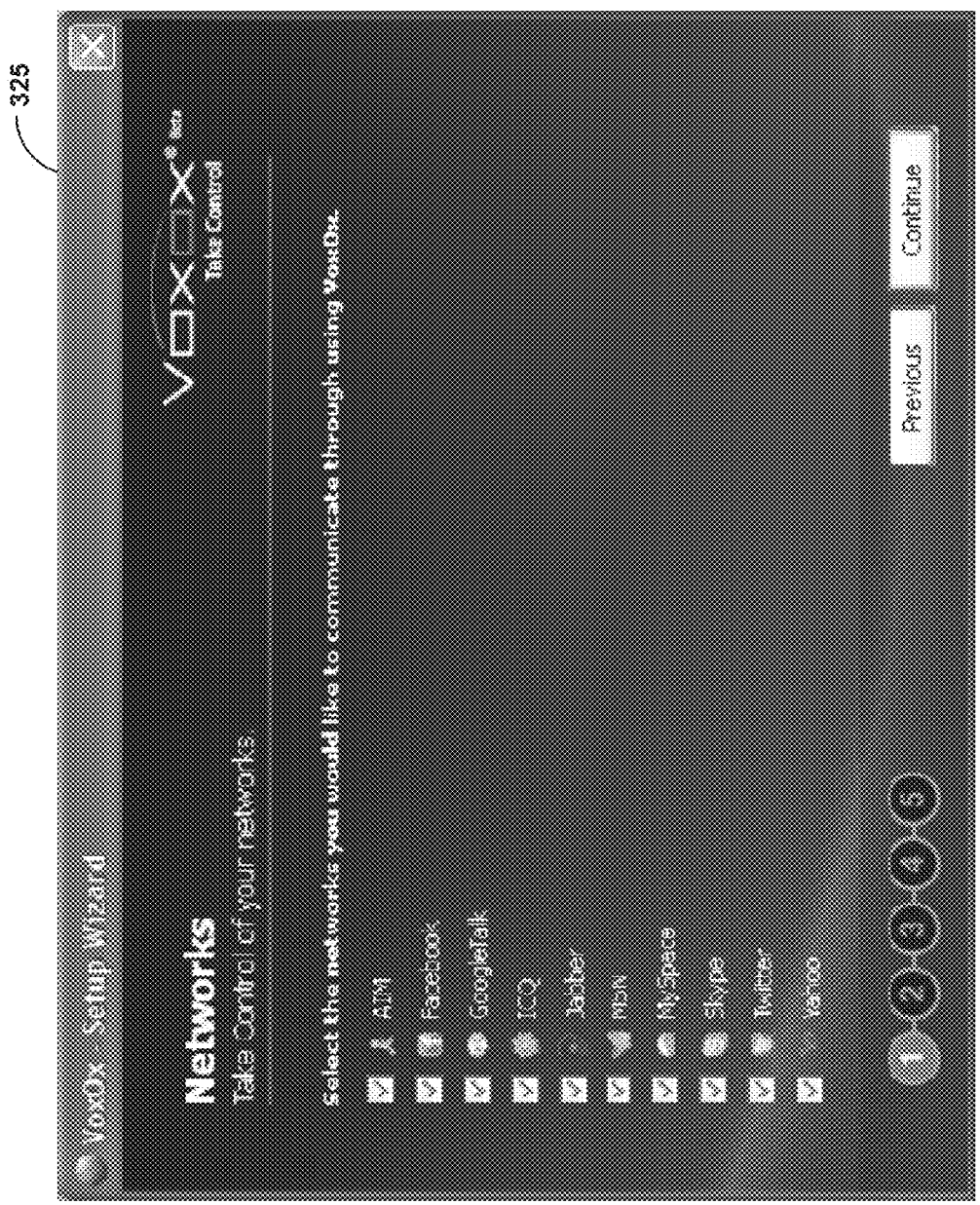
FIG. 25 shows an example service selection panel in a main window of a client.
Figure 26:
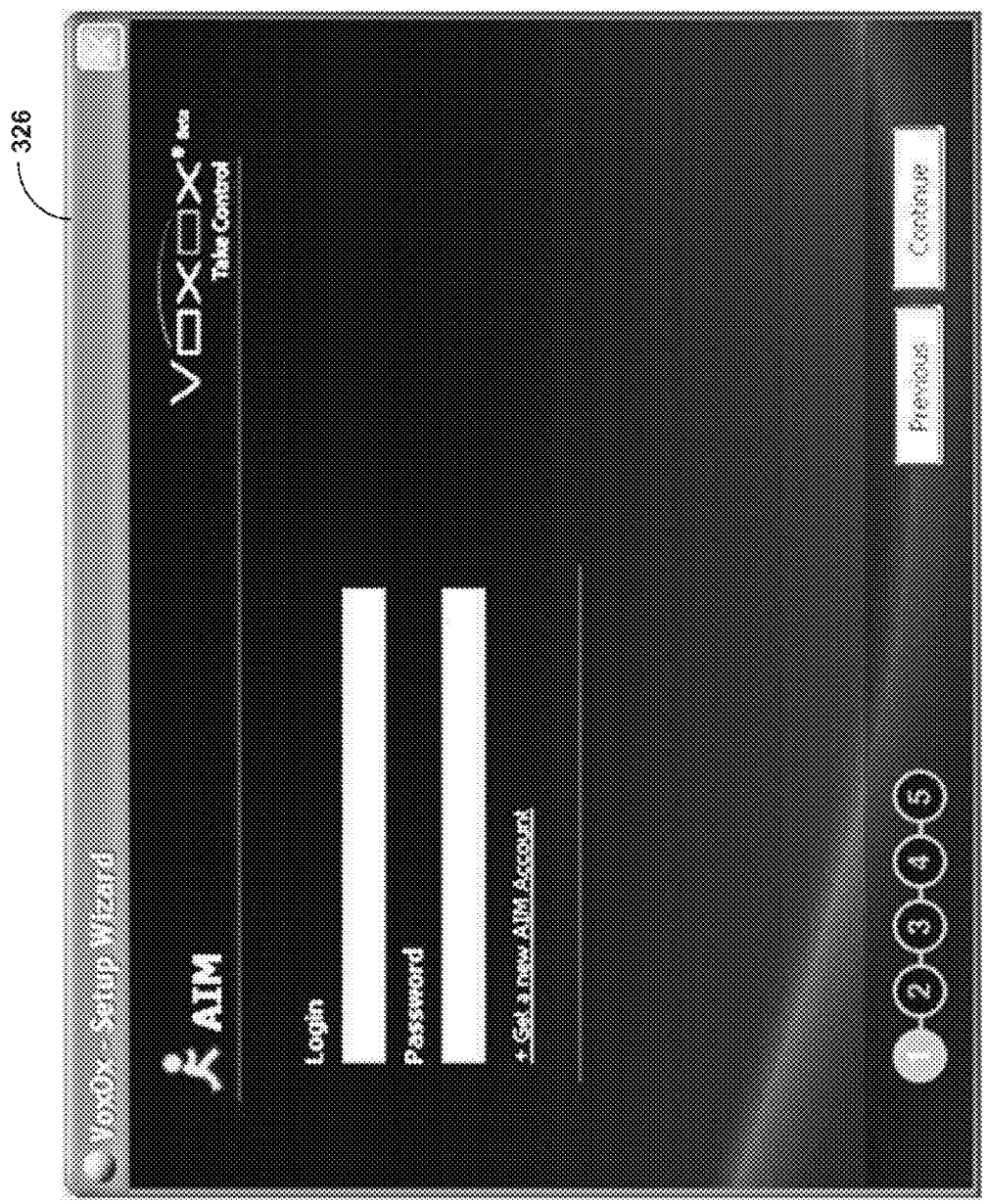
FIG. 26 shows an example service configuration panel in a configuration window of a client.

Referring to FIG. 25, the service selection panel may include selection options to indicate which instant messaging and social networking services the system will access. Accordingly, the service configuration panel, as seen in FIG. 26, includes data input elements for collecting the login credentials for each instant messaging or social networking service the user has selected. The technical details relating to the access of various instant messaging and social networking services will be described in further detail below.

Figure 27:
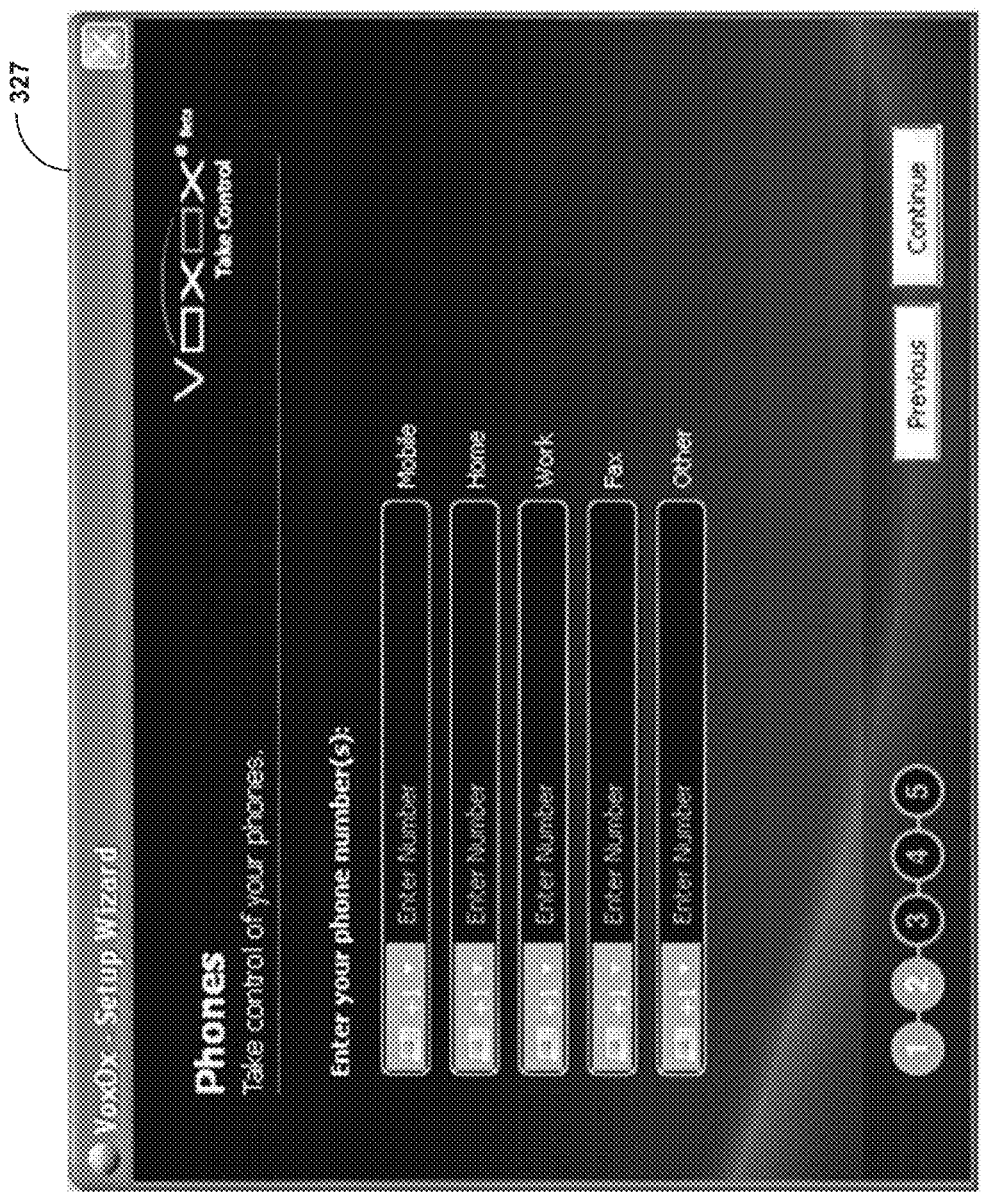
FIG. 27 shows an example phone configuration panel in a configuration window of a client.

The phone setup panel, as seen in FIG. 27, may include text boxes for inputting the various phone numbers (e.g. mobile, home, work, fax, etc.) that belong to a user. The supplied phone numbers are stored in the system and may be used when initiating phone calls to the user.

Figure 28:
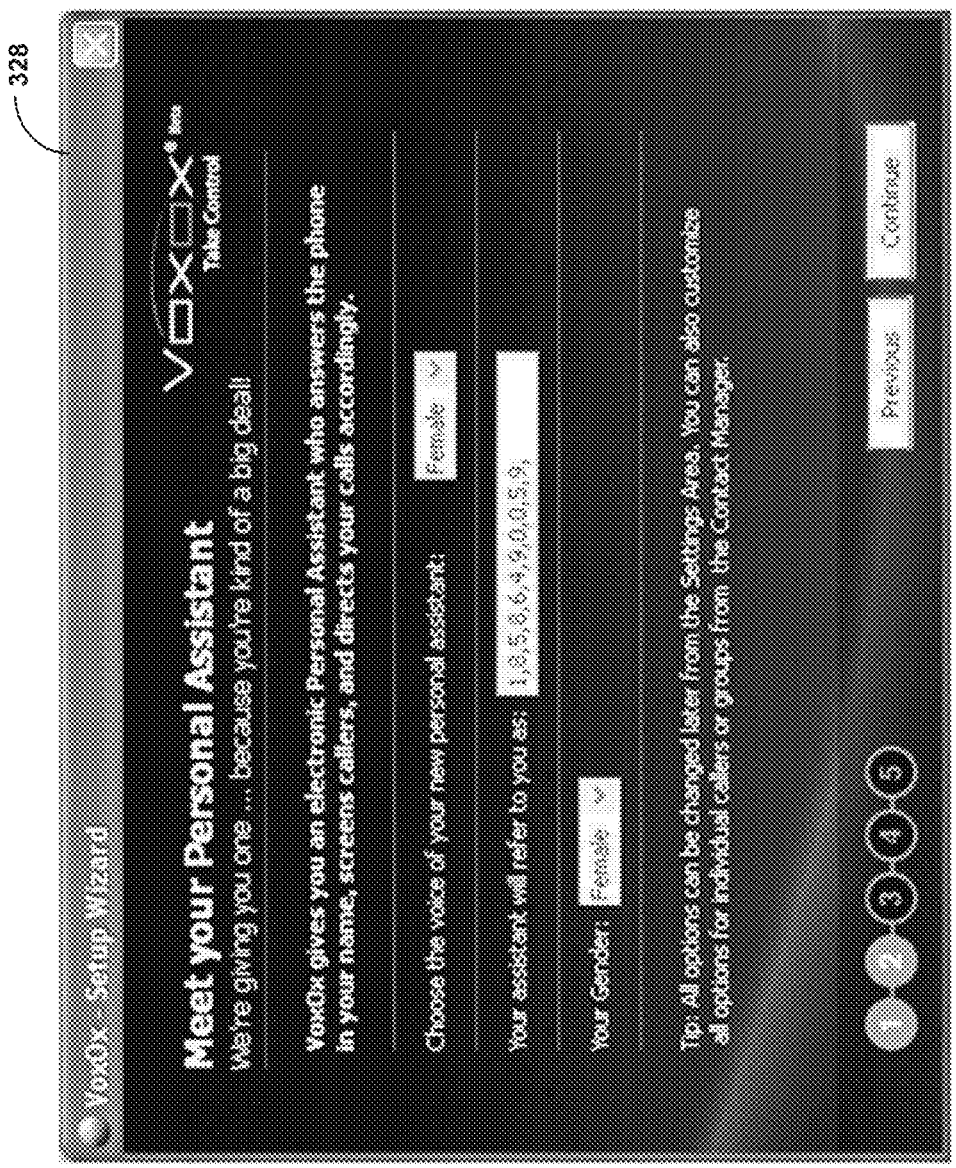
FIG. 28 shows an example assistant configuration panel in a configuration window of a client.

The assistant setup panel shown in FIG. 28 may include data input elements for selecting options relating to the communication assistant.

Figure 29:
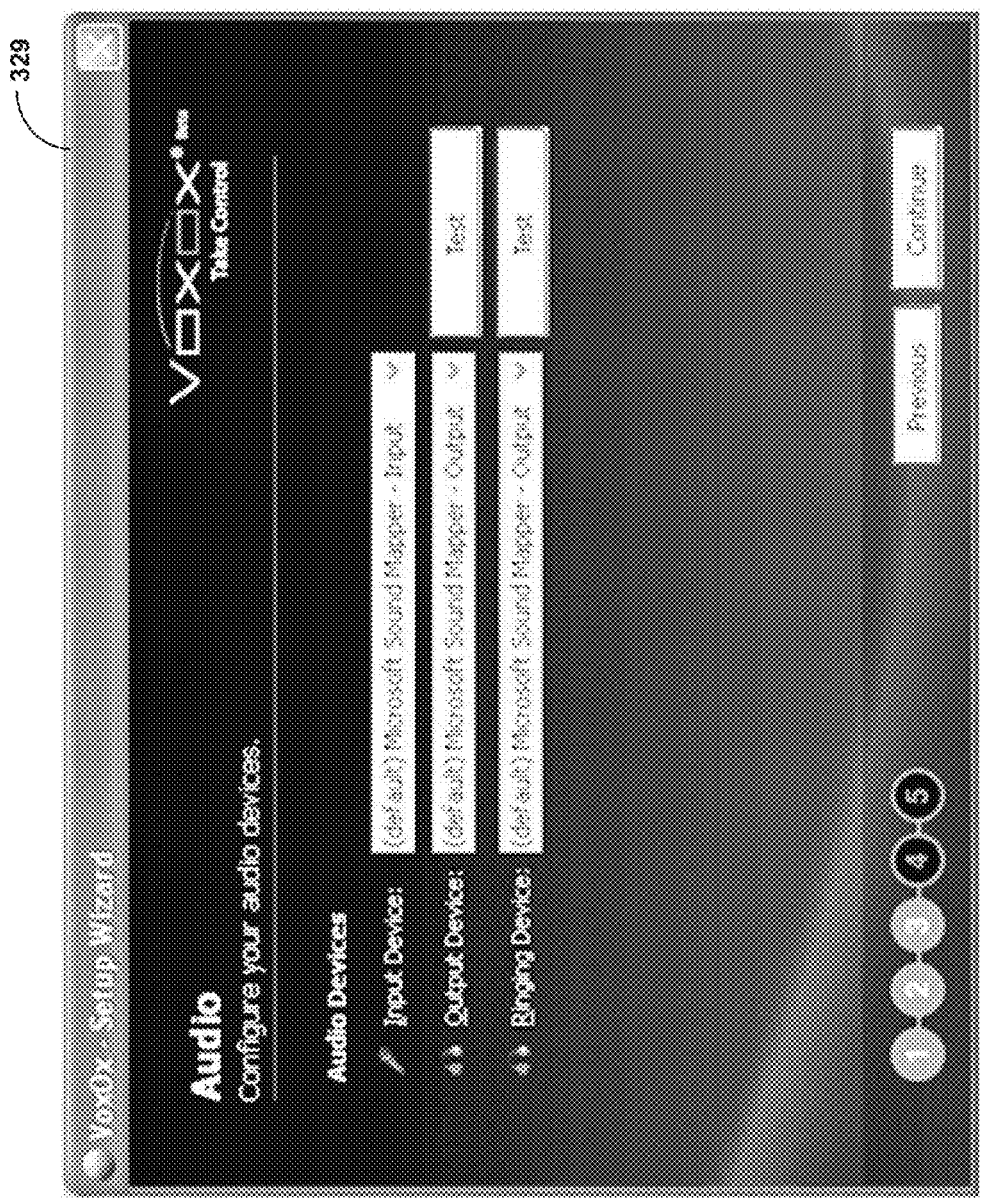
FIG. 29 shows an example audio configuration panel in a configuration window of a client.

The audio setup panel may include data input elements for selecting the audio devices used by the system as seen in FIG. 29. For example, a user may select the device used to input and output audio.

Figure 30:
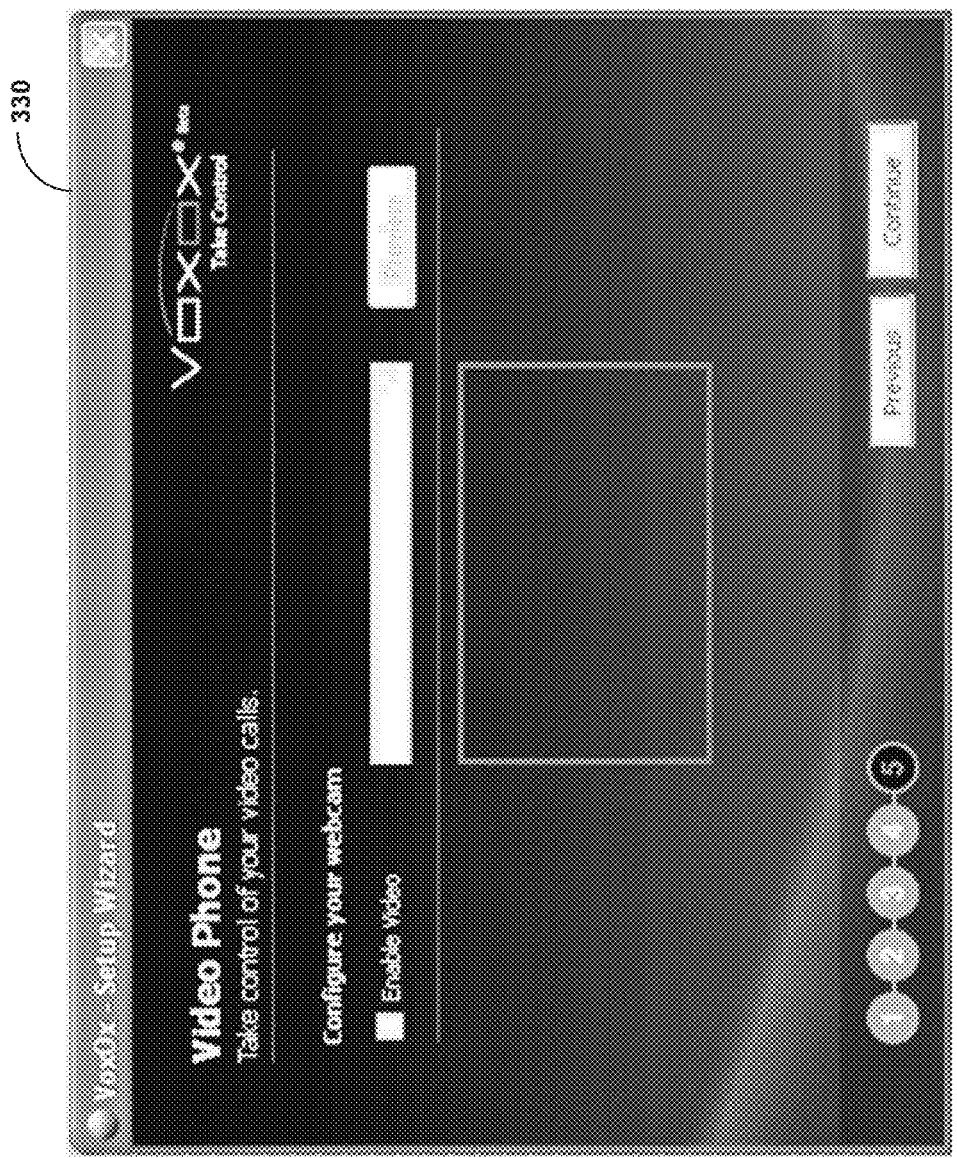
FIG. 30 shows an example video configuration panel in a configuration window of a client.

The video setup panel seen in FIG. 30 may include data input elements for enabling video for video phone calls and selecting a video input device. Additionally, the video setup panel may include a preview panel for testing video input to the client.

Figure 31:
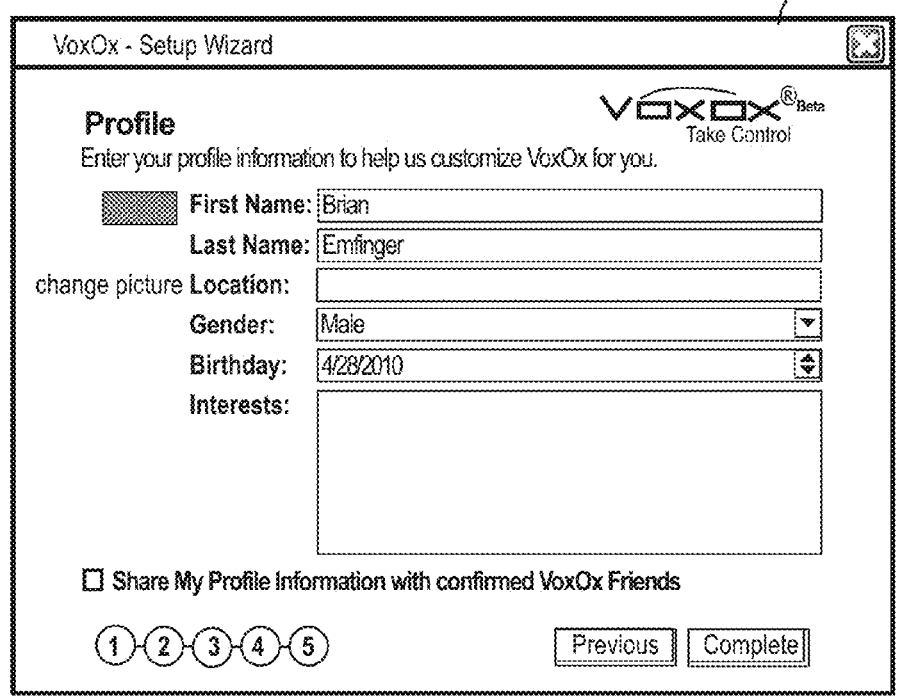
FIG. 31 shows an example profile configuration panel in a configuration window of a client.

The profile panel of FIG. 31 may include data input elements for inputting profile information relating to the user (e.g. name, location, gender, birthday, and the like). The profile information is stored in the system.

ii. The Settings Manager

The settings button in the "Apps" tab may display a settings window that includes various panels having data input elements for configuring the client. The settings panels may be similar to the setup manager panels and may include: a general settings panel; a service settings panel; an appearance settings panel; a phone settings panel; a text message settings panel; an audio settings panel; a video settings panel; an events settings panel; and a notification settings panel.

Figure 32:
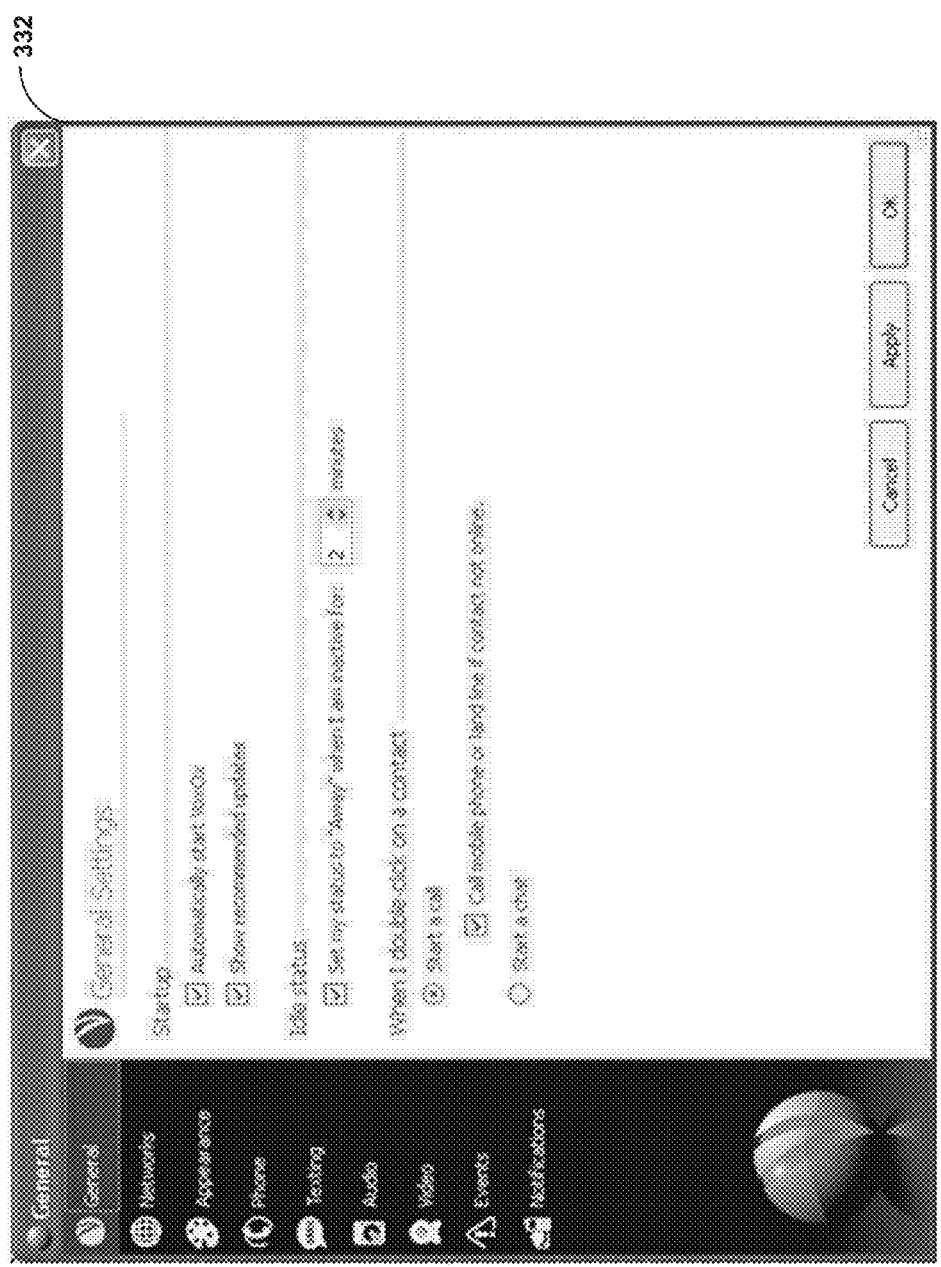
FIG. 32 shows a general settings panel in a settings window of a client.

The general settings panel displays data input elements for configuring the client. Example general settings are shown in FIG. 32.

Figure 33:
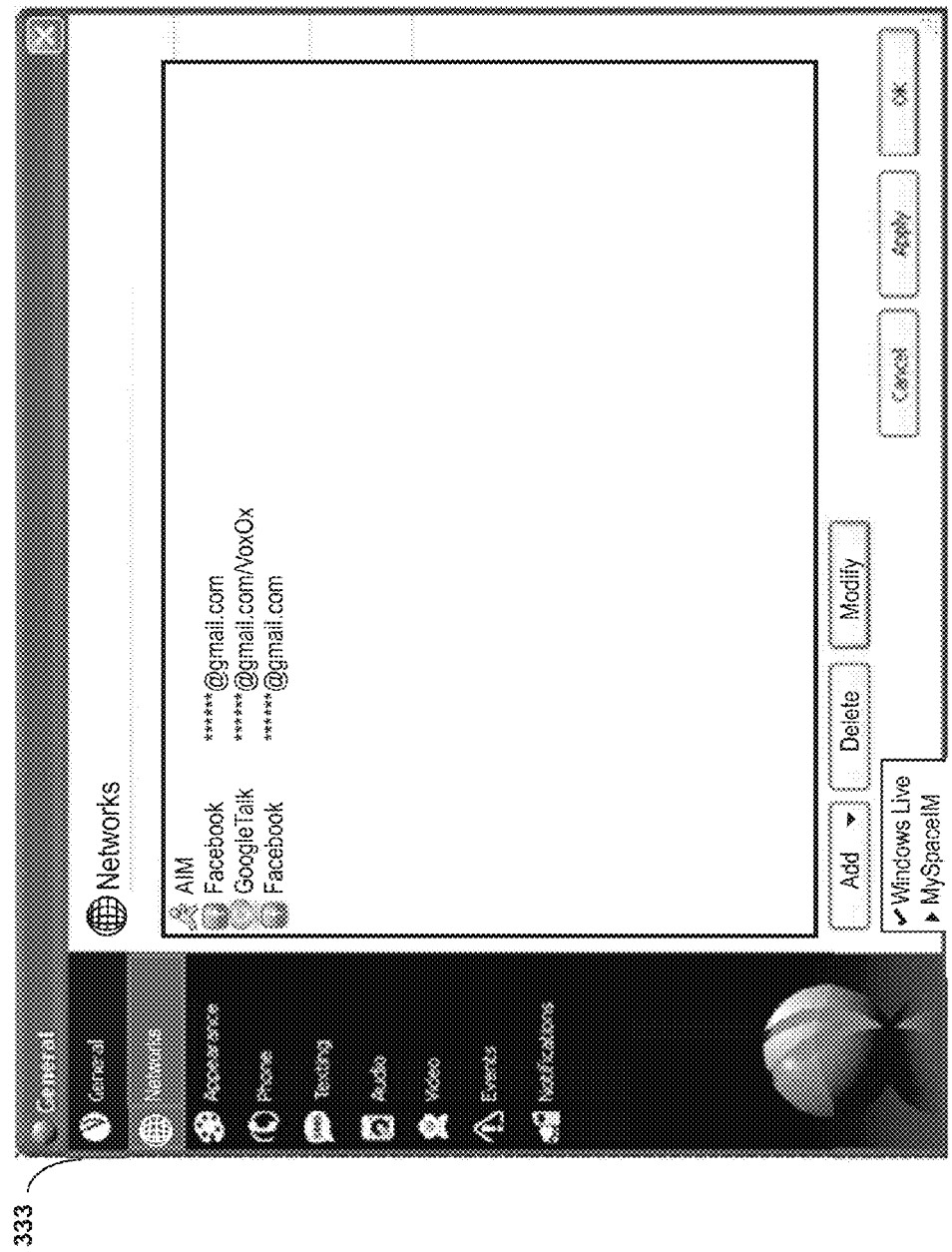
FIG. 33 shows a service settings panel in a settings window of a client.

The service settings panel displays the instant messaging and social networking services a user has configured the system to access. The service settings panel may also include control elements and data input elements for adding or modifying the services a user has configured the system to access. Example service settings are shown in FIG. 33.

Figure 34:
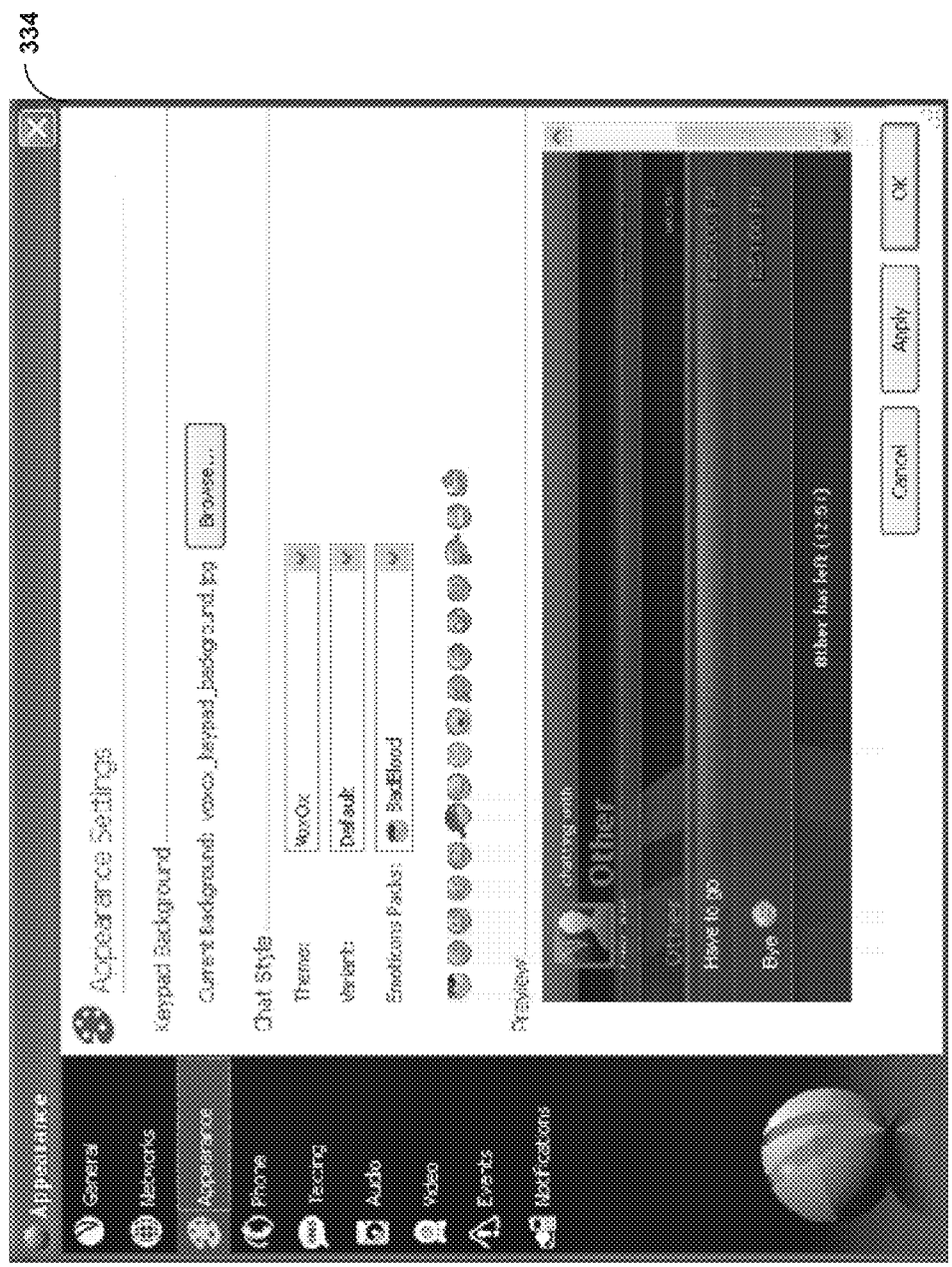
FIG. 34 shows an appearance settings panel in a settings window of a client.

The appearance settings panel displays data input elements for configuring the visual appearance of the client interface. Example appearance settings may be seen in FIG. 34.

Figure 35:
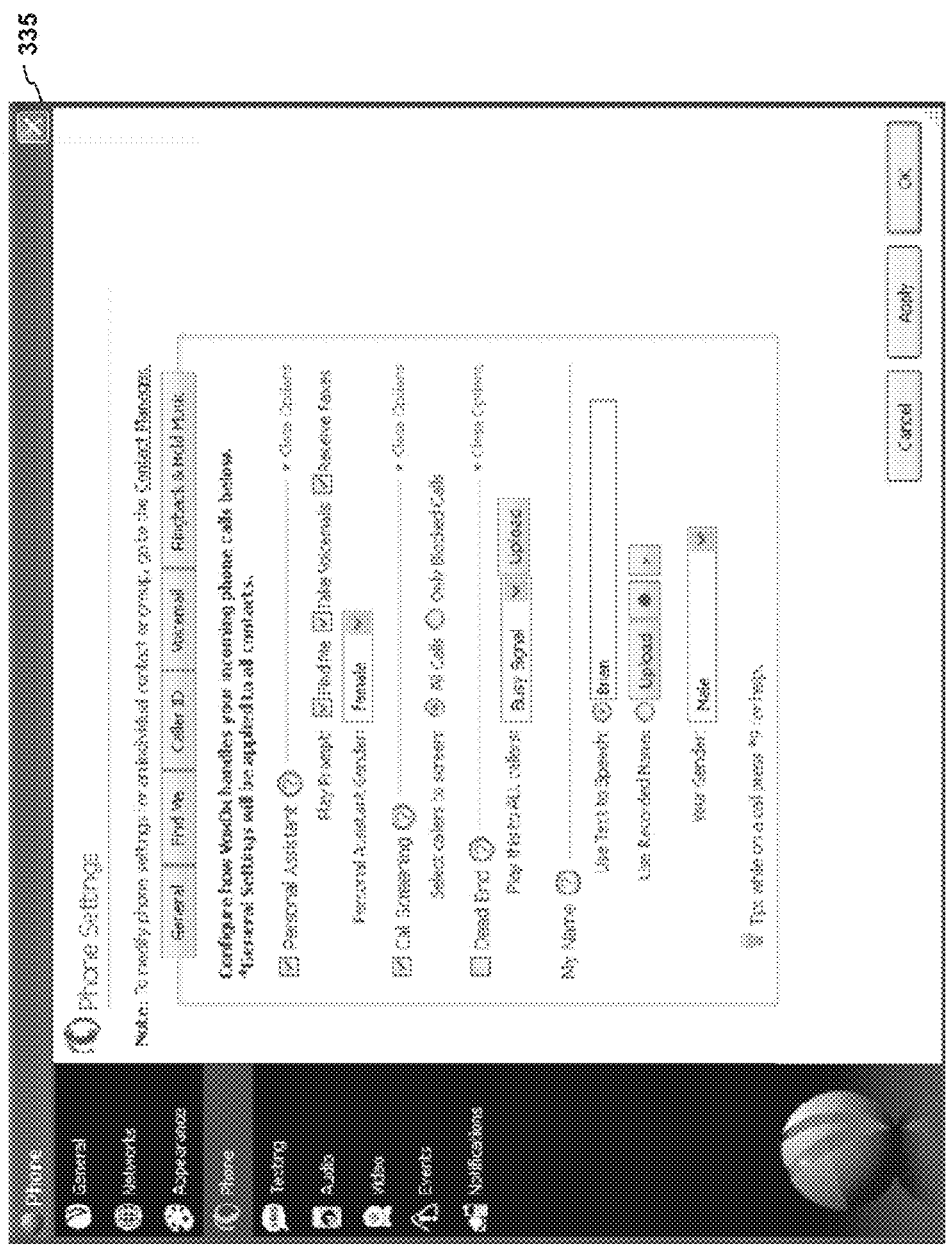
FIG. 35 shows a general settings panel in a phone settings panel in a settings window of a client.

Referring now to FIG. 35 through FIG. 39, the phone settings panel may include data input elements for configuring the handling of inbound phone calls. Phone settings selected in the settings window will be applied to all inbound phone calls from all contacts. Phone settings may also be specified on a group basis or a contact-by-contact basis in the contact manager as described below. The phone settings panel, as seen in FIG. 35, may also include a series of tabs relating to various phone settings. The phone settings tabs may include: a general phone settings tab; a call direction tab; a caller identification tab; a voicemail tab; and an audio tab.

As seen in FIG. 35, the general phone settings tab may display options for managing the handling of inbound calls to the client. For example, the general phone settings tab may include an assistant setting, a call screening setting, a call prevention setting, and a personalization setting. The assistant setting may be enabled to instruct the voice message engine of the host application how to handle inbound phone calls. For example, the voice message engine may answer inbound phone calls for a user, screen inbound phone calls, direct inbound phone calls to other phone numbers, record voicemails, or receive faxes. Enabling the call screening setting instructs the voice message engine of the host application to request the name of the inbound caller and play the name for a user before the user accepts the call at the client. Additionally, the voice message engine may record the phone call or direct the phone call to voice mail. The call prevention setting may be enabled to prevent a user from receiving phone calls at the client. If the call prevention setting is enabled, the system may play an audio clip selected by a user. The audio clip may be a generic sound, such as a busy signal, the computer-generated name produce by a text-to-speech module, or an audio clip recorded by the user.

Figure 36:
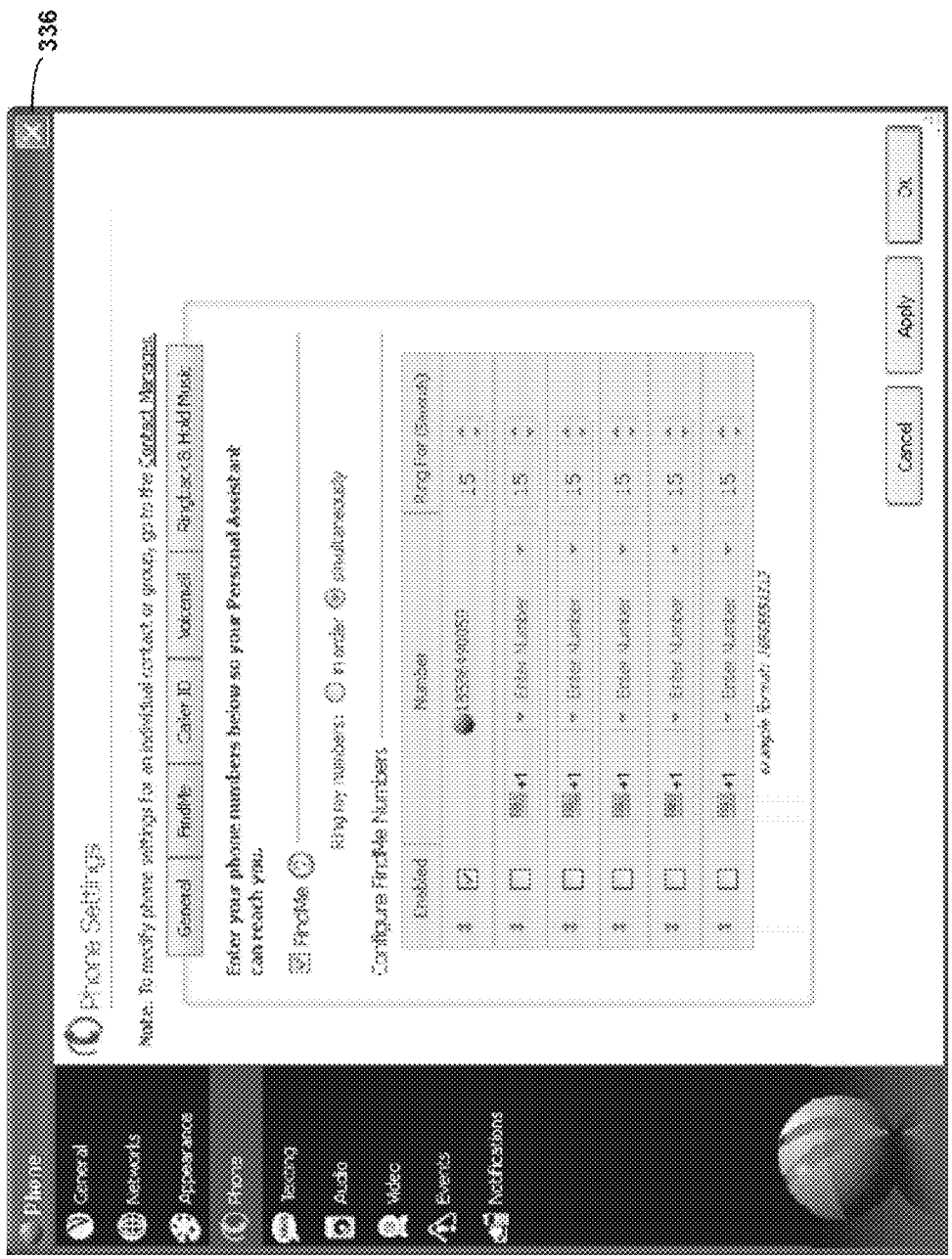
FIG. 36 shows a call direction panel in a phone settings panel.

The call direction settings tab, as shown in FIG. 36, may display a panel for configuring the direction of inbound calls when a user is unavailable at a particular phone number. The call direction panel includes a hierarchical list of phone numbers at which the user may be reached. If the user is unavailable at one particular number, the system will initiate a call to the next number in the list until the user answers. The call direction panel includes data input elements for inputting phone numbers at which the user may be reached. In addition, the call direction panel includes data input elements for selecting the amount of time the inbound call will ring before the system initiates a call to the next phone number in the list. Moreover, the call direction panel also includes a data input element to: enable or disable the call direction feature; enable or disable particular phone numbers in the list; and instruct the system to call all numbers simultaneously rather than sequentially. The technical features of the call direction feature will be described in further detail below.

Figure 37:
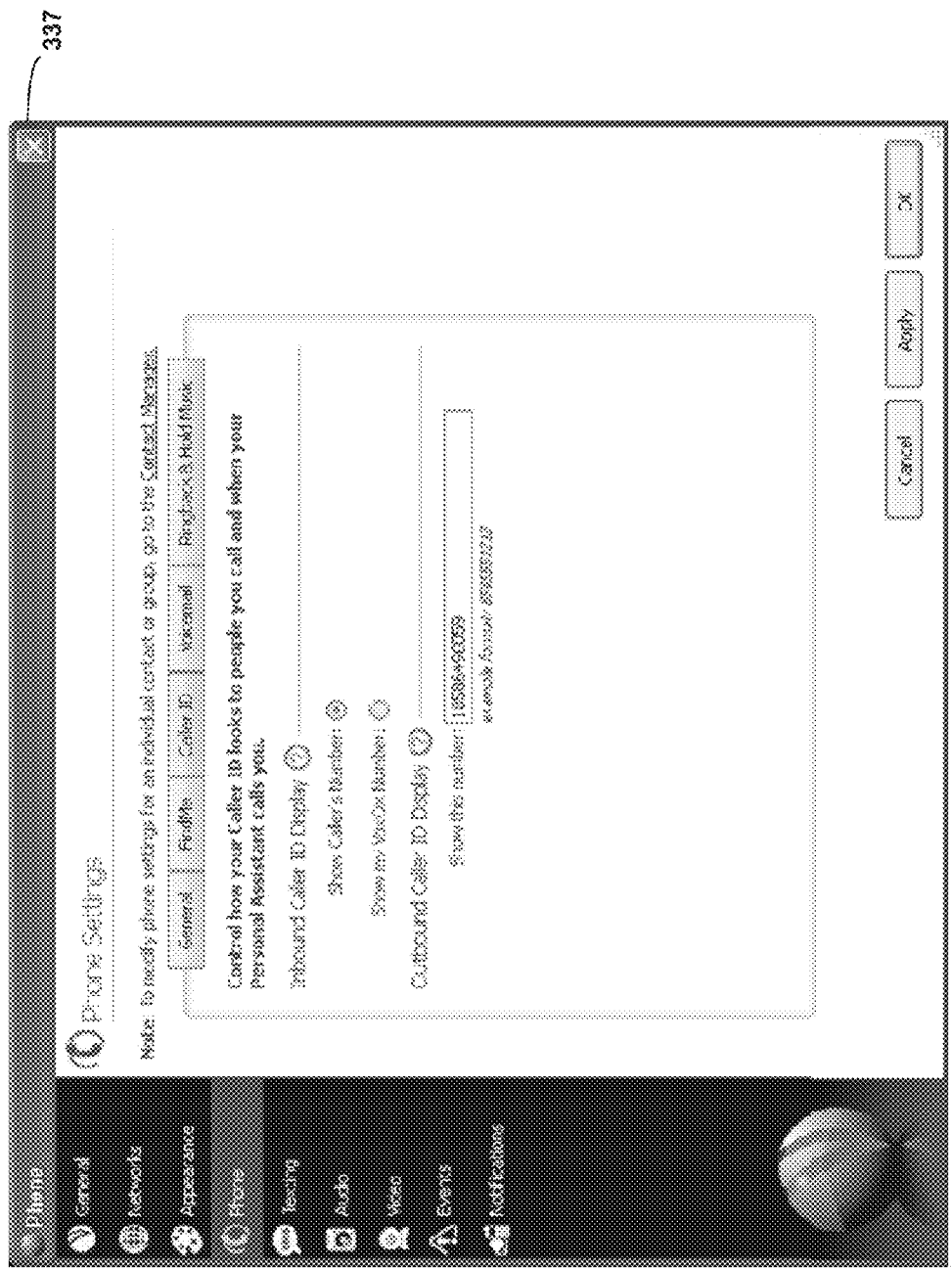
FIG. 37 shows a caller identification panel in a phone settings panel.

Referring to FIG. 37, the caller identification settings tab includes a panel for configuring a caller identification option. The caller identification panel includes data input elements for selecting what number is displayed when the client directs an inbound phone call to a landline or mobile cellular phone of the user. A user has the option of displaying the phone number of the inbound caller or the account phone number. For example, if the system receives a call at the account phone number and directs the call to the cellular phone of a user, the caller identification of the cellular phone may display either the phone number of the inbound caller or the account phone number of the user. The caller identification panel may also include a text box for inputting the number displayed to contacts when placing a call from the client. By default, the number displayed for outbound calls may be the account phone number.

Figure 38:
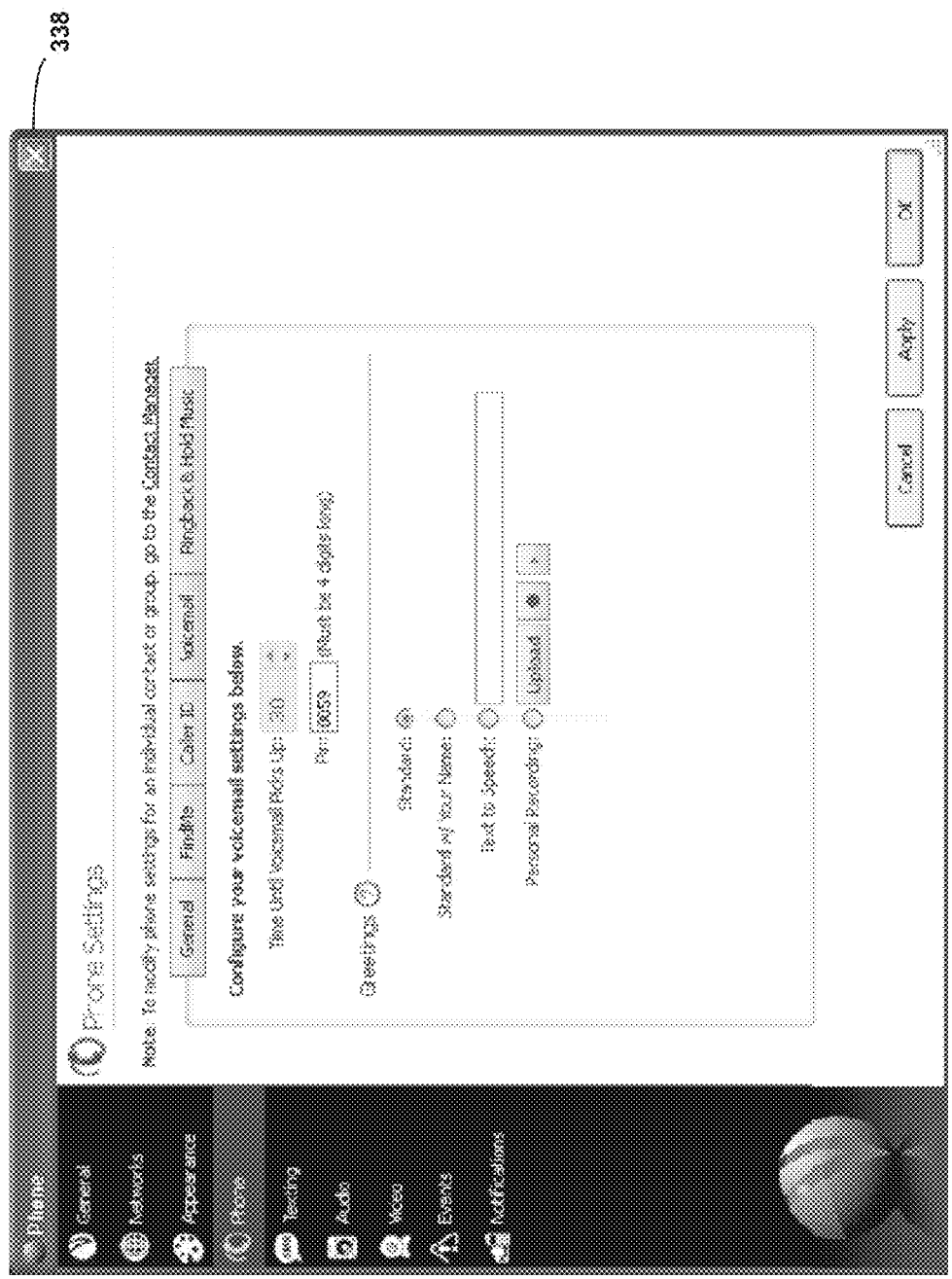
FIG. 38 shows a voicemail settings panel in a phone settings panel.

The voicemail settings tab, as shown in FIG. 38, includes a panel for configuring the voicemail options of the system. The voicemail settings panel may include: options for specifying a voicemail greeting; an option to specify how long an inbound phone call will ring before being directed to voicemail; and an option to specify a voicemail personal identification number. The voicemail greeting options may include a standard voicemail greeting; a standard voicemail greeting using the name of the user; an audio clip of a text-based greeting converted by a text-to-speech module; or an audio clip recorded by the user upload to the system.

Figure 39:
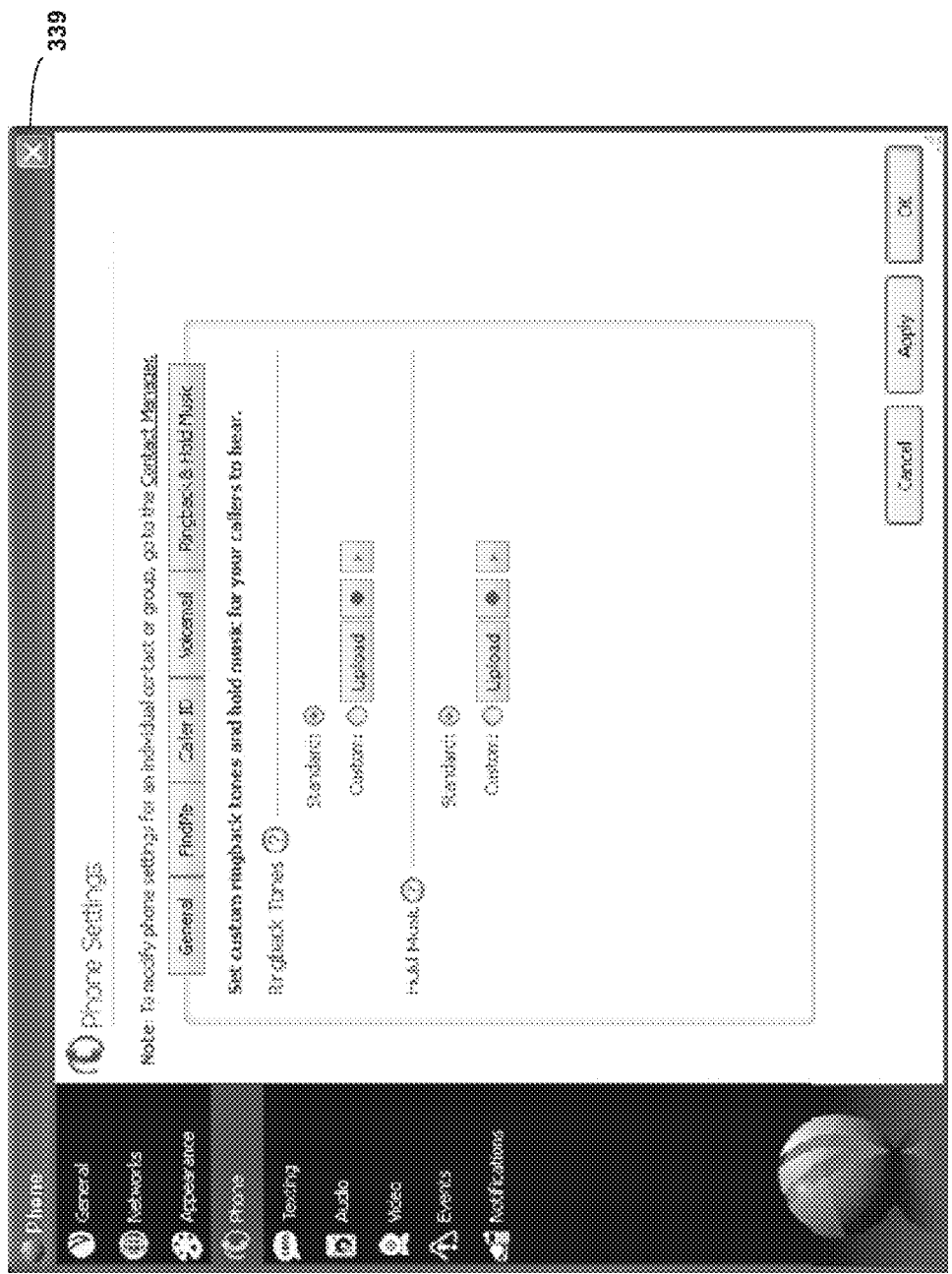
FIG. 39 shows a call audio settings panel in a phone settings panel of a client.

Finally, the audio tab includes a panel for setting audio options for callers when an inbound call is ringing and when a contact is placed on hold as seen in FIG. 39. A user may select a standard audio option or a custom audio option.

Figure 40:
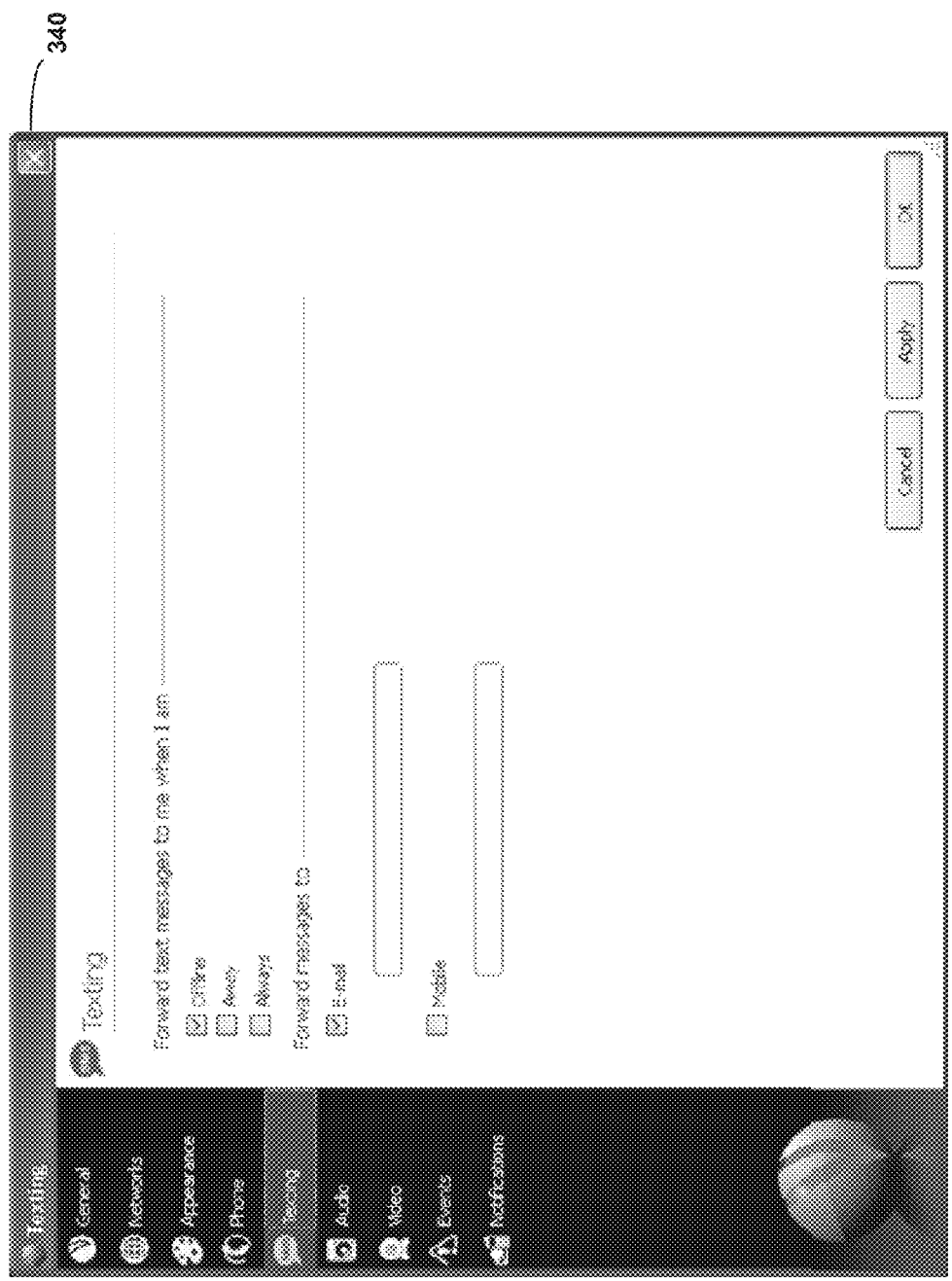
FIG. 40 shows a text-message settings panel in a settings window of a client.

The text settings panel may include input elements for configuring the handling of text messages received at the client. For example, a user may instruct the system to forward text messages received at the client based on the status of the user. The forwarded text messages may be sent to the email address or mobile cellular phone number of the user. Example text message settings may be seen in FIG. 40.

Figure 41:
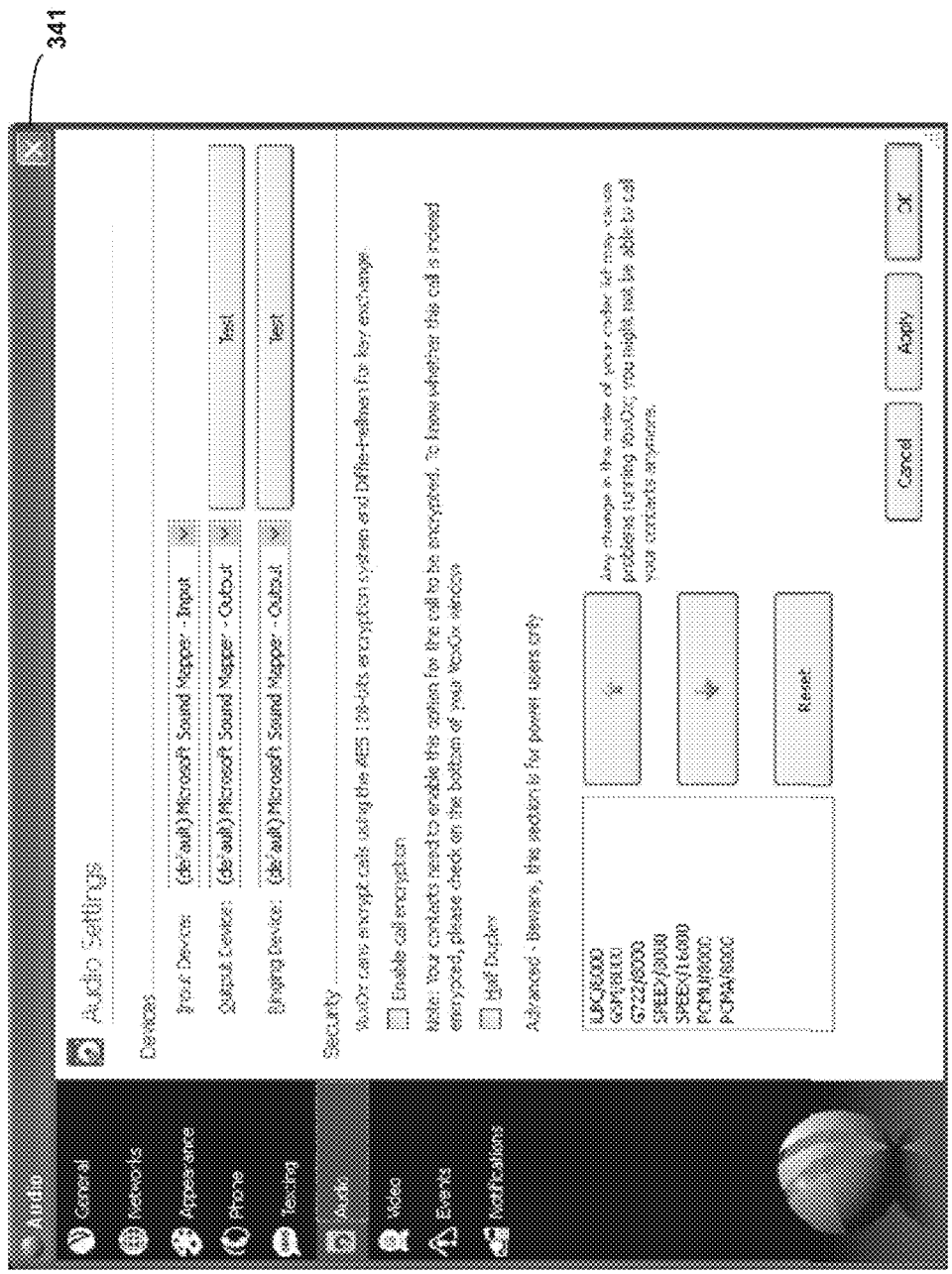
FIG. 41 shows an audio settings panel in a settings window of a client.

The audio settings panel includes input elements for configuring the audio devices of the computing device and input elements to specify call protection methods. Example audio and security settings may be seen in FIG. 41.

Figure 42:
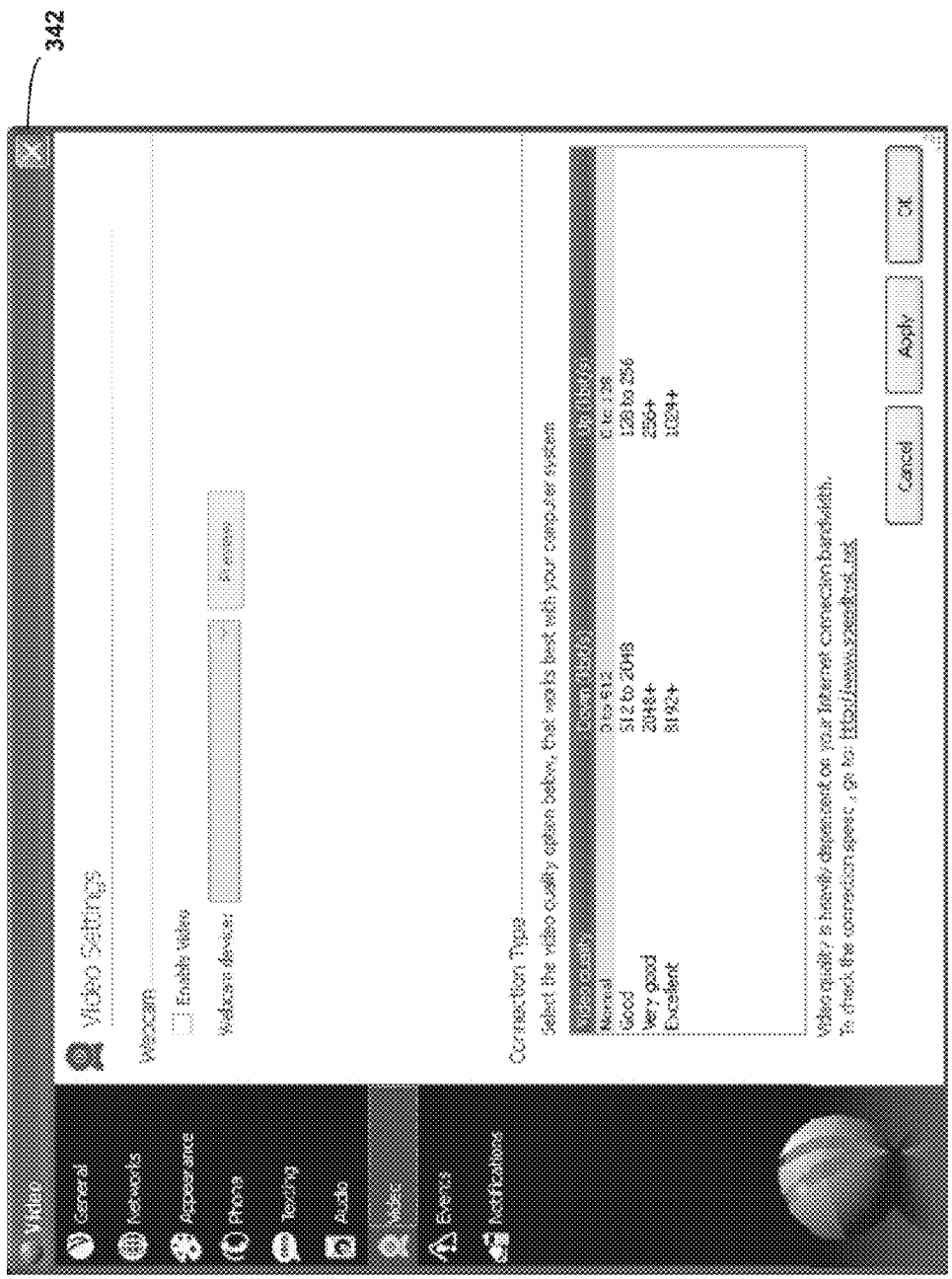
FIG. 42 shows a video settings panel in a settings window of a client.

The video settings panel includes input elements for enabling video phone calls and input elements for configuring and testing the video device of the computing device. Example video settings may be seen in FIG. 42.

Figure 43:
FIG. 43 shows an event settings panel in a settings window of a client.

The event settings panel includes input elements for configuring the handling of particular events that occur during use of the system. For example, a user may select audio clips to play when an incoming call is received, when a phone call ends, and when an instant message is received. Example event settings may be seen in FIG. 43.

Figure 44:
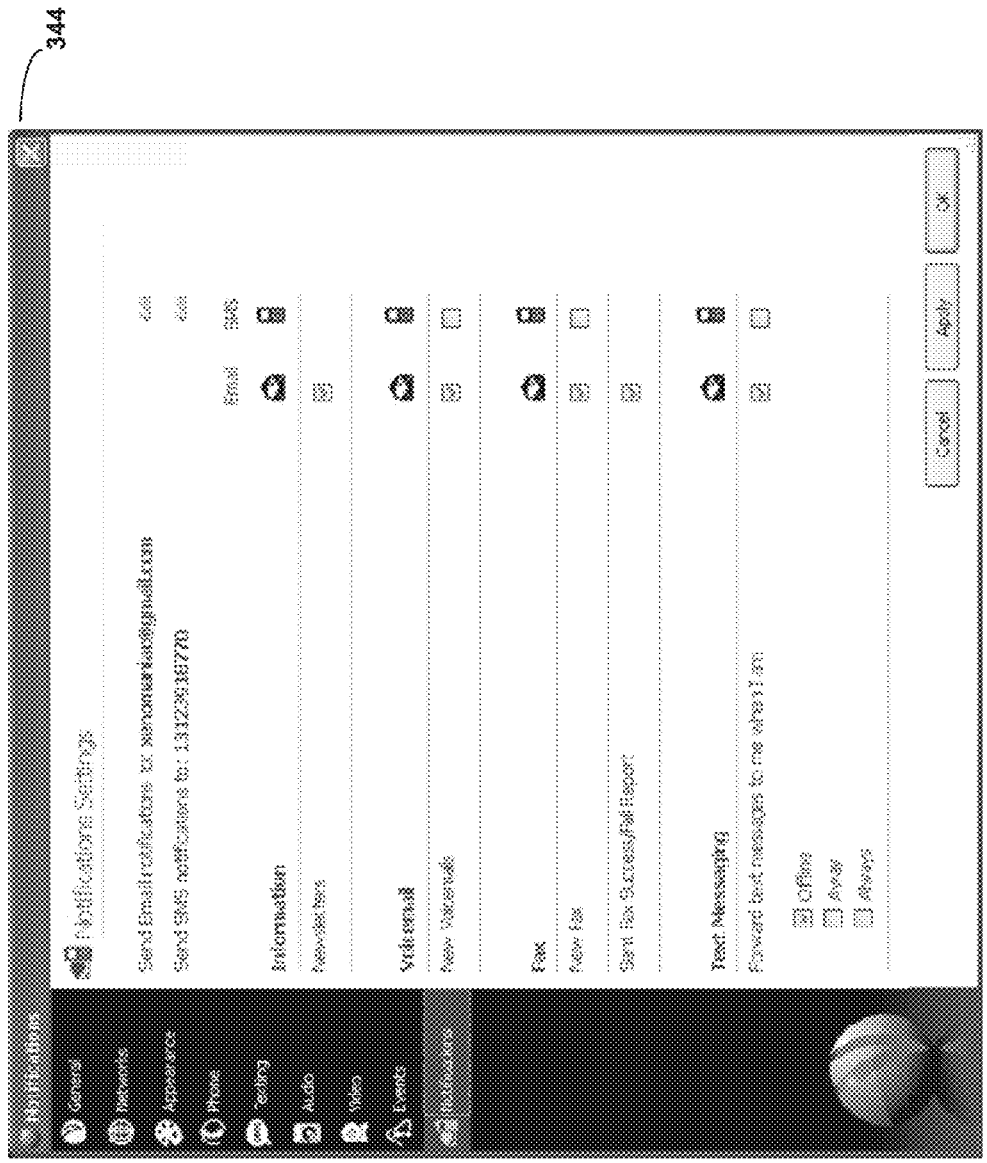
FIG. 44 shows a notification settings panel in a settings window of a client.

The notification settings panel includes input elements for configuring notifications initiated by the system to inform a user of certain events. For example, the system may send to the user an email or text message when a new voicemail, fax, or text message is received at the client. Example event settings may be seen in FIG. 44.

iii. The Contact Manager

The contact manager button may display a contact window that may be used to edit information relating to the contacts of a user. As shown in the example window of FIG. 45, the contact manager window may include a group listing panel, a contact listing panel, an information panel, and a search panel.

The group panel may list the current contact groups of a user. Selecting a group from the group list may display all contacts for that group in the contact listing panel. Selecting a contact from the contact list may display the profile and contact information for the contact in the information panel. A user may select a contact edit button or phone settings edit button to modify the stored information and phone settings for a contact.

Figure 46:
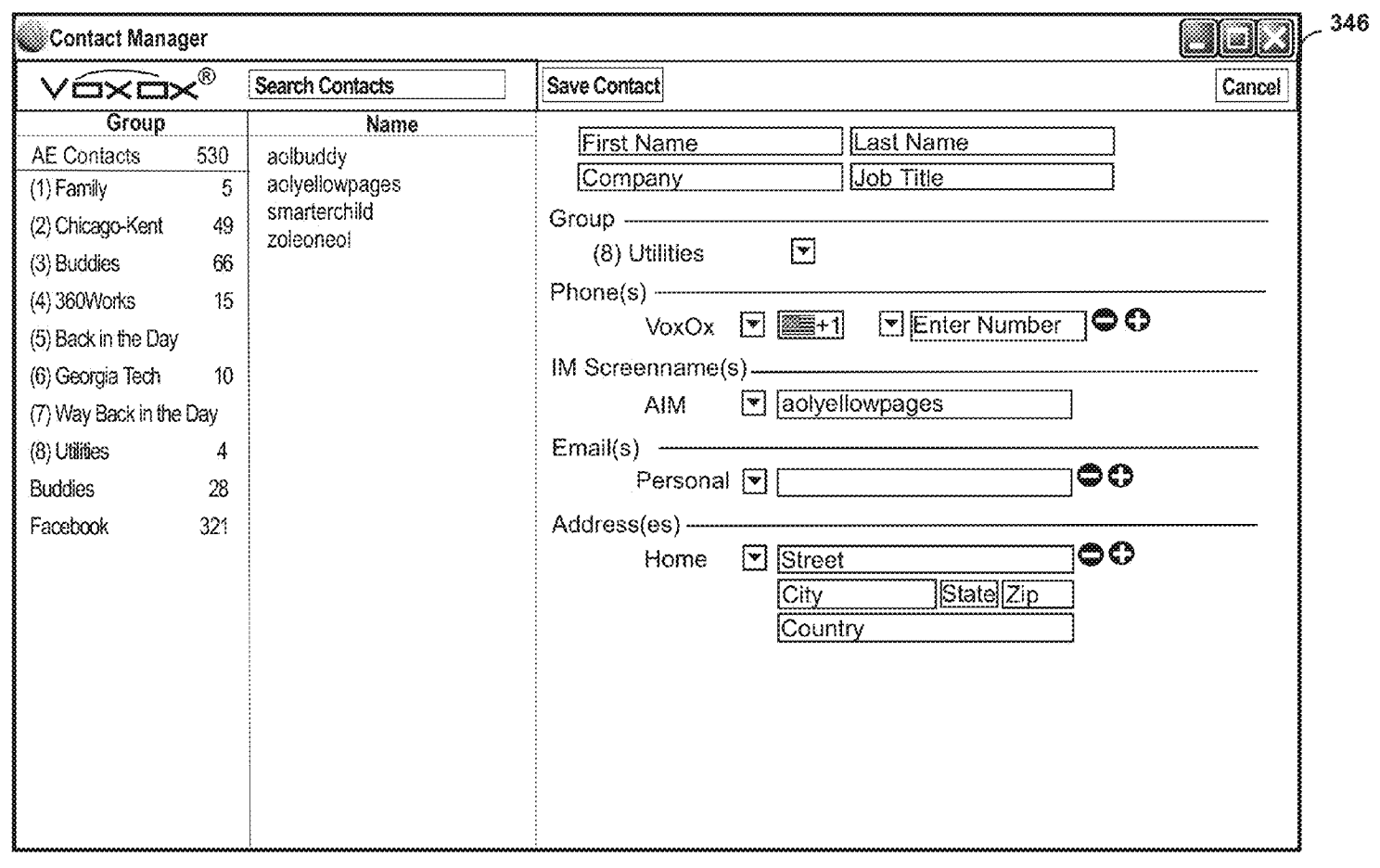

Selecting the contact edit button displays an edit panel as shown in FIG. 46. The edit panel of the contact window may include data input elements with which a user may enter profile and contact information such as name, phone number, instant message "screennames," email addresses, street addresses, and the like. Selecting the phone settings edit button displays an edit panel having data input elements for selecting the phone settings for a particular contact. In the example shown, the phone settings displayed are the same as those mentioned above for the general settings manager. As discussed above, phone settings may be set globally for all contacts, or on a contact-by-contact basis in the contact manager.

iv. The Message Manager

Figure 47:
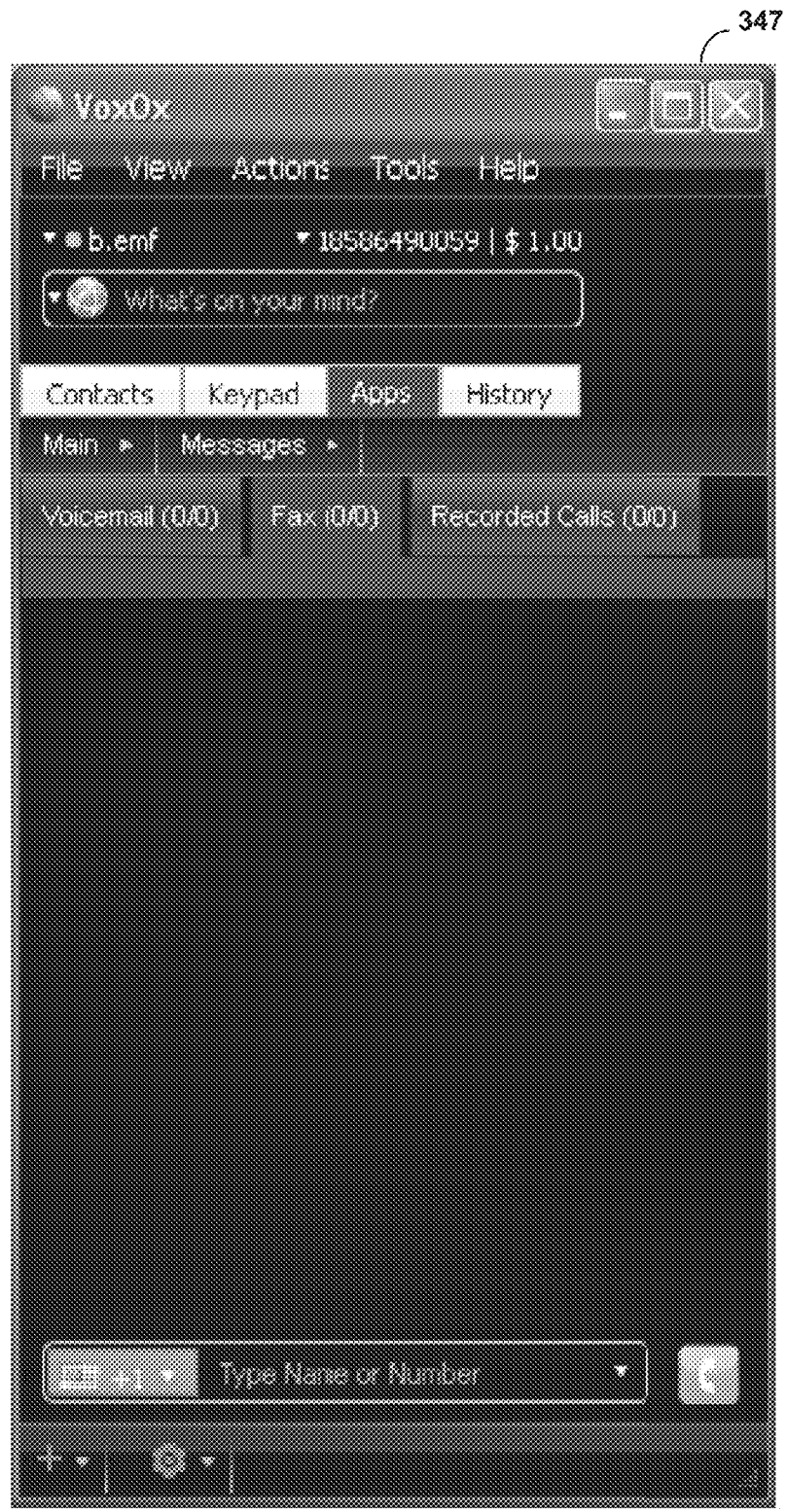
FIG. 47 shows a message management panel in a main window of a client.

The message manager provides the user with a list of stored voicemails, faxes, and recorded phone calls. The message manager may display a message management panel having a series of message tabs for displaying the stored messages as shown in FIG. 47. The message manager tabs may include a voicemail tab, a fax tab, and a recorded phone call tab. A user may select each tab to display the list of stored messages for each type of message.

Figure 48:
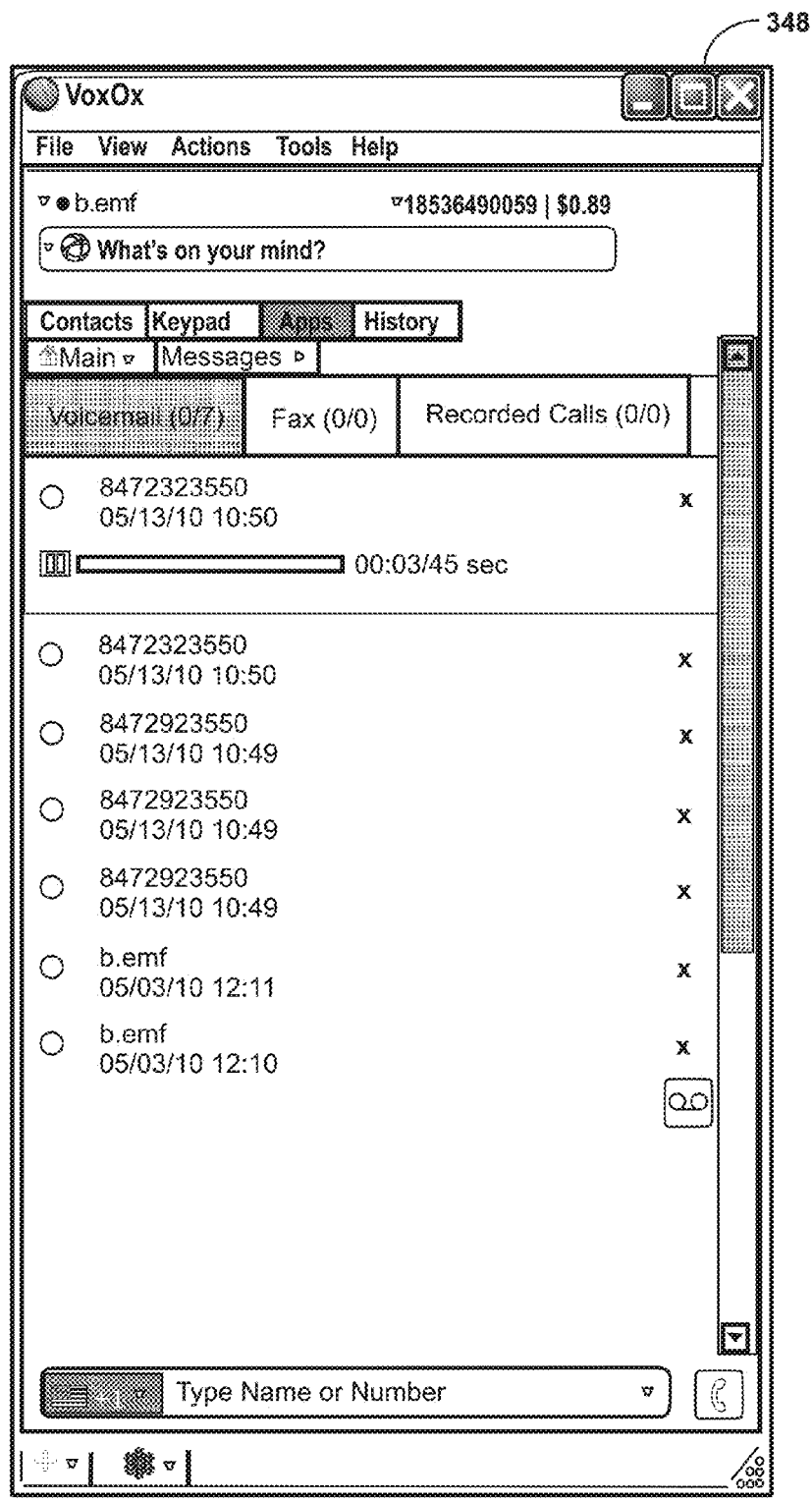
FIG. 48 shows a voicemail management panel in a message management panel.

An example voicemail tab is shown in FIG. 48. Selecting the voicemail tab may display a list of voicemails the system has stored for a user. A user may select a voicemail to display a playback panel. The playback panel includes buttons a user may select to play or delete the voicemail.

Figure 49:
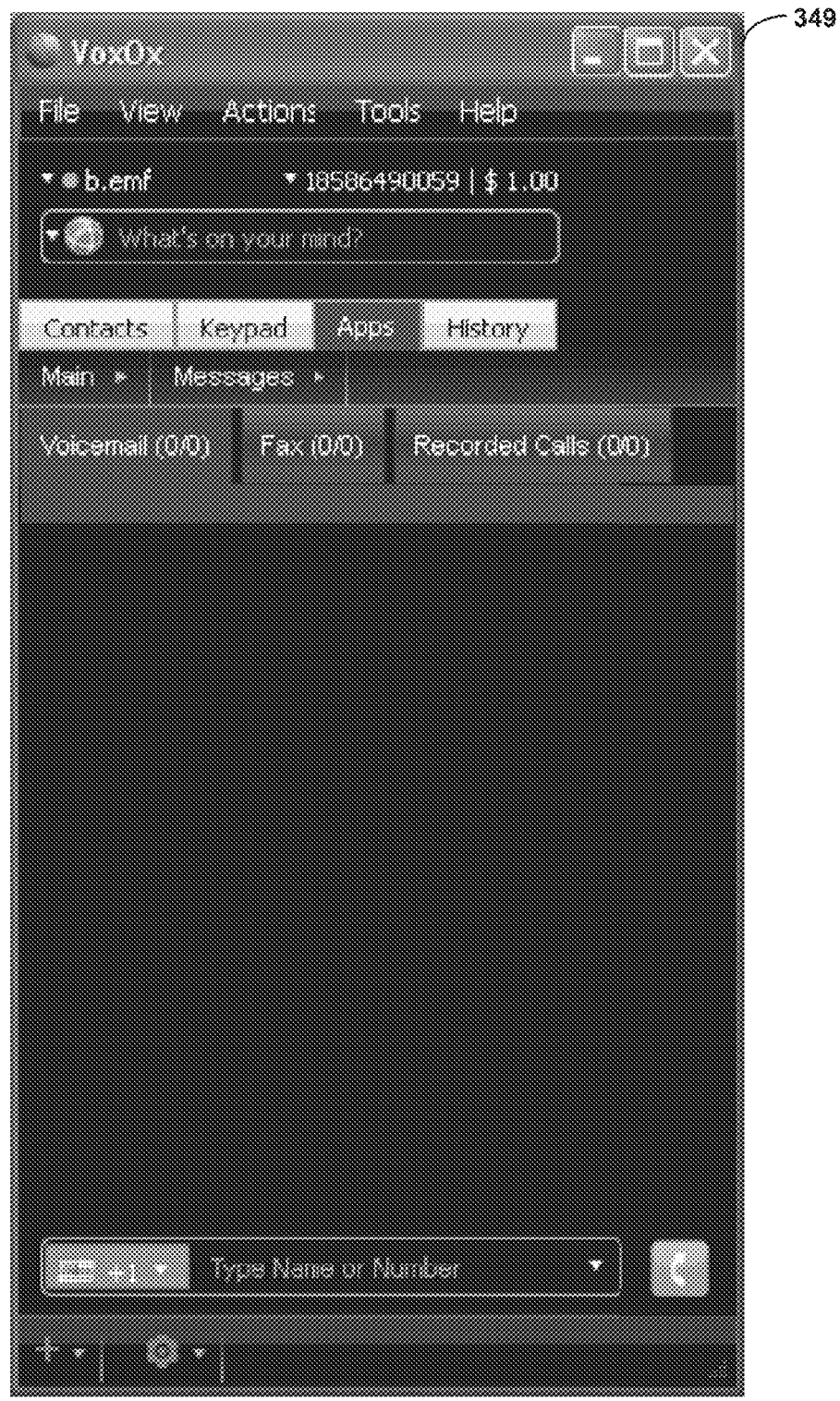
FIG. 49 shows a fax management panel in a message management panel.

An example fax tab is shown in FIG. 49. Selecting the fax tab displays a list of faxes the system has stored for a user.

The fax entries in the list may include a button to display the fax or the delete the fax. A fax may be stored in database server 6 and streamed to the client application 2. Alternatively, the fax may be downloaded by the computing device 2.

Figure 50:
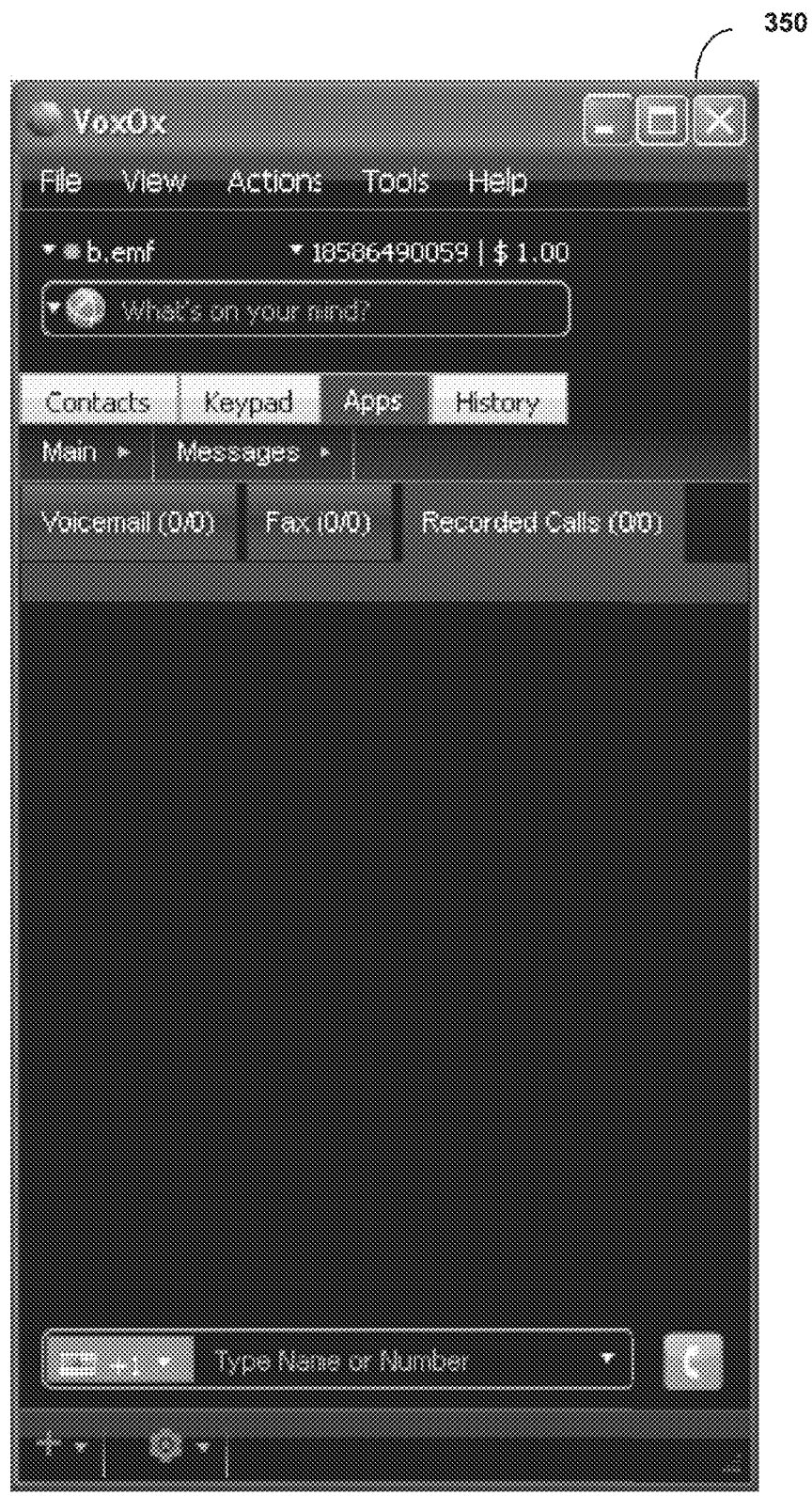
FIG. 50 shows a recorded phone call management panel in a message management panel.

An example of a recorded phone tab is shown in FIG. 50. Selecting the recorded phone call tab similarly displays a list of phone calls that have been recorded and stored in the system. Selecting a recorded phone call may also display a playback panel having buttons to play or delete the recorded phone call.

v. Call-Back

Figure 51:
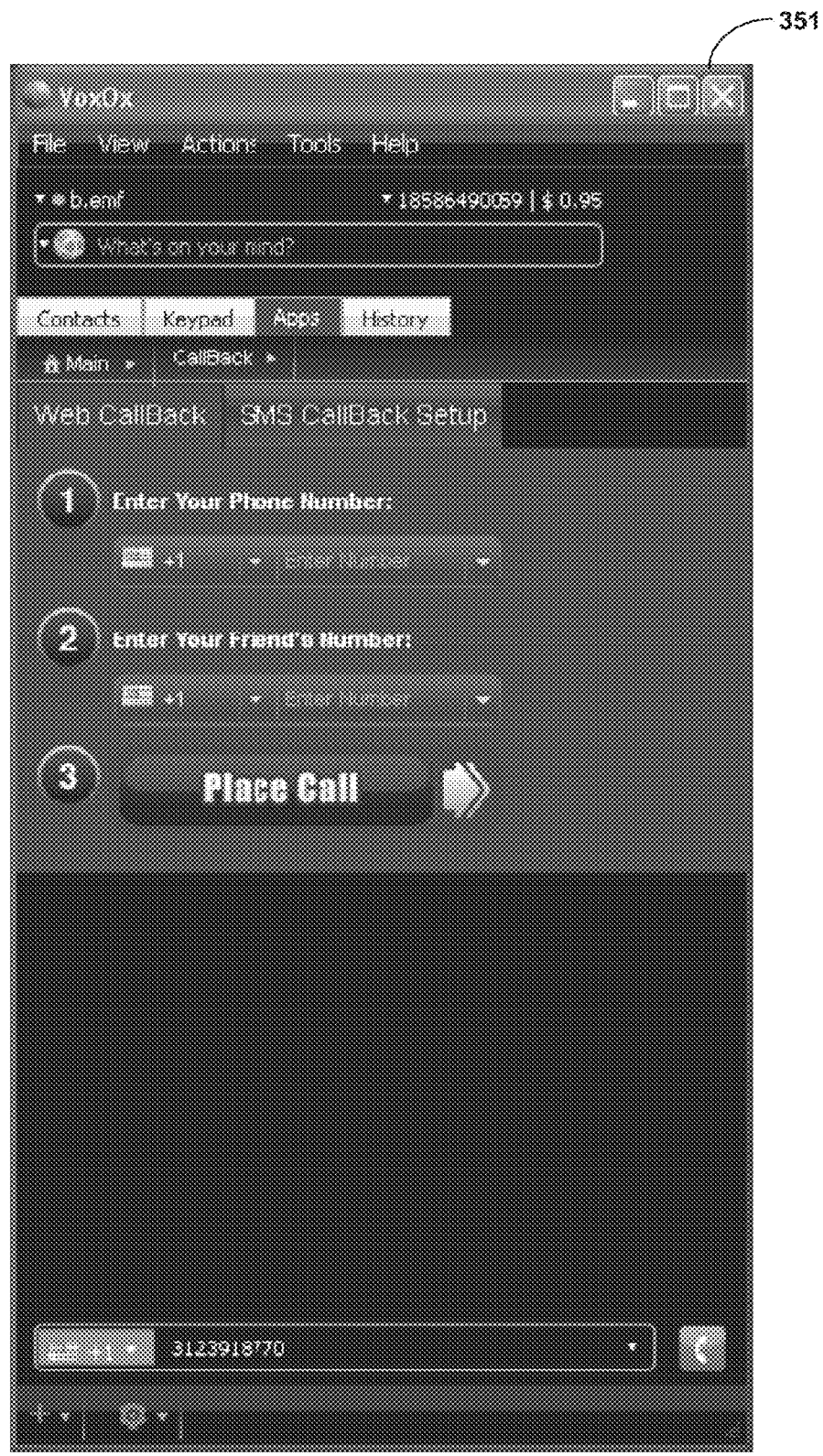
FIG. 51 shows a web-based call-back panel in a main window of a client.

The call-back button of the applications tab displays a call back panel that includes tabs for accessing the web call-back feature and the text-call back feature as seen in FIG. 51. The web call-back tab displays a panel, as shown in FIG. 51, having text boxes to input a phone number of the user and a phone number of a contact. The user may select a button to initiate the call-back call.

Figure 52:
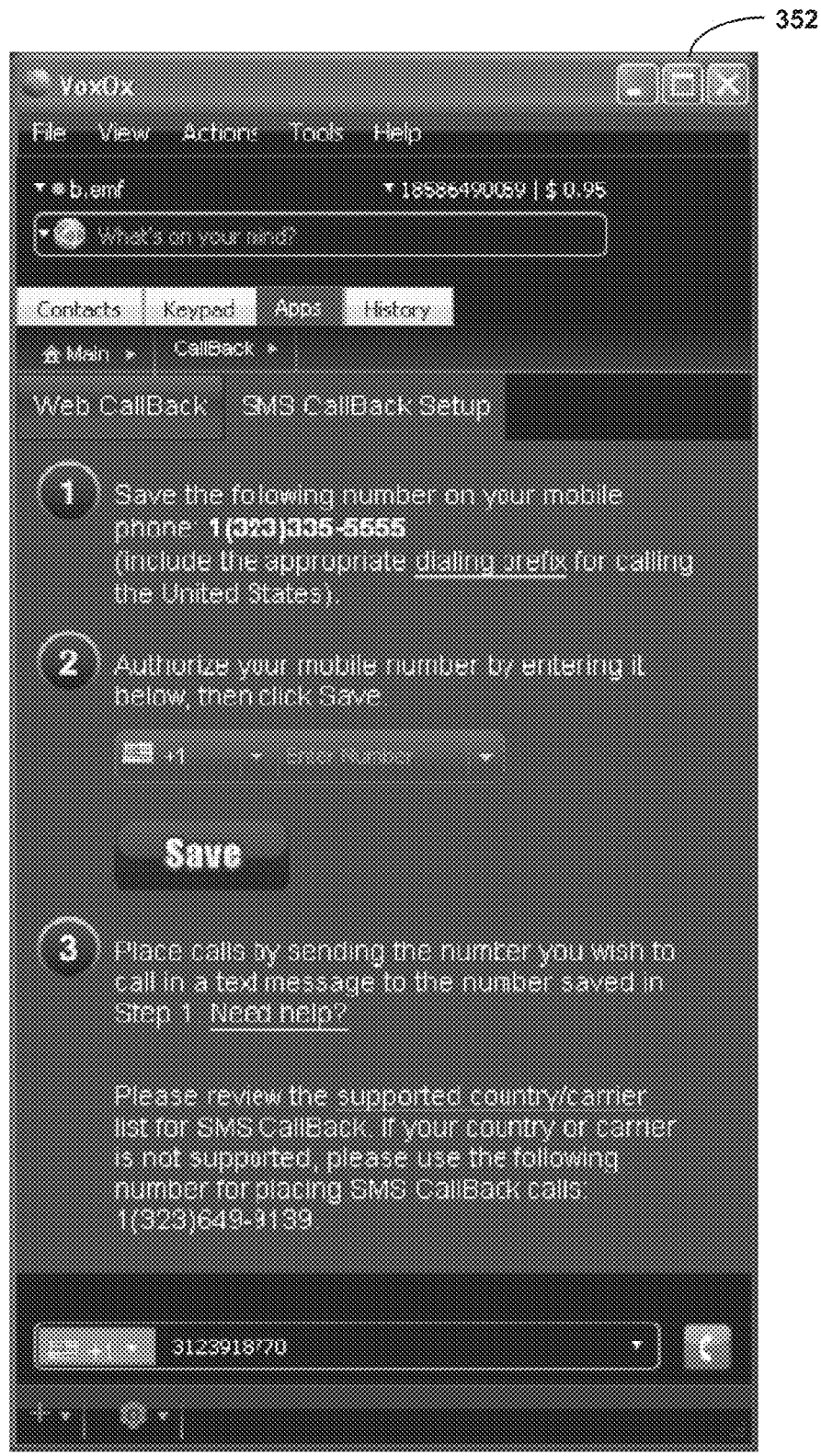
FIG. 52 shows a text-message-based call-back panel in a main window of a client.

The text message call-back feature may require prior setup before a user may use a text-message enabled device to initiate a call-back via text message. Accordingly, the text message call-back tab may display a panel, as shown in FIG. 52, having a text box to input the phone number of the text-message enabled device that will be used to initiate a text message call-back. The user may then select a button to store the phone number in the system for use when initiating the outbound call to the user.

The technical details of the call-back feature will be described in further detail below.

vi. Caller Identification Display

Figure 53:
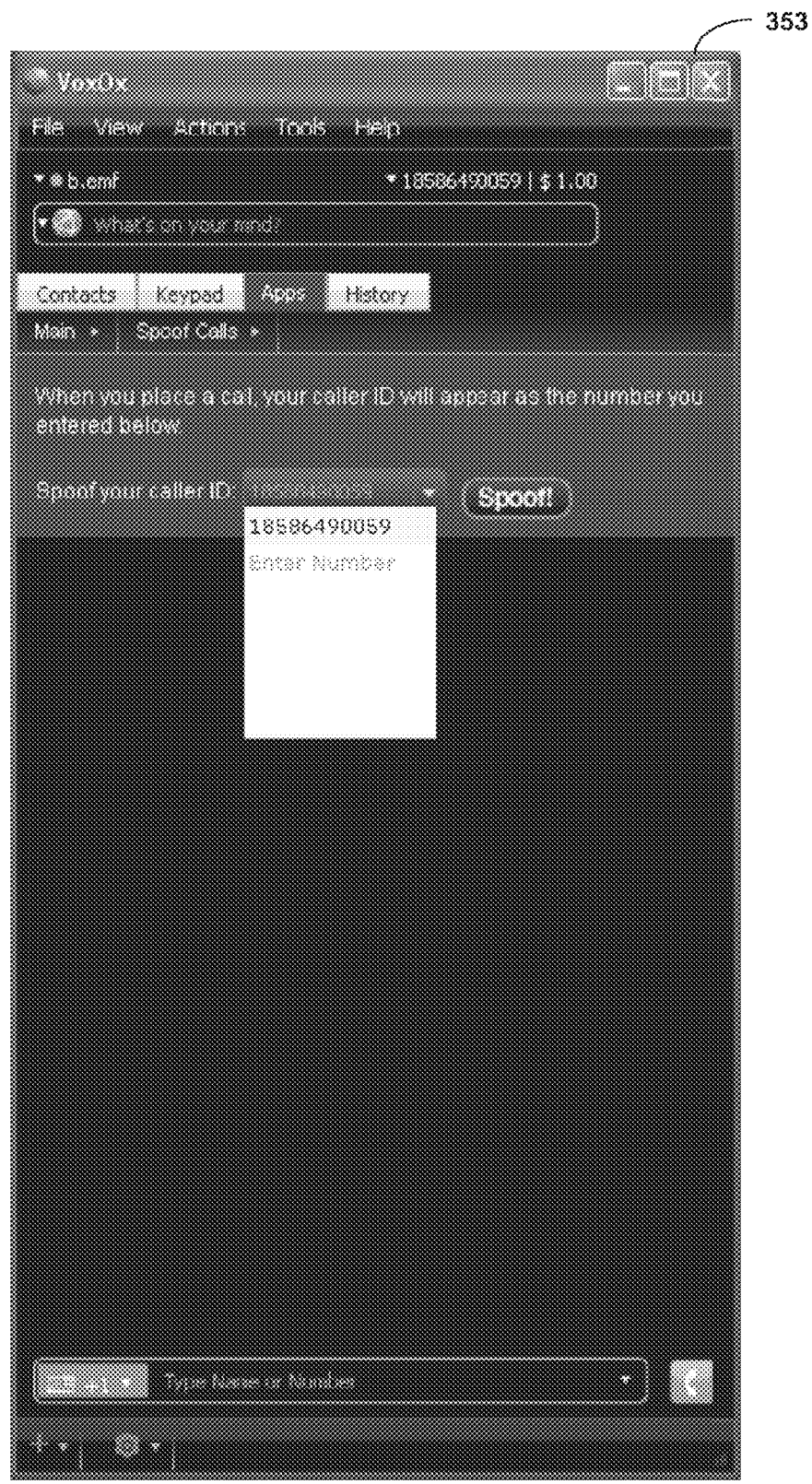
FIG. 53 shows a caller identification panel in a main window of a client.

The caller identification display button of the applications tab displays a panel, as shown in FIG. 53 that includes a text box to input a phone number to be presented to caller identification systems when placing an outbound call at the client. The technical details of the caller identification display will be described in further detail below.

vii. The Service Plan Manager

Figure 54:
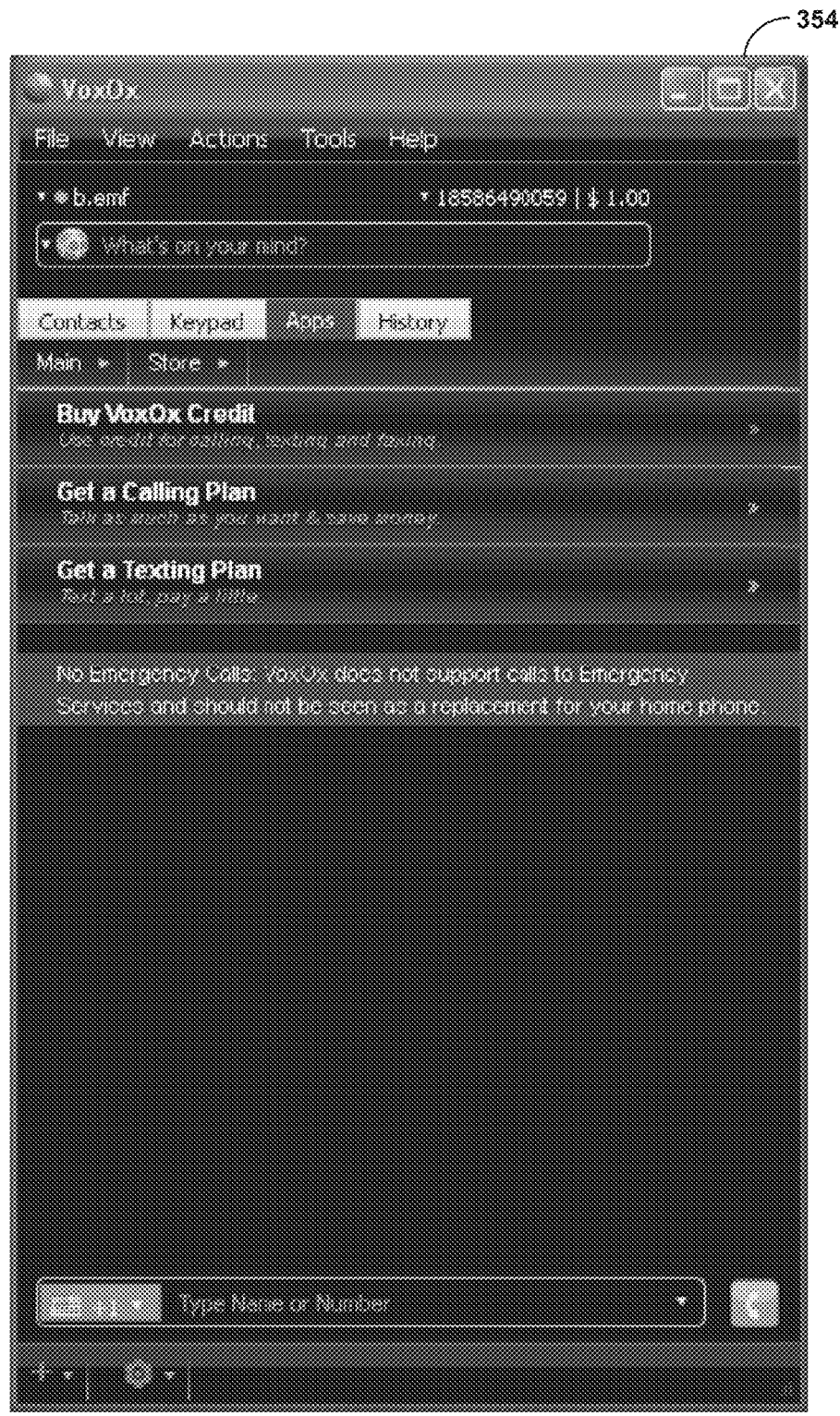
FIG. 54 shows a service purchase panel in a main window of a client.
Figure 55:
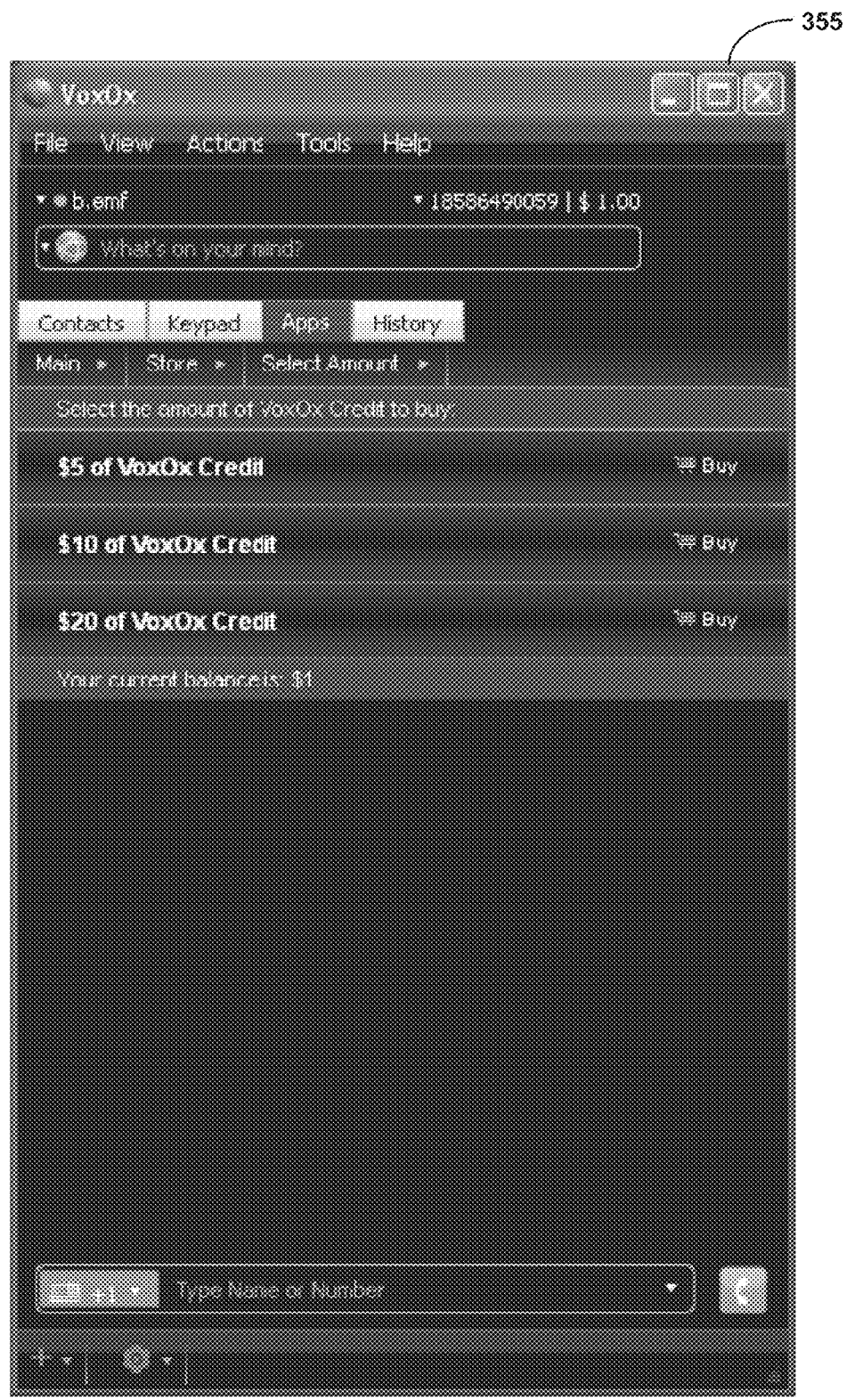
FIG. 55 shows a credit selection panel in a service purchase panel.
Figure 56:
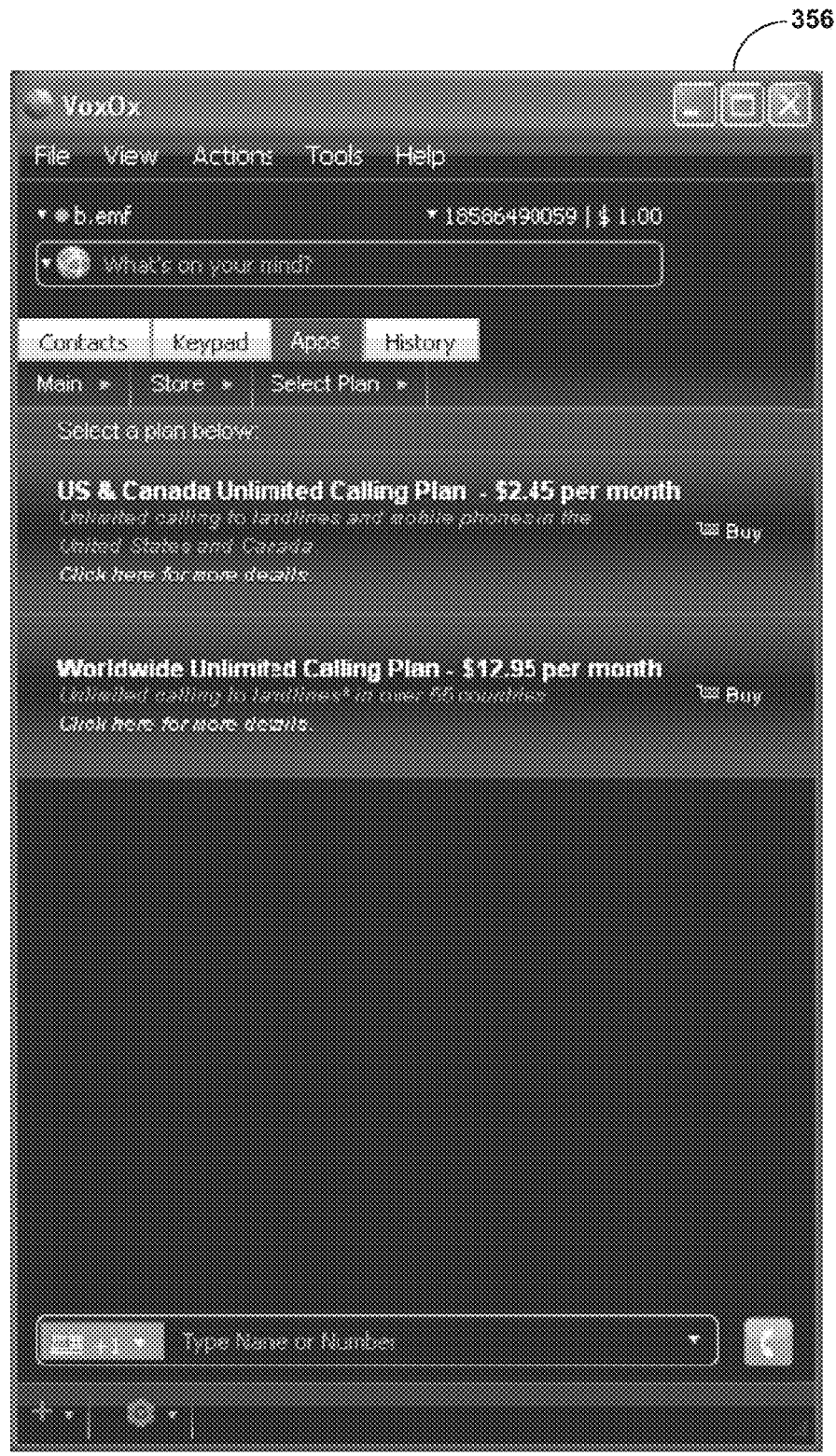
FIG. 56 shows a calling plan selection panel in a service purchase panel.
Figure 57:
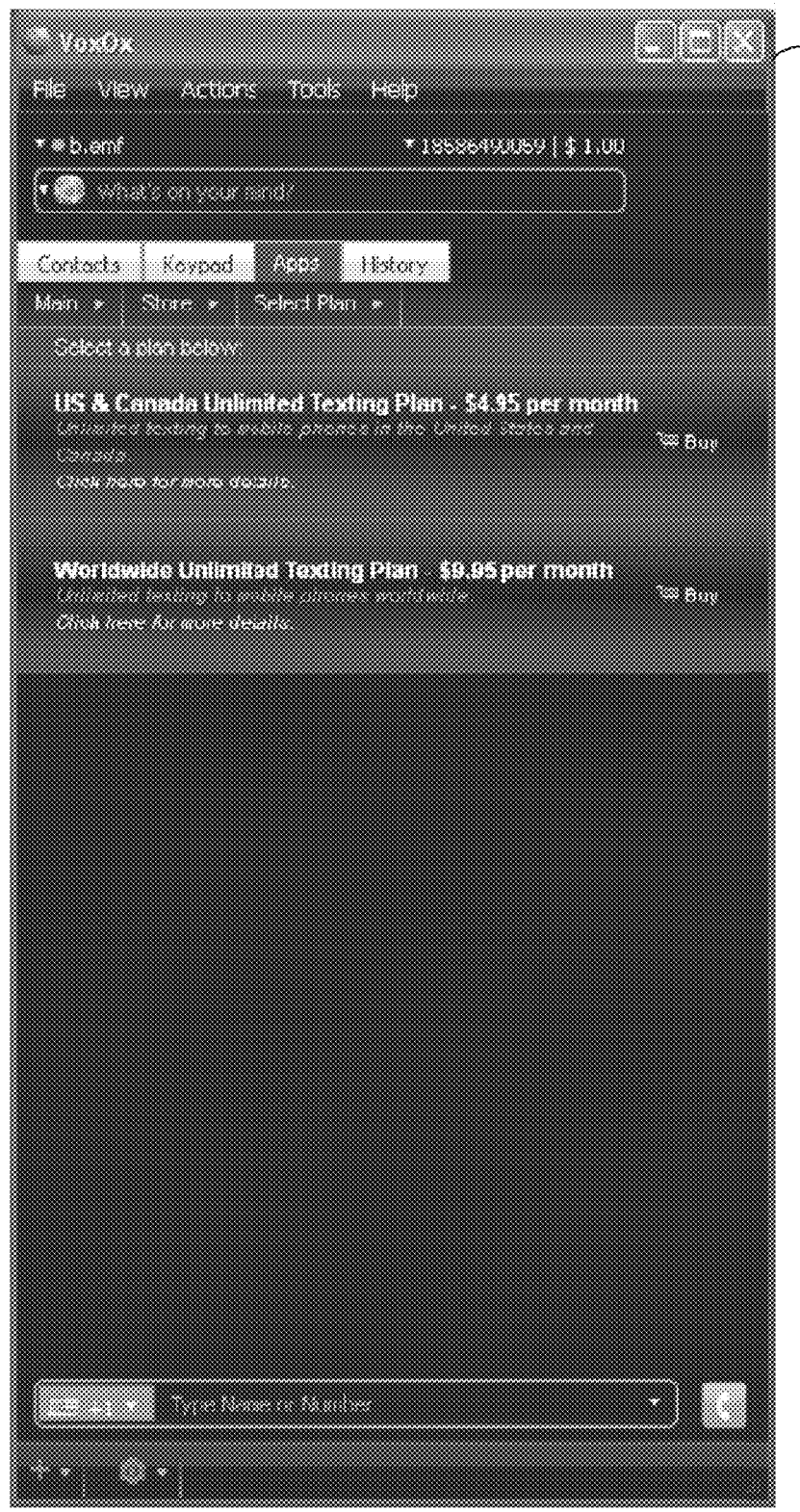
FIG. 57 shows a text-message plan selection panel in a service purchase panel.

The service plan manager button displays a service plan manager panel having buttons to purchase credits, calling plans, or text messaging plans that may be required to use the system as seen in FIG. 54. The service plan manager may also include the ability to purchase a virtual number. In a number in other embodiments, selecting the credit button displays a credit purchase panel having buttons to purchase variable amounts of credits such as, for example, $5, $10, and $20 worth of credits as seen in FIG. 55. Similarly, the calling plan purchase button and the text plan purchase button displays respective panels that include buttons to select a calling plan or a texting plan as seen in FIG. 56 and FIG. 57.

Figure 58:
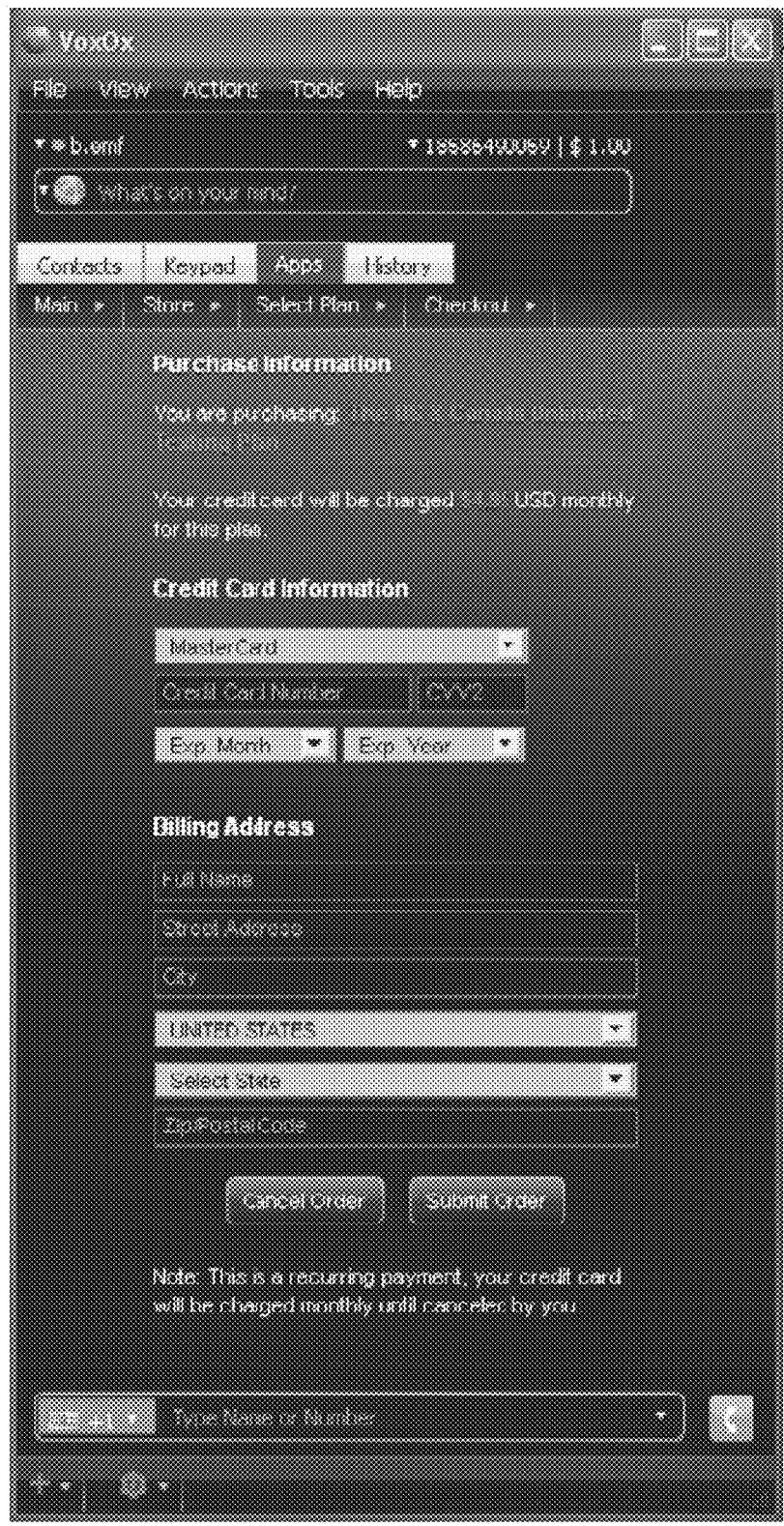
FIG. 58 shows a payment panel in a service purchase panel.

Selecting a credit amount, calling plan, or texting plan will then display a purchase panel having input elements to collect payment and billing information from the user. An example purchase panel is shown in FIG. 58. The purchase information panel includes buttons to cancel the order or submit the order. Selecting the cancel button may return the user to the service plan manager panel. Selecting the submit button transmits the payment and billing information to the host application for processing. The technical details of the service plan management feature will be described in more detail below.

4. The History Tab

Figure 59:
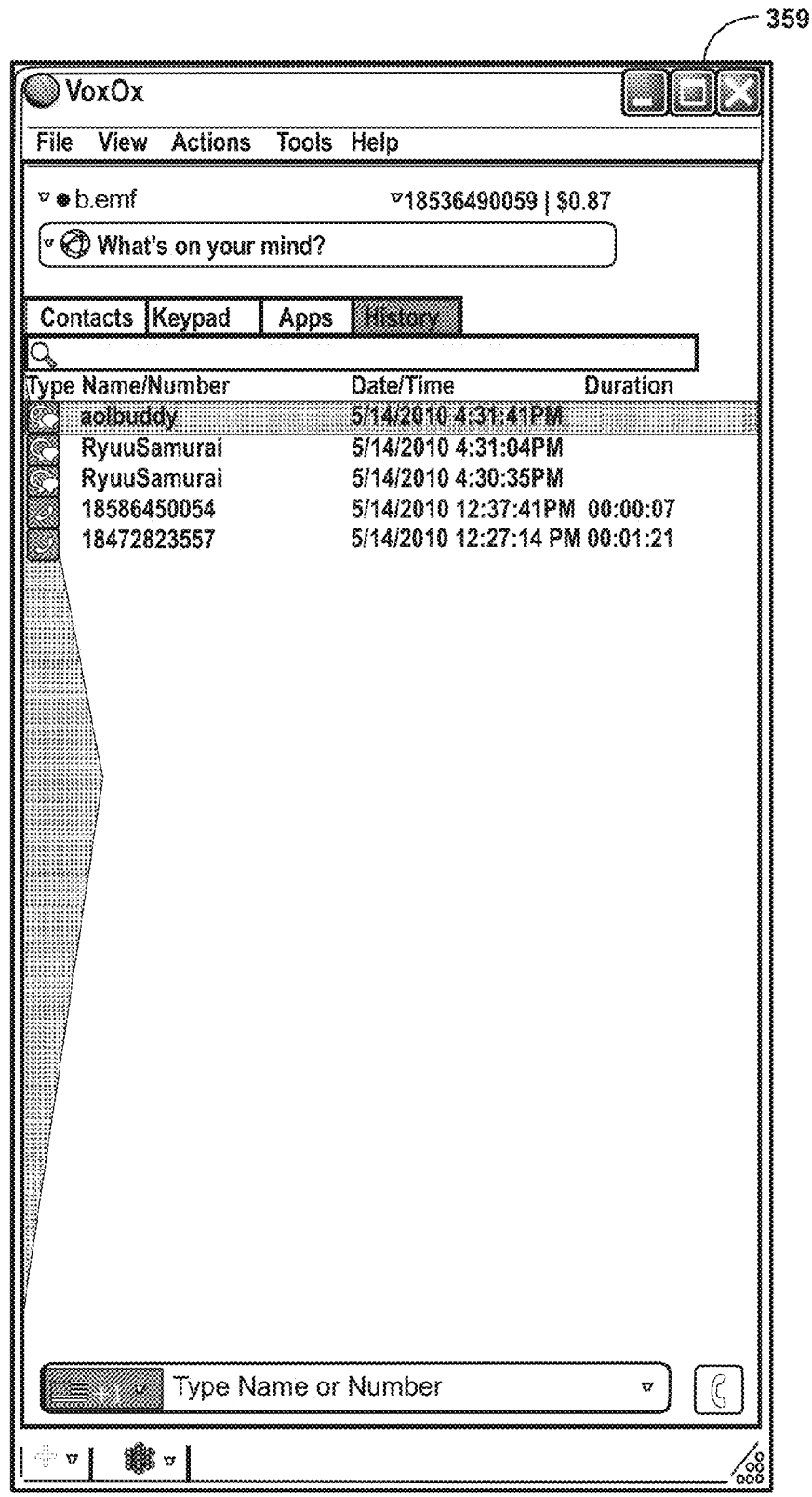
FIG. 59 shows a message history panel in a main window of a client.
Figure 60:
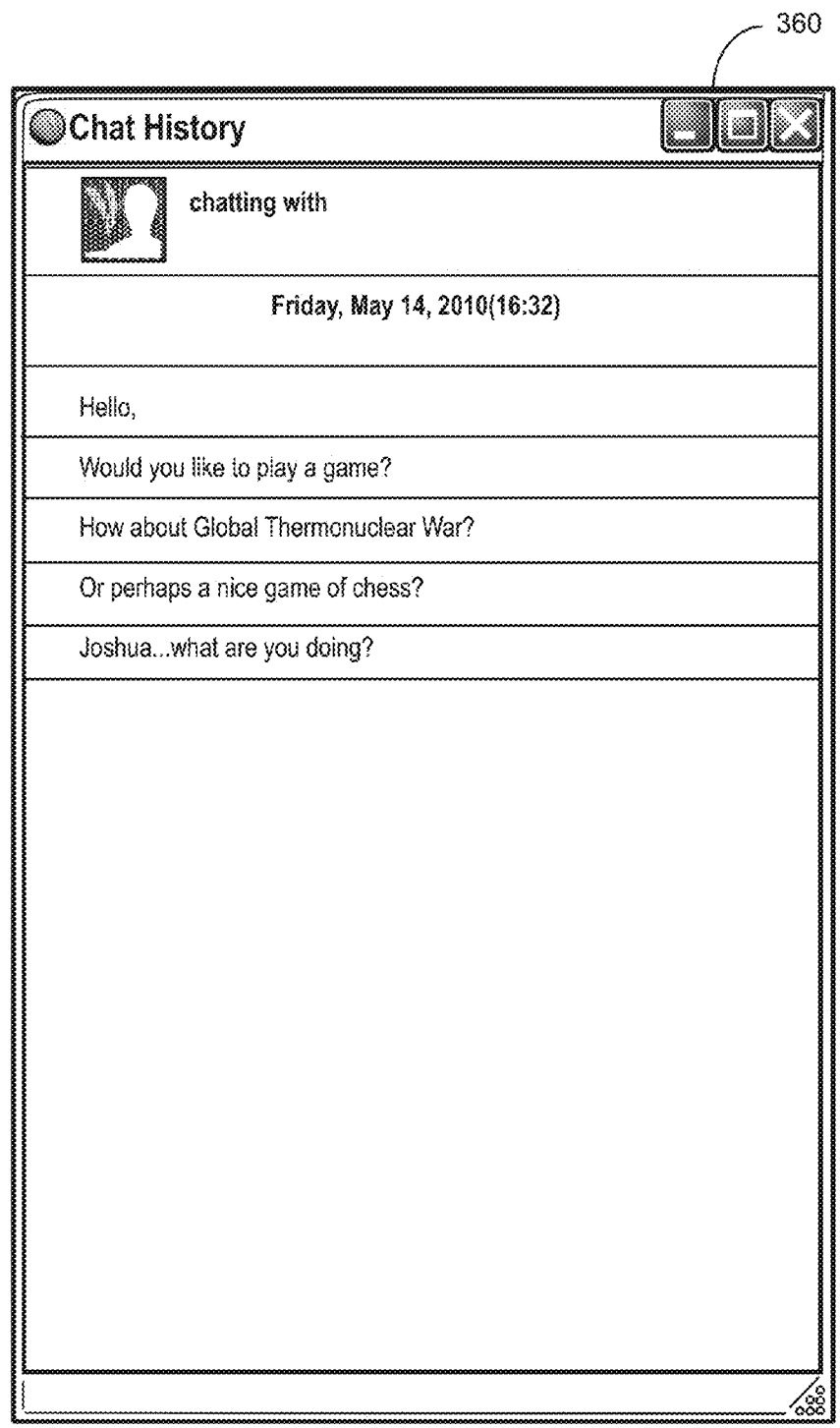
FIG. 60 shows an example history log in a transcript window of a client.

The history tab includes a list of all communications initiated or received at the client (e.g. inbound and outbound phone calls, text messages, text messages, email messages, faxes, and file transfers). An example history tab is shown in FIG. 59. A user may select an entry from the list to initiate a new phone call to the contact or display a transcript of the messages sent during the communication, as seen in FIG. 60. The system logs each text-based message sent and received by a user at the client. Selecting an entry for a text-based communication may display the transcript in a transcript window.

E. Configuration

The configuration module of the client receives information to configure the client according to the preferences of a user. The configuration module of the client also receives and stores personal and contact information of a user. Data associated with a contact may be stored in a database. If information about a contact is changed, any new information or the entire set of information may be passed through the API to store in the database. The contact information may be retrieved any time the UC 1 is available. In other embodiments, the information may be made inaccessible.

The configuration module of the client may communicate with an information engine of the host application to store user selected options and settings, profile information, and contact information in the system database.

F. Contact Management

The contact management module of the client receives information relating to user contacts and contact options and submits this information to the host application for storage in the system database. User contact information includes profile and contact information such as the street addresses, email addresses, phone numbers, and instant message "screennames."

The contact management module of the client may also communicate with an information engine of the host application to store user contact profile information, contact information, and contact options in the system database.

G. Voice-Based Communication

The voice message management module of the client provides a variety of features relating to phone calls. The voice message management module may send to and receive calls from contacts having landline, mobile cellular, or VoIP phone numbers. The voice message management module of the client may also acquire, display, retrieve, and playback voicemail messages for a user.

In addition, the voice message management module of the client provides advanced features that include: handling of incoming calls at the client; transferring calls at the client to landline or mobile phone numbers; providing options for notifications of voicemail; eavesdropping on the recording of voicemails; directing inbound calls at the client according to a hierarchy of phone numbers; customizing the path of incoming calls for particular contacts; and initiating calls between landline or mobile phones from the client.

The voice message engine of the host application facilitates the communication of voice-based messages using VoIP. Those skilled in the art recognize that VoIP refers to the delivery of voice or facsimile communications over packet-switched networks, such as the Internet. The voice message engine provides voice-based communication between a user at a client and contacts who may be using traditional landline, mobile cellular, or VoIP telephony systems.

The voice message management module of the host application facilitates the storage, query, retrieval, and transmission to the client of voicemails and recorded phone calls.

The technical details regarding various voice-based communications will now be described.

1. Outbound Phone Calls i. 2-Way Outbound Phone Calls

An example process illustrating the steps of an outbound phone call is now described. First, an advanced Network Address Translation ("NAT") and firewall detection is performed. This enables the client application to place a call and includes leveraging ICE, STUN, TURN and HTTP tunneling.

ii. 3-Way Conference Phone Calls

An example process of an outbound, 3-way conference call is now described. A 3-way conference call is created by building two unique calls and then initiating a "refer" to connect them together following a standard SIP call flow.

iii. Video Communications

Video calls may be made using the same process as the 2-way outbound call described above. In addition, known video codecs, such as H.264, are used to handle the video content.

2. Inbound Phone Calls i. Receiving Phone Calls

Figure 61:
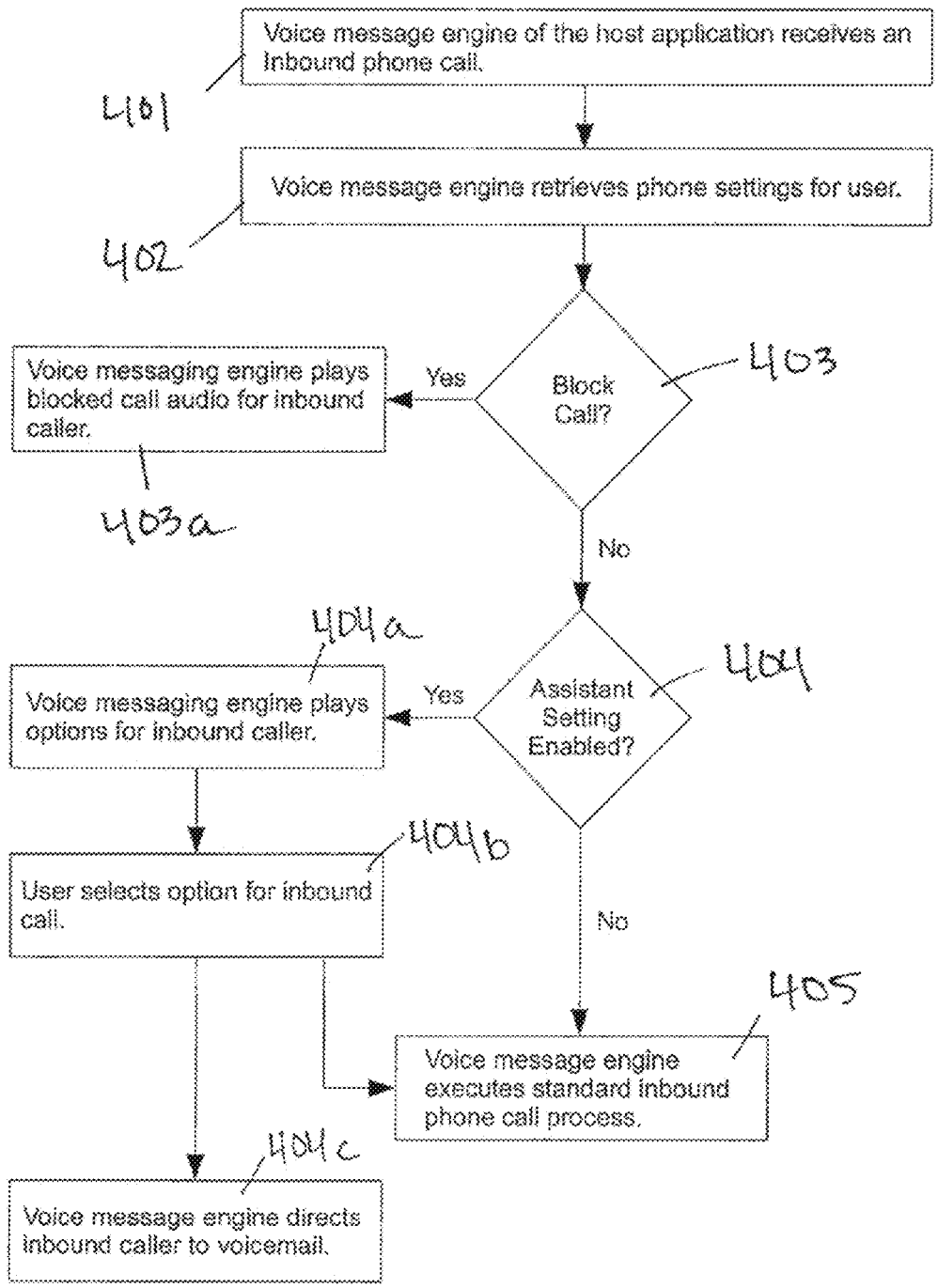
FIG. 61 is an example workflow of overall process for receiving an inbound phone call at the client.
Figure 62:
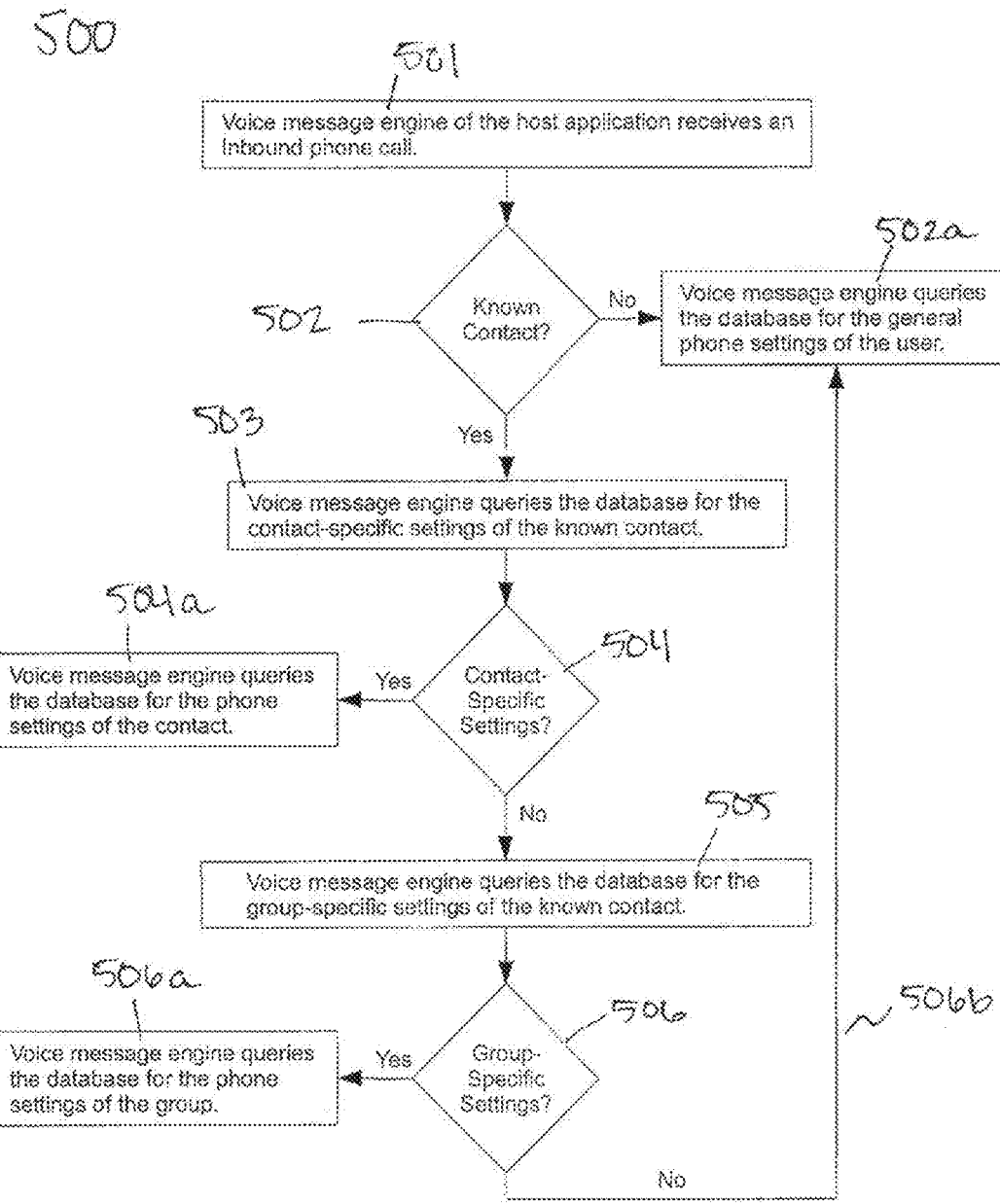
FIG. 62 is an example workflow for locating the phone settings for the inbound phone call process.

An example overall process 400 for receiving a phone call at the client is shown in FIG. 61. At step 401, the voice message engine of the host application receives an inbound phone call from the phone system. Upon receiving a phone call, the voice message engine first retrieves the phone settings for the user in order to determine how to handle the call. An example process 500 for retrieving the phone settings is shown in FIG. 62. Once the phone settings have been retrieved, the voice message engine may determine how to handle the inbound call.

In step 403, the voice message engine determines if the block call setting is enabled. If so, the voice message engine plays the blocked call audio for the caller at step 403A. The blocked call audio may be a standard busy signal, computer generated speech, or an audio file uploaded by the user. If the blocked call setting is not enabled, the voice message engine determines if the assistant setting is enabled in step 404.

If the assistant setting is enabled, in step 404A, the voice message engine informs the user of options for answering the call—either directing the call to voicemail, as shown in step 404C, or executing the standard inbound call process, as shown in step 405, which may include screening the call or locating the user.

Referring now to FIG. 62, an example process for retrieving the phone settings of a user is shown. As mentioned above, the voice message engine retrieves the phone settings when an inbound call is received at step 501. In step 502, the voice message engine determines if the inbound caller is a known contact according the caller identification information. If the inbound call is not a known contact, the voice message engine will query the database for the general phone settings of the user in step 502A.

However, if the inbound call is a known contact, the voice message engine, in step 503, determines if the user has stored contact-specific phone settings in the system. If contact-specific phone settings exist, the voice message engine queries the database for the phone settings of the known contact in step 504A. If no contact-specific phone settings exist, the voice message engine, in step 505, determines if group-specific phone settings exist for the group to which the contact belongs. If group-specific phone settings exist at step 506, the voice message engine queries the database for the phone settings of the group in step 506A. However, if no contact-specific phone settings and no group-specific phone settings are stored for the known contact, the voice message engine queries the database for the general phone settings stored for the contact in step 506B.

Figure 63:
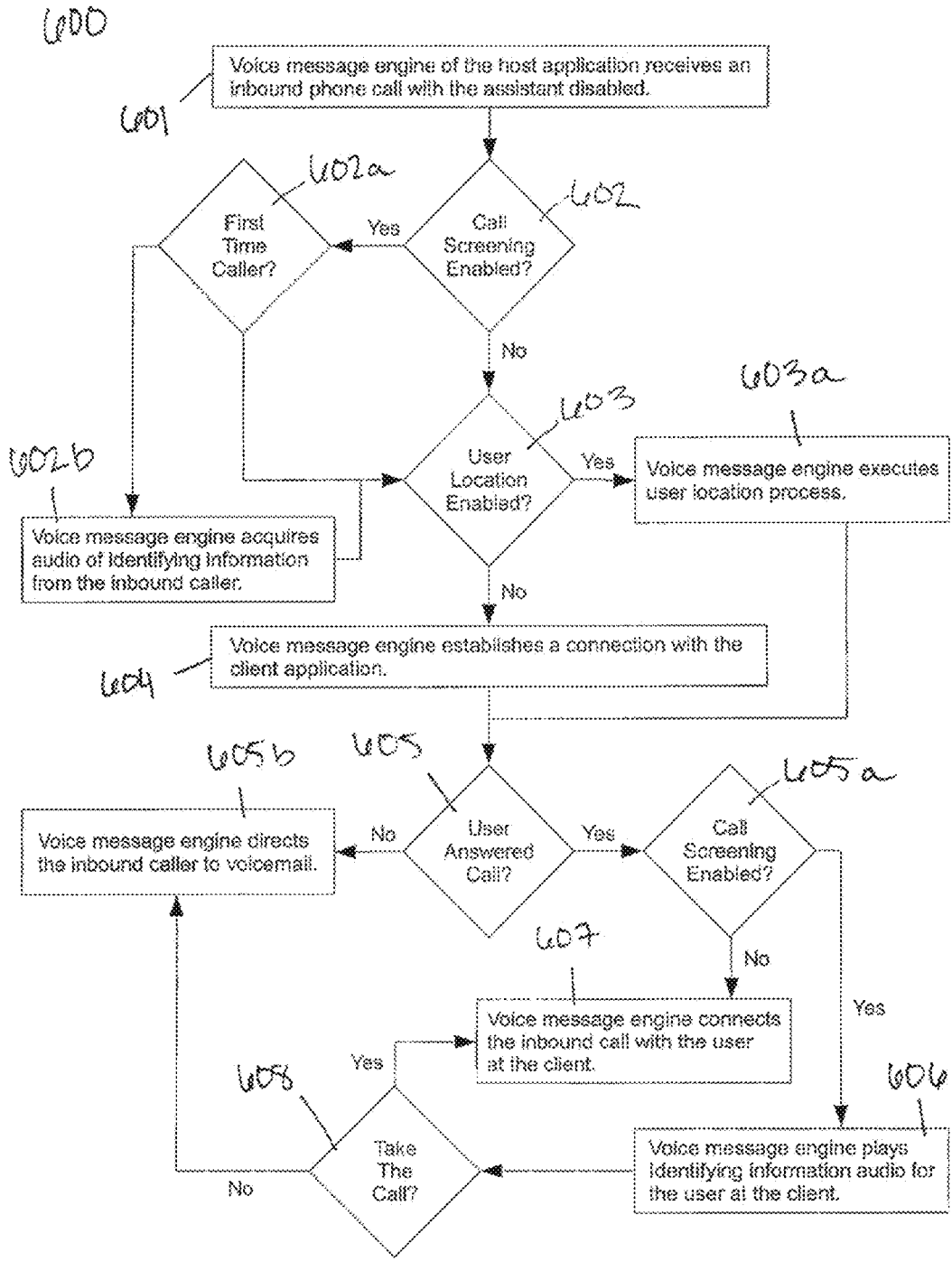
FIG. 63 is an example workflow of the process for establishing a connection between a caller and the client.

With reference to FIG. 63, an example process for the standard inbound phone call process 600 is shown. In step 601, the voice message phone system receives an inbound phone call with the assistant setting disabled. The voice message engine then determines, in step 602, whether the call screening setting is enabled. If the call screening setting is enabled, the voice message engine determines, in step 602A, if the inbound call is the first time the contact has called the user. If so, the voice message engine acquires identifying information from the contact, such as a name, and stores this identifying information in the database at step 602B before proceeding to step 603.

Figure 64:
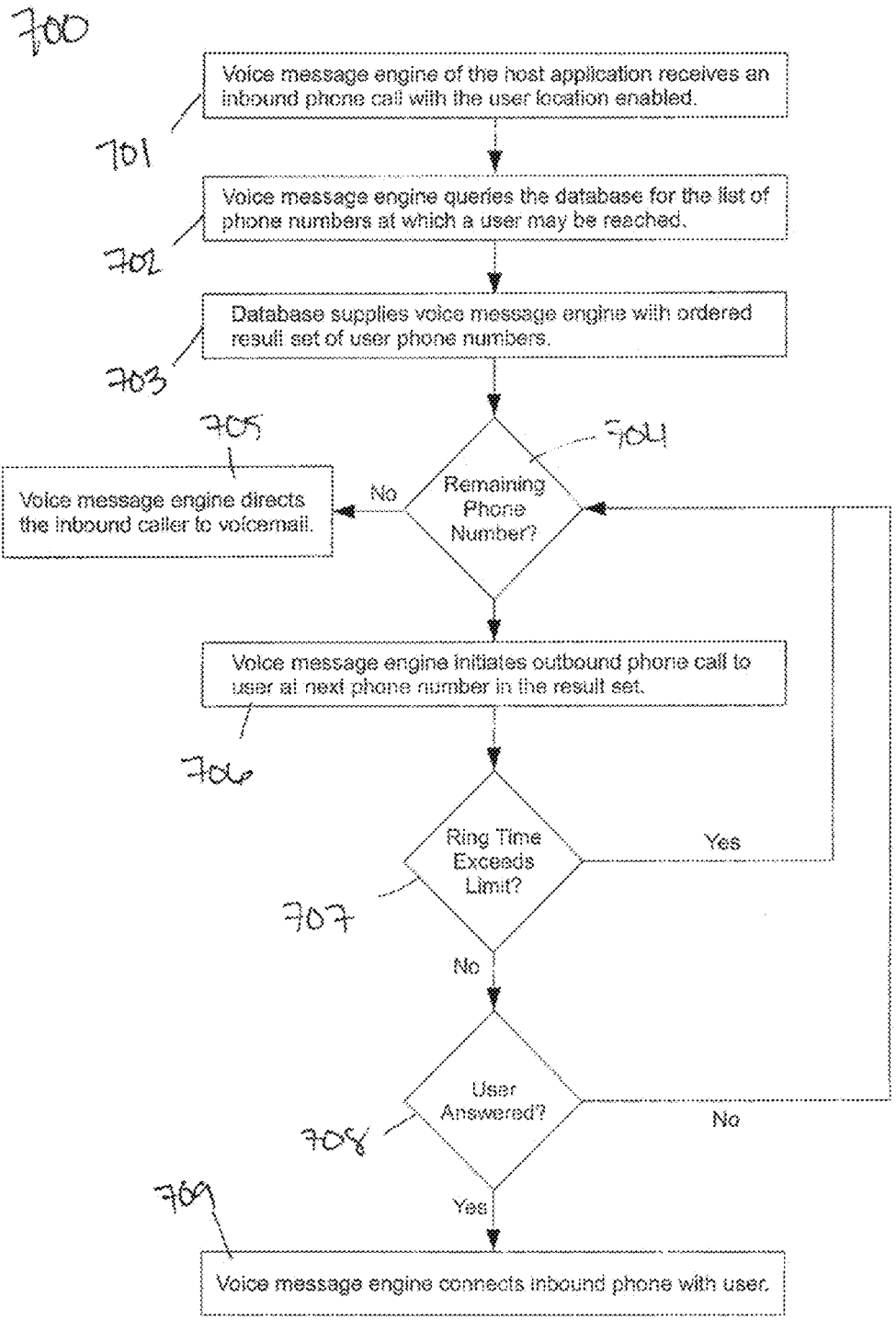
FIG. 64 is an example work flow for the call direction process to locate a user at different phone numbers.

The voice message engine also proceeds to step 603, if call screening is not enabled or the contact is not a first time caller. In step 603, the voice message engine determines if the user location setting is enabled. If so, the voice message engine executes the user location process in step 603A and as shown in FIG. 64. If not, the voice message engine determines establishes a connection with the client application in step 604 and the proceeds to determine whether the user has answered the inbound call in step 605.

If the user has not answered the inbound call, the voice message engine directs the call to voicemail in step 605B. If the user does answer the inbound call, the voice message engine again determines, in step 605A, if the call screening setting is enabled. If the call screening setting is not enabled, the voice message engine connects the inbound caller to the user in step 607. If the call screening setting is enabled, the voice message engine plays the identifying information stored for the contact in step 606, and provides the user the option to accept or reject the call in step 608. If the user accepts the call, the voice message engine connects the inbound caller with the user in step 607. If the user rejects the call, the voice message engine directs the inbound caller to voicemail in step 605B.

ii. User Location

The UC 1 includes a feature that will initiate and direct phone calls to a hierarchy of phone numbers at which the user may be reached. An example process 700 for directing phone calls is shown in FIG. 64. In step 701, the voice message engine receives an inbound phone call to the user at the client where the user locate setting is enabled. In step 702, the voice message engine queries the database for the ordered list of phone numbers at which the user may be reached, and the database supplies the voice message engine with a resulting set of phone numbers at step 703.

In step 703, the voice message engine initiates an outbound phone call to the user at the current number in the list. The voice message engine monitors how long the phone call rings at the current number and determines, in step 704, if the time exceeds the maximum ring time for that phone number. If the ring time exceeds the limit, the voice message engine moves on to the next phone number in the list in step 704 and initiates an outbound call to the next phone number in the set in step 706. If the ring time does not exceed the limit and the user answers the phone call, the voice message engine connects the user with the inbound call at step 708.

In step 705, the voice message engine will direct the inbound call to voicemail if there are no remaining phone numbers in the list.

iii. Transferring Phone Calls

Phone calls may be transferred using the "refer" message as discussed above concerning conference calls.

3. Call-Back

Call-back is a feature of the UC whereby the system will initiate two outbound phone calls—one to a user and one to a contact—and bridge the two outbound calls to provide a connection between the user and the contact. The UC provides two options for a call-back, a web call-back and a text message call-back.

The web call-back feature accepts two phone numbers at the client—the phone number of the user and the phone number of the contact. The system then initiates a phone call to the user at the supplied user phone number and a phone call to the contact at the supplied contact phone number. The outbound calls are then bridged so that the user may communicate with the contact.

The text message call-back feature allows a user to send a text message containing the contact number to call, and the system will initiate two outbound calls to bridge the calls and establish a connection with the contact. Like the web call-back feature, one outbound call is initiated to the supplied contact phone number. The other outbound call of the text message call-back feature is initiated to the phone number at which the text message originated.

i. Web Call-Back

Figure 65:
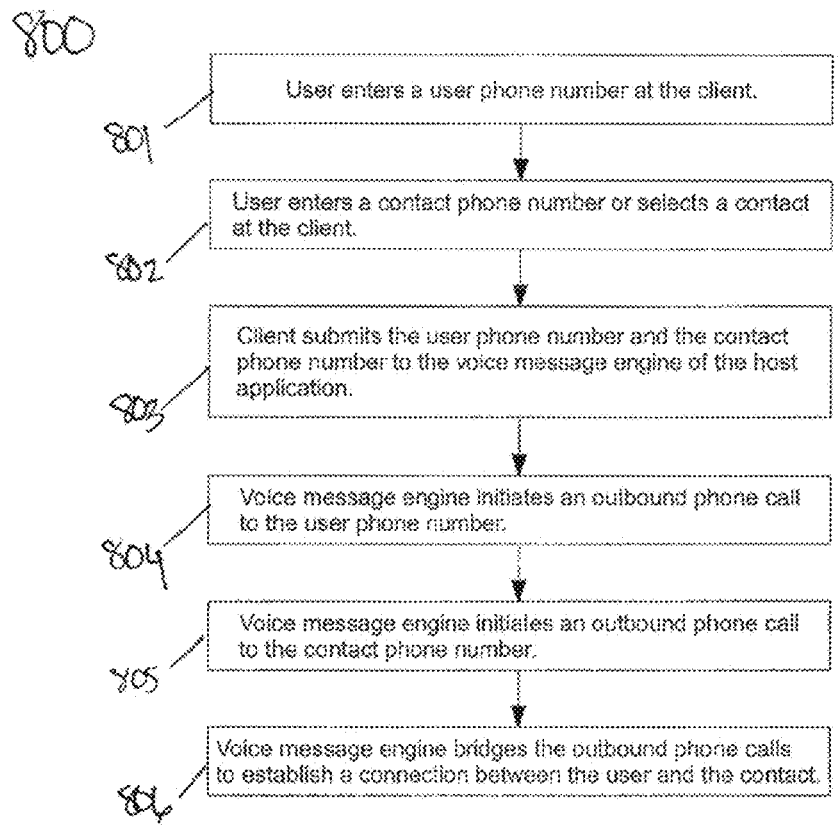
FIG. 65 is an example of the process for a web-based call-back.

An example web call-back process 800 is shown in FIG. 65. In step 801, a user enters a user phone number at the client as discussed above in reference to FIG. 51. The user phone number is the phone number at which the system may call the user. Next, in step 802, the user enters a contact phone number or selects a contact to call at the client also as mentioned above in reference to FIG. 51. The user then, in step 803, submits these numbers to the voice message engine of the host application. The voice message engine then initiates two outbound phone calls—one to the user at the user number and one to the contact at the contact phone number—as seen in step 804 and step 805. The voice message engine then bridges the two outbound phone calls to establish a connection between the user and the contact at step 806. Once the phone calls are bridged and the user and the contact answer the respective outbound phone calls, each may begin communicating.

ii. Text-Message Call-Back

Figure 66:
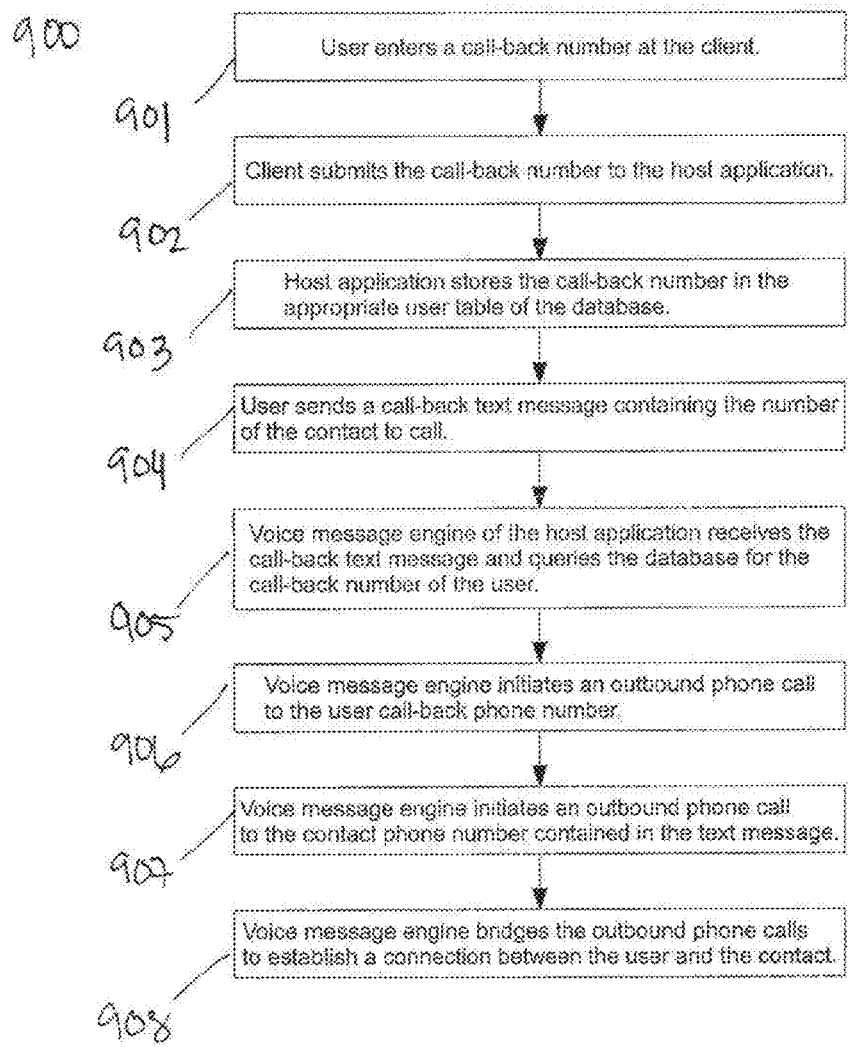
FIG. 66 is an example of the process for a text-message-based call-back.

The text-message call-back feature of the UC may require a user to register the phone number with which the user will be requesting text-message call-backs. Shown in steps 901 through step 908 is an example of the text-message call-back process 900 of FIG. 66.

In step 901, the user enters a call-back phone number at the client as mentioned above with reference to FIG. 52. In step 902, the user submits the call-back number to the host application, and the host application stores the call-back number in the appropriate user table of the database as seen in step 903. Once the call-back number is stored in the database, the user may initiate a call-back via text message.

As seen in step 904, a user submits a text message to a call-back phone number associated with the universal communication system. The text message includes the number of the contact the user desires to call. In step 905, the voice message engine of the host application receives the text message and queries the database for the call-back number of the user. As above, the voice message engine then initiates an outbound call to the user at the call-back number in step 906 and an outbound call to the contact at the number contained in the text message in step 907. The voice message engine then bridges each outbound phone call to establish a connection between the user and the contact at step 908.

H. Text-Based (Non-Voice) Communication

The client and the host application are adapted to facilitate text-based communications, including text messages, instant messages, and email messages. Accordingly, the client includes a text-based message management module that communicates with a text message engine, an instant message engine, and an email message engine of the host application.

The text-based message management module of the client sends from the client and receives at the client text messages, instant messages, and email messages between a user and a contact.

1. Text Messaging

The text messaging engine of the host application facilitates the transmission of text messages via a network between a user at a client and a contact using a computing device capable of receiving text messages, such as a mobile cellular phone. Those skilled in the art will recognize that the text message engine may transmit text messages via a cellular network and/or an IP-based network such as the Internet.

If a user enables text forwarding, the server may perform additional steps when an inbound message is received. First, the server may determine if the user is online, away, or offline. The server may look at a user's preferences to determine how deliver a message. The server may redirect messages, when a user is offline.

2. Instant Messaging

The instant messaging engine of the host application communicates via a network with one or more instant messaging services to facilitate communication between a user at a client and a contact using an instant messaging service. Similarly, the social networking engine of the host application communicates with one or more social networks to facilitate communication between a user at a client and a contact using a social network service.

I. Faxing

The fax management module of the client receives faxes at the client, transmits faxes from the client, displays a list of received faxes at the client, and requests received faxes stored in the system database from the host application.

The fax module of the host application retrieves fax documents stored in the system and transmits the fax documents to the client for display. The fax engine of the host application facilitates the transmission of facsimile documents between a user at a client and a contact. The fax engine may transmit a fax to a traditional fax machine via a public switch telephone network (PSTN) or electronically via an IP-based network such as the Internet.

The fax management module of the host application facilitates the storage, query, retrieval, and transmission to the client of faxes received.

J. File Transfer

The file transfer module of the client receives a file selection from a user, uploads the file to the server, and provides the user with a link to the file which may then be sent to contacts and used to download the file.

The file transfer engine of the host application facilitates the transmission of files between a user at a client and a contact. The file transfer engine receives a file from a client and stores the file on the server. The file transfer engine also creates a uniform resource identifier (URI) (e.g., a uniform resource locator (URL)) that represents a path to the file residing on the server. The file transfer engine provides the user at the client with the identifier, and the user may then transmit the identifier to a contact by text message, instant message, or email. A contact may use the identifier to download the file.

1. Uploading a File

Figure 67:
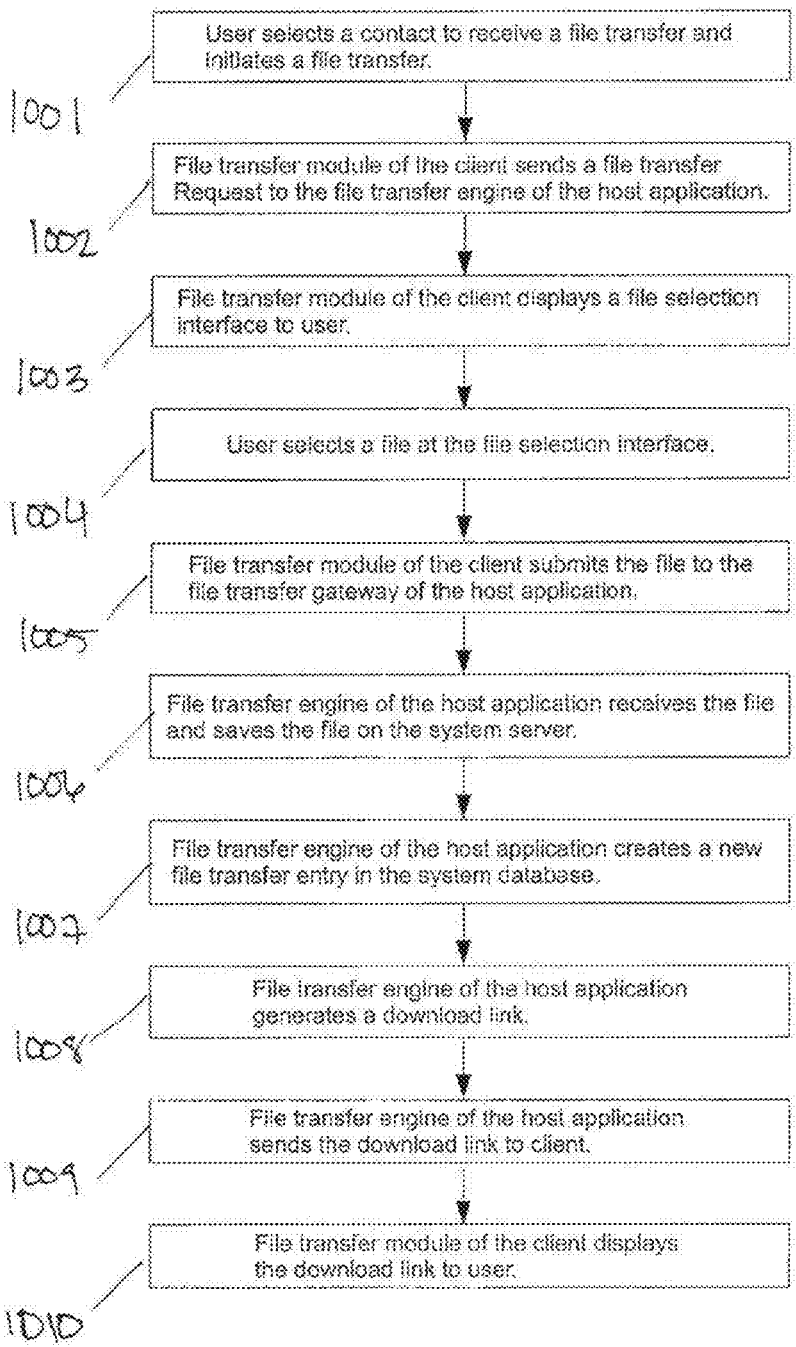
FIG. 67 is an example workflow for uploading a file for a file transfer.

An example file upload process 1000 is shown in FIG. 67. At step 1001, a user at a client selects a contact to receive a file transfer. At step 1002, the user submits to the client a file transfer request to the selected user. The user may initiate a file transfer to a contact using any of the methods described above.

At step 1005, the file transfer module of the client sends a file upload request to the file transfer engine of the host application. The upload request may be, for example, an HTTP request having the following format: https://filetransfer.voxox.im/upload_step1/[UNIQUE_ID]/[VOXOX_ID]/[RECIPIENT]. In this example, [UNIQUE_ID] is a unique identifier generated by the file transfer module; [VOXOX_ID] is the username of the user uploading the file at the client; and [RECIPIENT] is a URI for the recipient of the file.

The file upload request is used to display a file upload interface, as shown in step 1003, for selecting a file to upload. The file upload interface may be, for example, an HTML-based form having file selection controls. An example file selection interface is shown in FIG. 22. The file transfer engine of the host application may receive the file transfer request and serve the file selection form to the client. At step 1004, the user selects a file to transfer at the file selection interface.

At step 1005, the file transfer module of the client submits the file to the file transfer engine of the host application. The file transfer module may submit the file via, for example, an HTTP POST request having the following format: https://filetransfer.voxox.im/upload_step2; and having the following variables: $file; $uid; $voxox_id; and $recipient. In this example, $file is the file to be transferred; $uid is the same unique identifier generated by the file transfer module; $voxox_id is the username of the user uploading the file; and $recipient is the same URI for the recipient of the file as mentioned above.

At step 1006, the file transfer engine of the host application receives the file and saves the file on the system server. The file transfer engine may save the file with the following internal naming format: [FILE MD5 CHECKSUM]-[UPLOAD TIMESTAMP]. In this example, the [FILE MD5 CHECKSUM] is the result of the MD5 hashing algorithm with the upload file as input; and the [UPLOAD TIMESTAMP] is the time at which the file was uploaded.

In addition to saving the file on the system, the file transfer engine creates a new entry in the file transfer history table of the database at step 1007. The file transfer engine may also include the following information in the new entry: a unique identifier for the new entry; the username of the sender; a URI for the recipient; an upload timestamp; the internal filename generated by the file transfer engine; the actual filename of the file as uploaded; and the number of times the file has been downloaded.

At step 1008, the file transfer engine generates a download link, which may be used to retrieve the file. The download link may be in the following format: https://filetransfer.voxox.im/download/[FILENAME]/[USERNAME MD5 CHECKSUM]. In this example, the [FILENAME] is the internal or real filename of the uploaded file; and the [USERNAME MD5 CHECKSUM] is the result of the MD5 hashing algorithm with the username of the user that uploaded the file as input. Following the generation of the download link, the file transfer engine sends the download link to the user at the client in step 1009, and the client displays the download link to the user in step 1010.

2. Downloading a File

Figure 68:
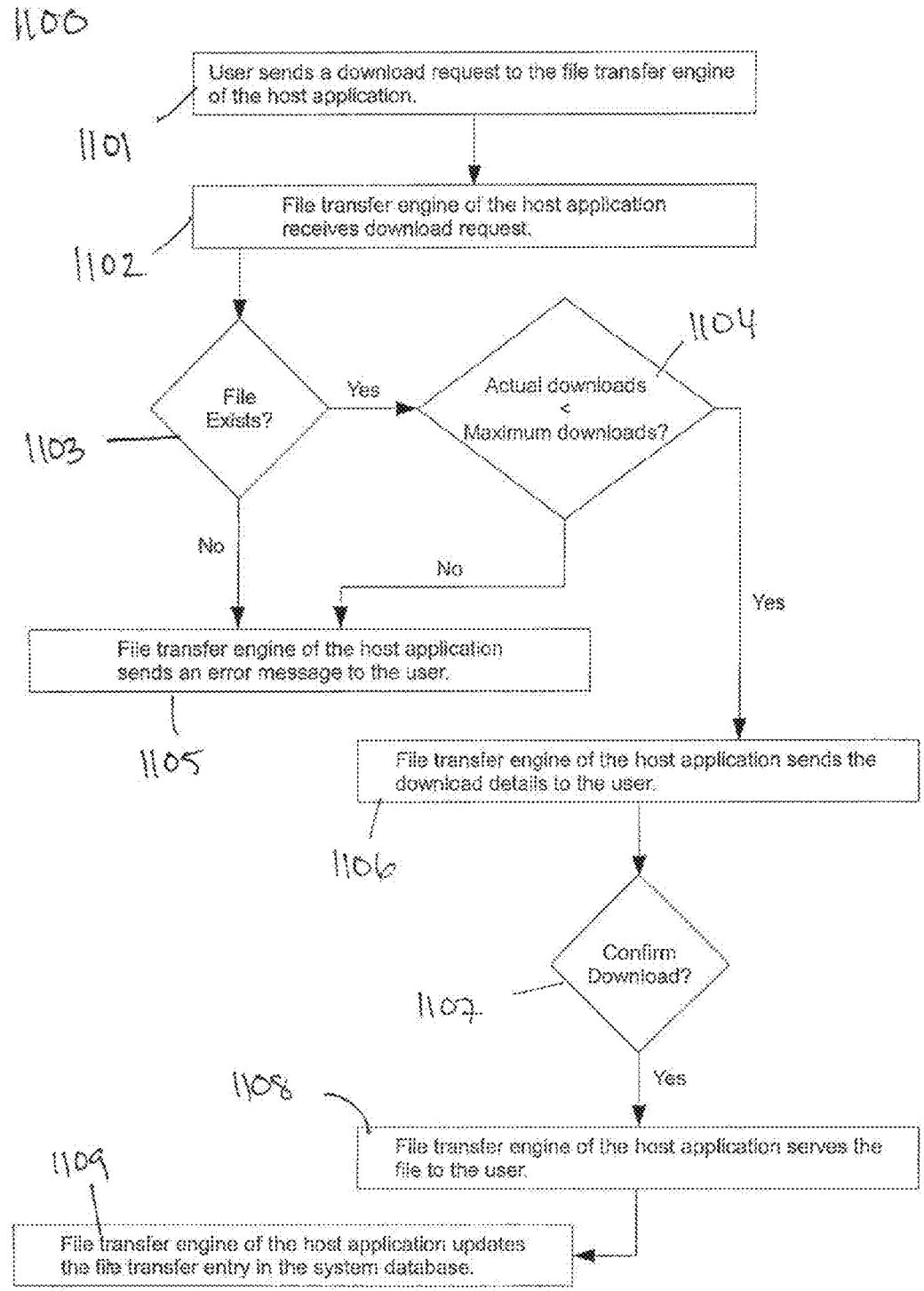
FIG. 68 is an example workflow for downloading a file from a file transfer.

An example file download process 1100 is shown in FIG. 68. At step 1101, a user at a computing device sends a download request to the file transfer engine of the host application. The download request may be in the form of the download link as described above. At step 1102, the file transfer engine receives the download request, and the file transfer engine checks that the file exists on the system server in step 1103. If the file does not exist, the file transfer engine sends an error message to the user at the computing device in step 1105.

At step 1104, the file transfer engine determines if the number of times the file has been downloaded exceeds the maximum number of downloads allowed. The file transfer engine queries the file transfer database for the entry associated with the file indicated in the download link. The file transfer engine then extracts from the resulting entry the number of times the file has been downloaded. If the number of times the file has been actually downloaded exceeds the maximum number of allowable downloads, the file transfer engine will send an error message to the user in step 1104, as mentioned above. If the number of times the file has been downloaded is less than the number of maximum allowable downloads, the file transfer engine sends download information to the user at the computing device as seen in step 1106. If the user confirms the download of the file in step 1107, the file transfer engine of the host application serves the file to the user in step 1108 and the file transfer engine will update the file transfer entry in the database at step 1109.

K. Translation

A client may use a translation module at the client to translate inbound and outbound text-based messages. The translation module of the client provides an interface with which the user may configure the translation module. An example translation configuration interface is shown in FIG. 17. A user may enable or disable the translation of both inbound and outbound messages. When translation is enabled, a user may select the source text language and the target language for the inbound and outbound messages. The source text language is the language of the text to be translated, and the target language is that of the resulting translated text.

The translation engine of the host application receives the translation settings from the translation module of the client and automatically translates text-based messages (e.g. text messages, instant messages, and email messages) exchanged between the client and a contact. The translation engine utilizes a translator, such as an Internet web-service, to perform the translation of the messages.

Figure 69:
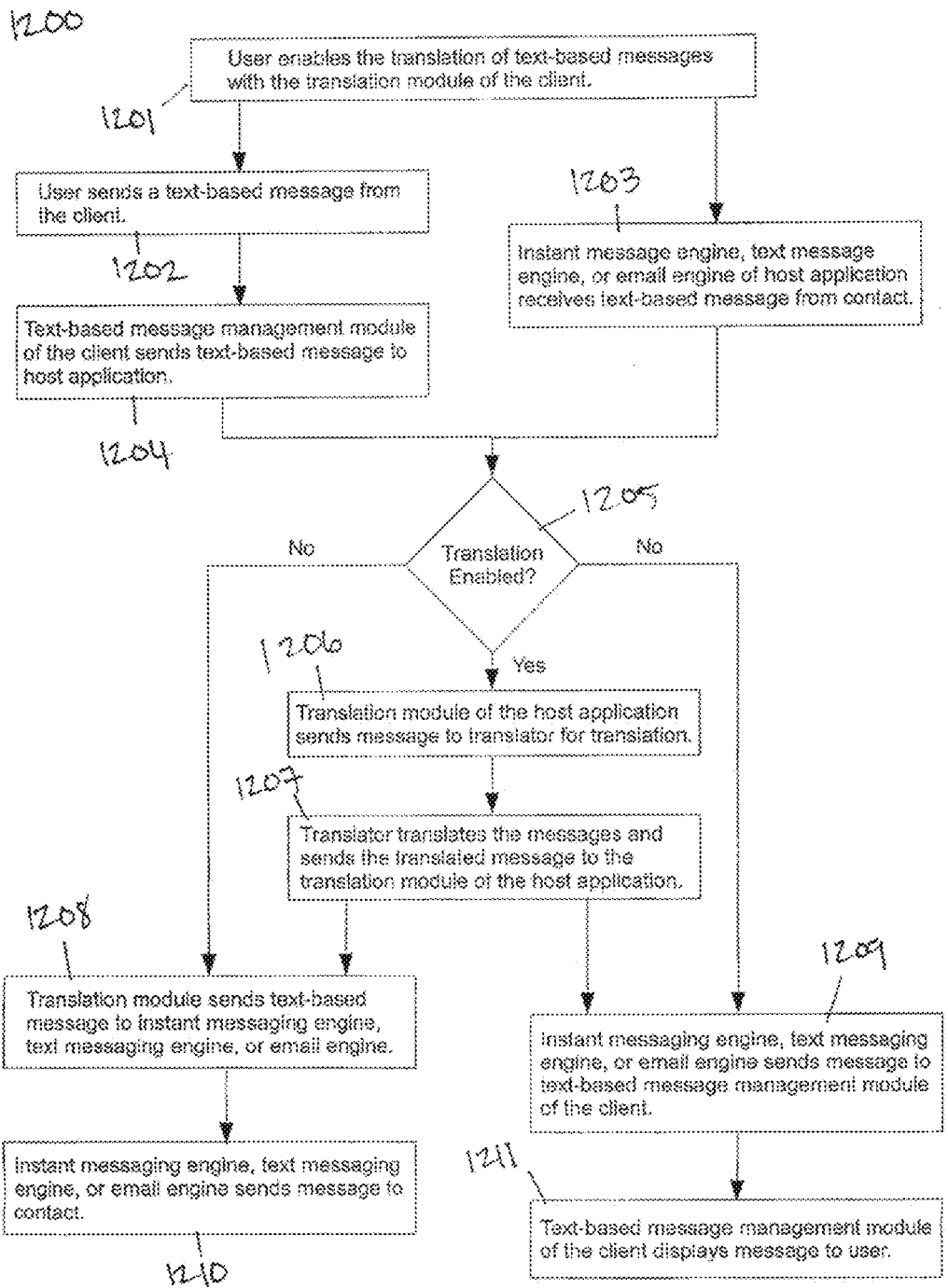
FIG. 69 is an example workflow for the translation of inbound and outbound messages.

An example translation process 1200 for inbound and outbound text-based messages is shown in FIG. 69. The translation process begins after a user has enabled the translation of inbound and outbound messages at step 1201. In step 1202, a text based message is sent from the client, which is then sent to the host application at step 1204. In step 1203, a text-based message from a contact is received at the host application. At step 1205, if translation is enabled, the translation module sends a message to the translator at step 1206. At step 1207, the translator sends the translated message to the translation module. At step 1208, the translation module sends the text-based message to one of several engines. At step 1210, one of several engines sends message to contact. One of several engines may also send the message to the text-based message management module of the client at step 1209, and then the message may be displayed to the user at step 1211.

Referring again to step 1205, if translation is not enabled, steps 1208-1211 may be performed as shown and described above.

L. Service Plan Management

The service plan management module of the client and the host application monitor usage of the system and collect and process payment information for subscribing to usage plans or for purchasing credits, which may be required to use certain features of the system. Accordingly, the service plan management module may communicate with other modules of the client and with the host application to track and record credits used during operation of the system.

The service plan management module of the host includes a payment processing engine and a usage monitoring module. The payment processing engine communicates with a payment processor to facilitate the purchase of additional credits or to charge for monthly service plans. The payment processor may be a conventional online payment processing service. The usage monitoring module monitors the amount of credits consumed and purchased by a user and updates the database accordingly. The usage monitoring module may receive instructions from other modules and engines of the host application to modify the amount of available credits for a user.

IV. SOCIAL MARKETING

The universal communication system may also be adapted as a marketing system to provide marketing opportunities for users interconnected by one or more instant messaging services. As described above, the marketing system collects the login credentials for the instant messaging and social networking services to which a user belongs. The marketing system also stores the user information and characteristics, which is used to match users with marketing campaigns. A marketing campaign is created and stored in the system, and each marketing campaign includes marketing data that defines the scope of the campaign and the characteristics of target users. A marketing message is also created and associated with each marketing campaign. When the campaign is launched, the marketing system matches users with campaigns according to the selected user criteria for the campaign. The marketing system then sends an invitation to each user to view the marketing message via the instant messaging and social networking services. Finally, the social marketing system tracks the instances in which an invitee opts to view the marketing message.

A. Overview

Figure 70:
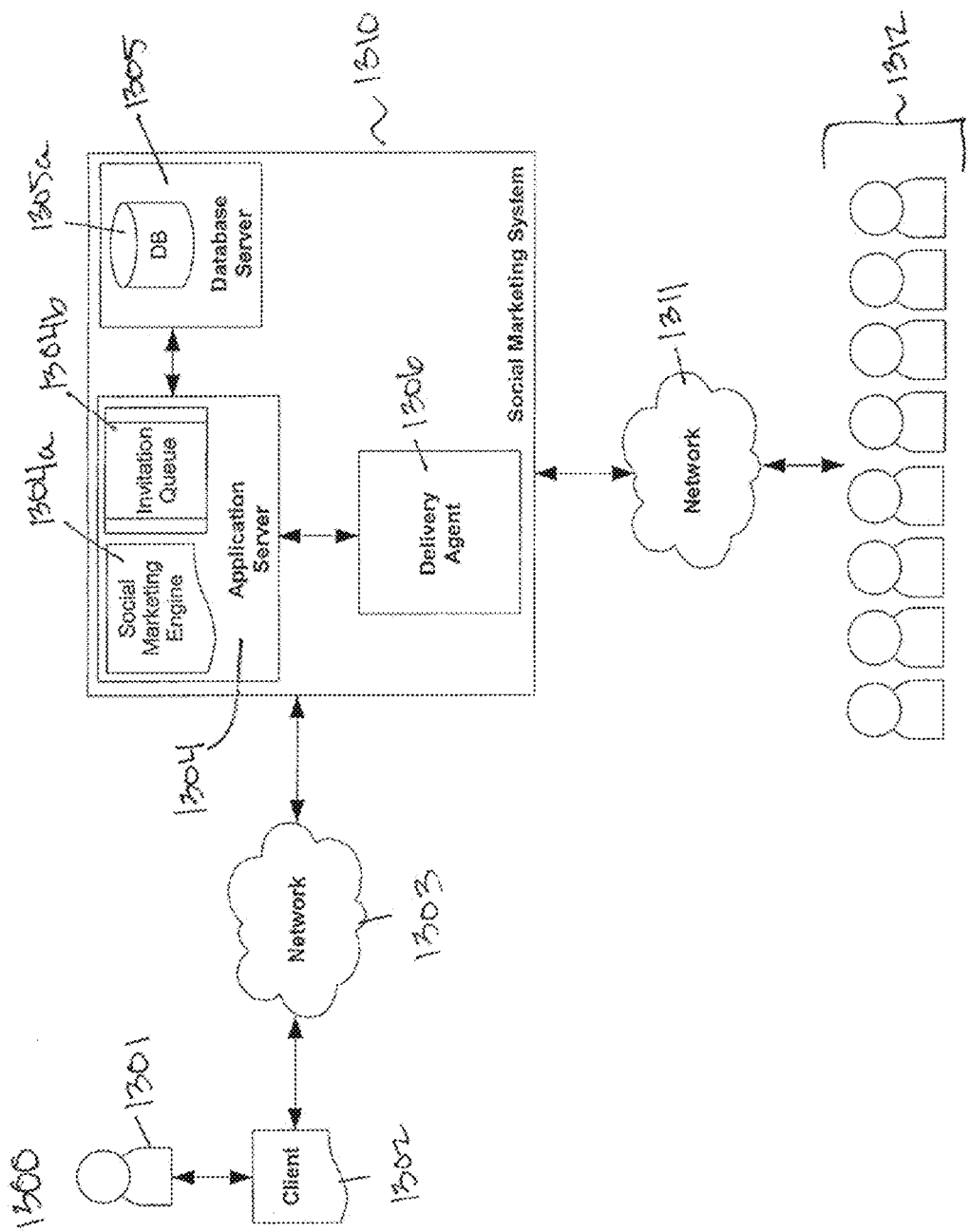
FIG. 70 is an example deployment diagram for a social marketing system.

An example social marketing system is shown in FIG. 70. A social marketing system includes an application server 1304, a database server 1305, and a delivery agent 1306. A user 1301 at a client 1302 communicates with the application server 1304 via a network 1303. The client may be, for example, a traditional computing device having the universal communication client discussed above, a web-based application, a mobile application for a cellular phone, and the like. The network may be, for example, an IP-based network, such as the Internet, or mobile cellular networks.

The application server includes a social marketing engine 1304a for processing campaigns, identifying matching contacts, and generating campaign invitations for the contacts. The application server also maintains an invitation queue 1304b for pending invitations.

The database server 1305 includes a database 1305a for storing the user information, campaign information, and tracking information used by the social marketing system.

The delivery agent polls the queue for pending invitations and delivers invitations to contacts (invitees) 1312 over network 1311 to view marketing messages for marketing campaigns. The delivery agent may be, for example, a mail transfer agent (MTA), an instant message gateway, a text message gateway, or a phone system. Accordingly, an invitee might receive an invitation to view a marketing message in an email, an instant message, a text message, or a phone message.

B. Marketing Database

Figure 71:
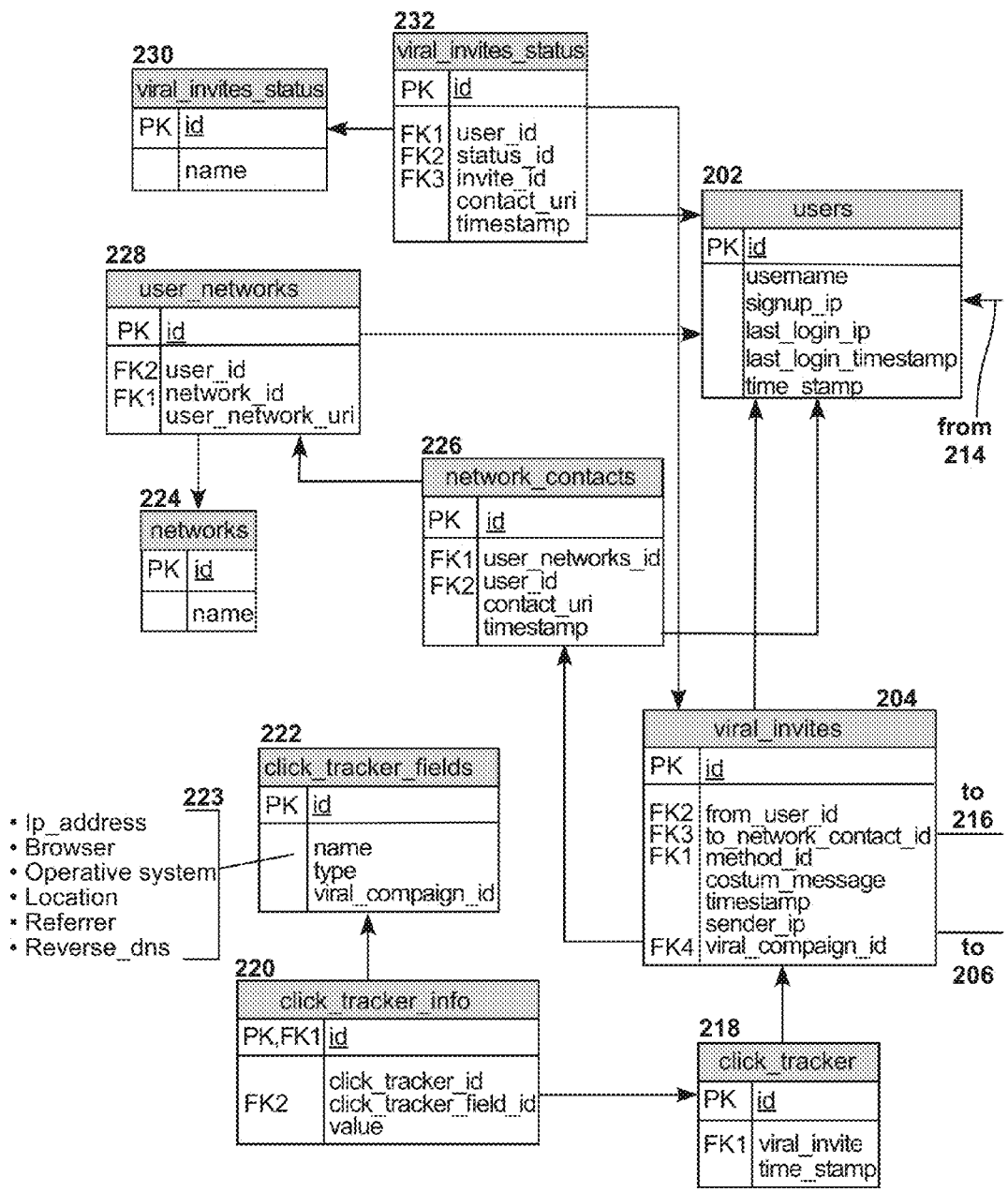
FIG. 71 is an example database entity-relationship diagram for a social marketing system.
Figure 71:
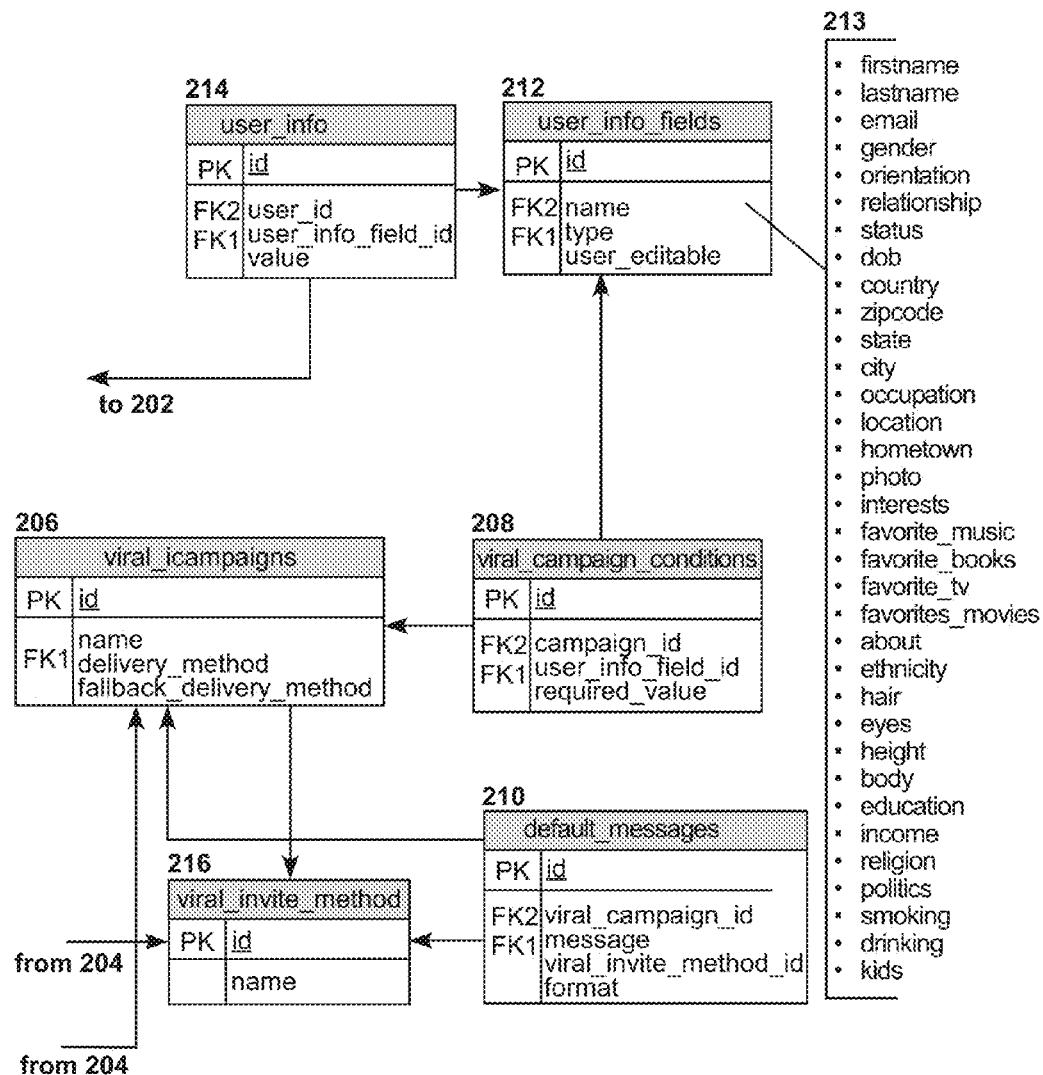

The database of the social marketing system includes multiple tables defined by a database schema to store information relating to users, social marketing campaigns, and tracking information for campaigns. An example database schema is shown in FIG. 71.

An example database schema may include: a user table for storing user account information; a user characteristics table for storing the characteristics of each user; a network services table for storing the instant messaging and social networking services accessible by the social marketing system; a user networks table for storing the instant messaging services and social networking services to which a user belongs; a networks contacts table for storing the contact information for the instant messaging contacts and social networking contacts of a user; a campaign table for storing campaign information; a campaign conditions table for storing the characteristics of the target users for the campaign; a campaign message table for storing the marketing message for each campaign; a campaign invitation method table for identifying the invitation method (e.g. instant message, text message, email, etc.) for each campaign; an invitation table for storing the invitations to contacts during active campaigns; an invitation status table for storing the status of each invitation; a tracking status table that stores information relating to viewership of the marketing message; and a tracking information table for storing information relating each invitee that views the marketing message.

C. Campaign Creation

Figure 72:
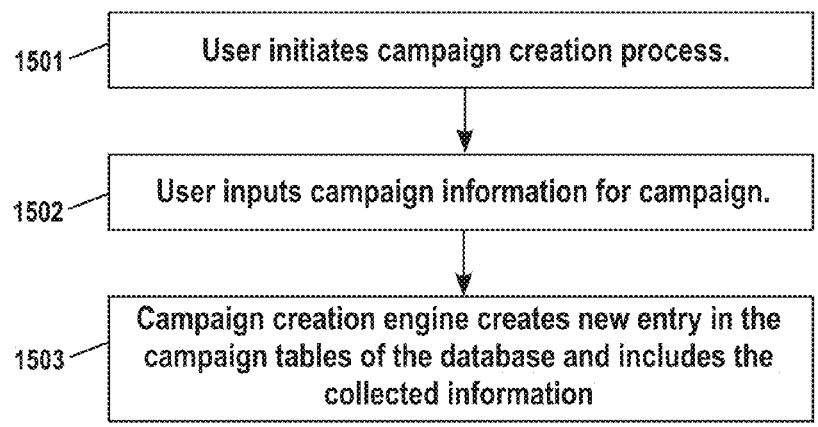
FIG. 72 is an example workflow of the process for creating a new campaign with the social marketing system.

Creating a campaign is the first step in using the social marketing system. An example campaign creation process 1500 is shown in FIG. 72. At step 1501, a user inputs the campaign information into the system. Campaign information includes, for example, the desired delivery method (e.g. email, instant message, text message, or phone message), the desired characteristics of target contacts, the scope and timing of the campaign, and the like. During the creation of a campaign, a user also creates a marketing message associated with the campaign. As mentioned above, the marketing message may be text-based or audio-based and presented to a contact at a landline or mobile cellular phone or at a computing device in an email, instant message, web page, and the like.

Once a user has entered the campaign information at step 1502, the database of the social marketing system creates new entries in the campaign tables to store the campaign information and the marketing message, as seen in step 1503.

D. Campaign Execution

Figure 73:
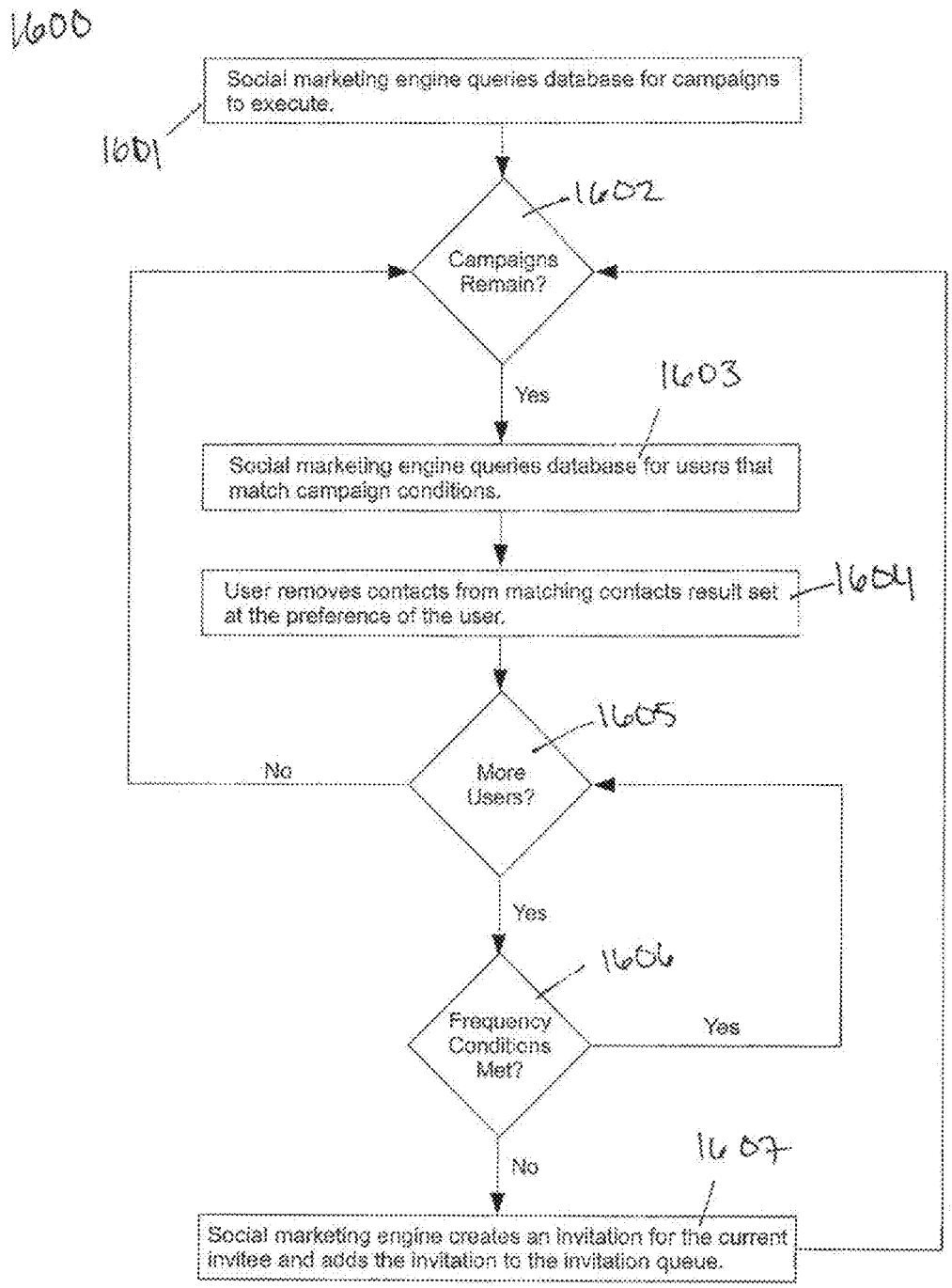
FIG. 73 is an example workflow of the process for initiating and executing a created campaign.

Following the creation and storage of a campaign, the system may then execute the campaign to send marketing invitations to contacts. An example campaign execution process 1600 is shown in FIG. 73.

In step 1601, the social marketing engine queries the database for campaigns to execute. For each campaign to execute in step 1602, the social networking engine queries the database for contacts matching the conditions set up stored for the campaign, as shown in step 1603. Matching criteria may include, for example, personal information (e.g. name, address, age, sex, interests, and the like), relevance of the subject matter of the marketing message to contact profile information, permission of contacts to receive marketing invitations, and other metrics. As seen in step 1604, user may also selectively remove contacts from the list of matching contacts to prevent those contacts from receiving an invitation. At step 1605, the process determines if there are more users at step 1605. If there are no more users, the process proceeds back to step 1602. If there are more users at step 1605, step 1606 is executed until frequency conditions are not met.

For each contact in the result set of matching contacts, the social marketing engine will determine, as seen in step 1606, if the campaign frequency conditions are met. Frequency conditions refer to the numbers of times a campaign invitation will be delivered to a contact. Frequency conditions may also refer to the number of times the social networking engine will reattempt the invitation in the case of a failed delivery.

If the frequency conditions have not been met, the social marketing engine will create a new invitation for the contact and store the invitation in the invitation queue at step 1607.

E. Campaign Delivery

Figure 74:
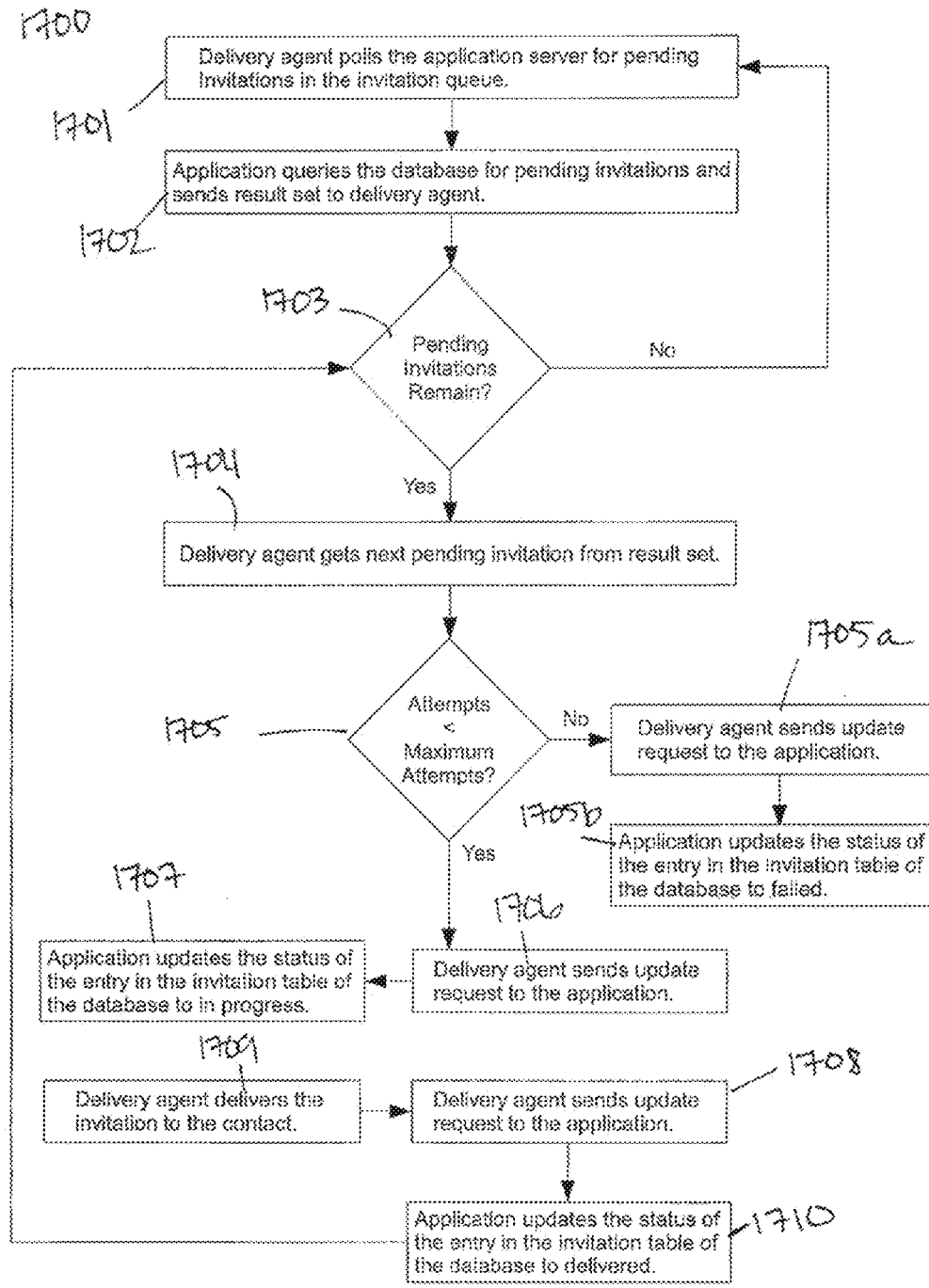
FIG. 74 is an example workflow of the process for delivering invitations to contacts to view the campaign marketing message.

Following the creation of a campaign and the addition of invitations to the invitation queue, the invitations may be delivered to the contacts. An example invitation delivery process 1700 is shown in FIG. 74. At step 1701, the delivery agent queries the application server for pending invitations in the invitation queue. At step 1702, the application server queries the database for invitations that have not been delivered. For example, the application server may query the database for invitations having a status of "NOT SENT."

If no pending invitations remain, step 1701 is executed. If pending invitations remain at step 1703, the delivery agent then retrieves a pending invitation from the result set, as shown in step 1704, and determines in step 1705 whether the invitation has exceeded the maximum number of delivery attempts. If the delivery attempts for the invitation exceed the maximum allowable delivery attempts, the delivery agent submits an update request to the application server in step 1705*a*. Then, in step 1705*b*, the application server updates the invitation entry in the database setting the status of the invitation to, for example, "FAILED."

However, if the number of delivery attempts is below the maximum, the delivery agent, in step 1706, sends an update request to the application server to update the status of the invitation. The application server may then, in step 1707, update the invitation entry in the database and set the status of the invitation as, for example, "IN PROGRESS." Next, in step 1709, the delivery agent sends the invitation to the contact according to the defined delivery method. For example, if the delivery agent is an email server, the agent sends an email to the contact at the email address associated with the contact in the database. Alternatively, if the delivery agent is an instant message gateway, the agent sends an instant message to the contact using, for example, XMPP as mentioned above, at the "screenname" associated with the contact in the database.

Following a successful delivery of an invitation, the delivery agent may send an update request to the application server, as seen in step 1708, to update the invitation entry in the database. Upon receipt of the update request, in step 1710, the application server may update the invitation entry in the database and set the status of the invitation to, for example, "DELIVERED."

F. Campaign Feedback and Tracking

Figure 75:
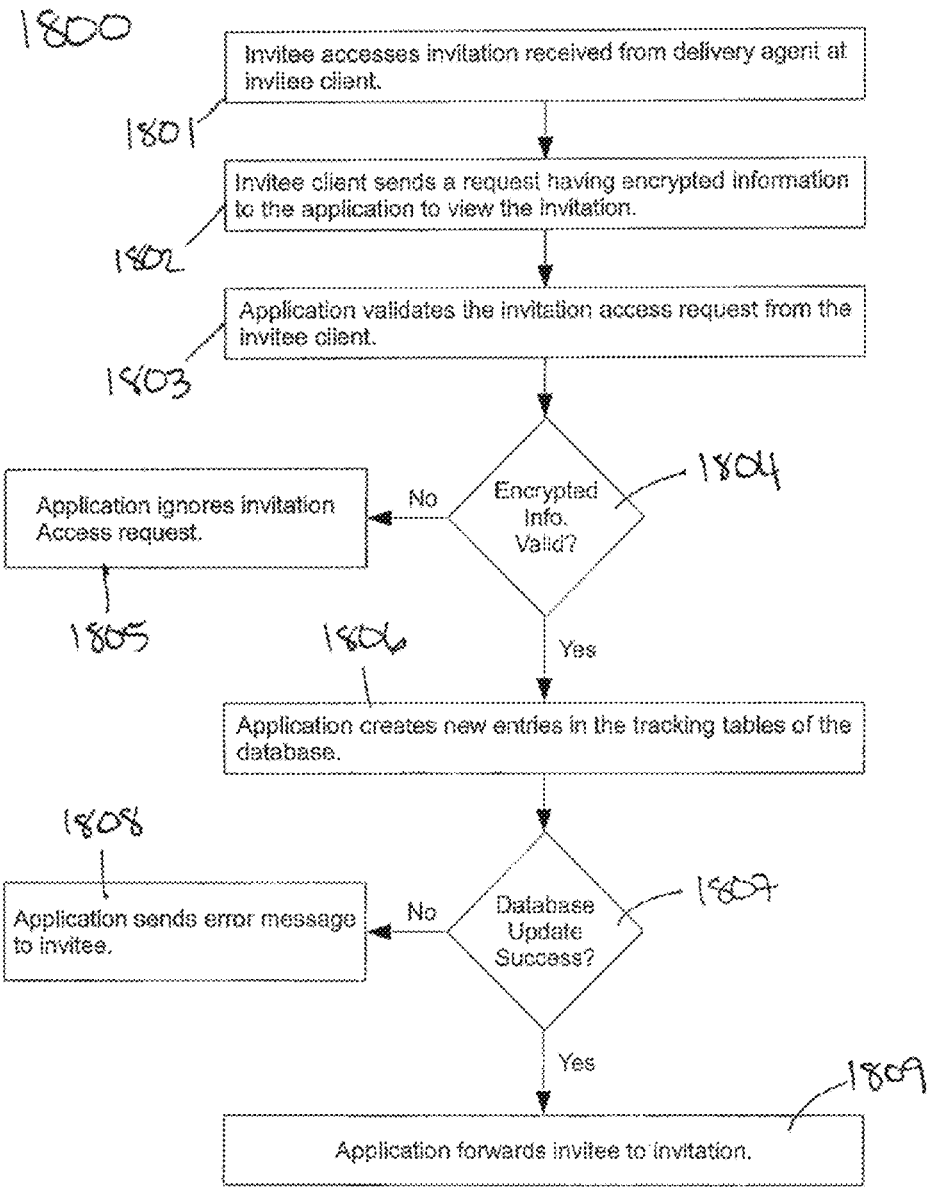
FIG. 75 is an example workflow for the process of tracking acceptance of the invitations.

The social marketing system may also be designed to track how many contacts accept the marketing invitation and view the marketing message. An example tracking process 1800 is shown in FIG. 75. At step 1801, an invitee accepts the invitation delivered by the delivery agent. As mentioned above, invitations may be in the form of an HTTP URL that the invitee may click to view the marketing message in a web page. Accordingly, clicking the invitation link may send a request to the application server to view the marketing message for the campaign, as shown in step 1802. In this example, the URL may also include encrypted information for tracking when an invitee clicks on the invitation link, such as the name of the campaign and the name of the invitee.

Upon receipt of a request to view a marketing message, the social networking engine validates the encrypted information, as seen in step 1803. If the encrypted information is invalid, the social networking engine will ignore the request to view the marketing message at step 1805. However, if the encrypted information is valid, the social networking engine, in step 1806, updates the database and creates new entries in the click tracker table and the click tracker information table to store tracking information relating to the request.

If the database update is successful in step 1807, the social networking engine forwards the invitee to the marketing message as in step 1809. For example, the social networking engine may forward the invitee to a web page containing the marketing message as in step 18. However, if the database update was unsuccessful, the social networking engine will send an error message to the user as shown in step 1808.

V. CONCLUSION

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that a certain of the details described herein can be varied considerably without departing from the basic principles of the invention.

What is claimed is:

1. A computer program product, stored on a non-transitory computer readable medium, comprising instructions that when executed on one or more computers cause the one or more computers to perform operations, the operations comprising:

provide a single client application including a plurality of communication types, the communication types comprising all of voice call, text messaging, and instant messaging; providing access to a plurality of contact information; initiating a first communication with a first party using a first one of the communication types;

switching to a second communication with the first party using a second one of the communication types;

providing for all of three-way conferences, transfer of a communication to a third party, and call-back bridging initiated by text message or world-wide-web without number preprogramming; and wherein contact information comprises contact specific settings and group specific settings, which are queried including the order of contact specific settings, group specific settings, and general user settings when no contact specific settings and no group specific settings are stored for a known contact of an inbound call in determining a course of action with respect to a communication.

2. The computer program product of claim 1, wherein the communication types additionally comprise one or more of social networking, fax, and file transfer.

3. The computer program product of claim 1 further comprising automatically switching to a third communication with the first party using a third one of the communication types.

4. The computer program product of claim 3 further comprising switching back to the first communication via a single, multi-threaded command window.

5. The computer program product of claim 1 searching the plurality of contact information to initiate one of the first and second communications.

6. The computer program product of claim 5 further comprising automatically attempting to initiate the first communication based on a hierarchical list including the plurality of contact information.

7. The computer program product of claim 5, further comprising automatically switching to the second communication based on a hierarchical list including the plurality of contact information.

8. The computer program product of claim 1, wherein the automatic switching is based on a device initiating one of the first and second communications.

9. A unified communication system including a memory and a processor configured to execute a client application, the client application comprising:
  first logic configured to provide a client interface for accessing a plurality of communication and media types from a single, multi-threaded command window, the plurality comprising at least voice call, text messaging, and instant messaging;
  second logic configured to integrate a plurality of contact information from the plurality of media and communication types into a single contact list, the single contact list being accessible from the client interface;
  third logic configured to receive executable instructions from a multi-protocol application program interface to alter the plurality of communication and media types and the plurality of contact information received therefrom;
  fourth logic providing for all of three-way conferences, transfer of a communication to a third party, and call-back bridging initiated by text message or world-wide-web without number preprogramming; and
  wherein contact information comprises contact specific settings and group specific settings, which are queried including the order of contact specific settings, group specific settings, and general user settings when no contact specific settings and no group specific settings are stored for a known contact of an inbound call in determining a course of action with respect to a communication.

10. The system of claim 9, wherein the plurality of communication and media types additionally comprise one or more of social networking, fax, and file transfer.

11. The system of claim 9 further comprising a translator configured to receive a text message and translate the text message from a first language to a second language.

12. The system of claim 11, wherein the translator is configured to automatically translate the text message.

13. An apparatus, comprising:
  a processor configured to execute a single client application including a plurality of communication types including at least voice call, text messaging, and instant messaging; and
  a memory configured to store and provide access to a plurality of contact information from a plurality of media types, wherein the processor is further configured to enable a first communication with a first party using a first one of the communication types and to switch to a second communication with the first party using a second one of the communication types;
  wherein said single client application provides for all of three-way conferences, transfer of a communication to a third party, and call-back bridging initiated by text message or world-wide-web without number preprogramming; and
  wherein contact information comprises contact specific settings and group specific settings, which are queried including the order of contact specific settings, group specific settings, and general user settings when no contact specific settings and no group specific settings are stored for a known contact of an inbound call in determining a course of action with respect to a communication.

14. The apparatus of claim 13, wherein the plurality of communication types additionally includes one or more of social networking, fax, and file transfer.

15. The apparatus of claim 13 further comprising one of a mobile device, a handheld device, a laptop, and desktop computer.

16. The apparatus of claim 13 further comprising a client interface configured to access the communication types via a multi-threaded window.

17. The apparatus of claim 13 further comprising a translator configured to automatically translate a plurality of text messages.

18. The apparatus of claim 13 further comprising a client interface configured to access a plurality of applications, each including a plurality of contact information.

19. The apparatus of claim 18, wherein the plurality of contact information is accessible from the client interface in a single contact list.

20. The apparatus of claim 13, wherein the processor is configured to execute instructions to enable a voice over IP (VoIP) call.

* * * * *